Edward J. Carey
and John B. Geers, Deceased
By John H. More
Special Administrator
Inventors By Carl Benst
Their Attorney

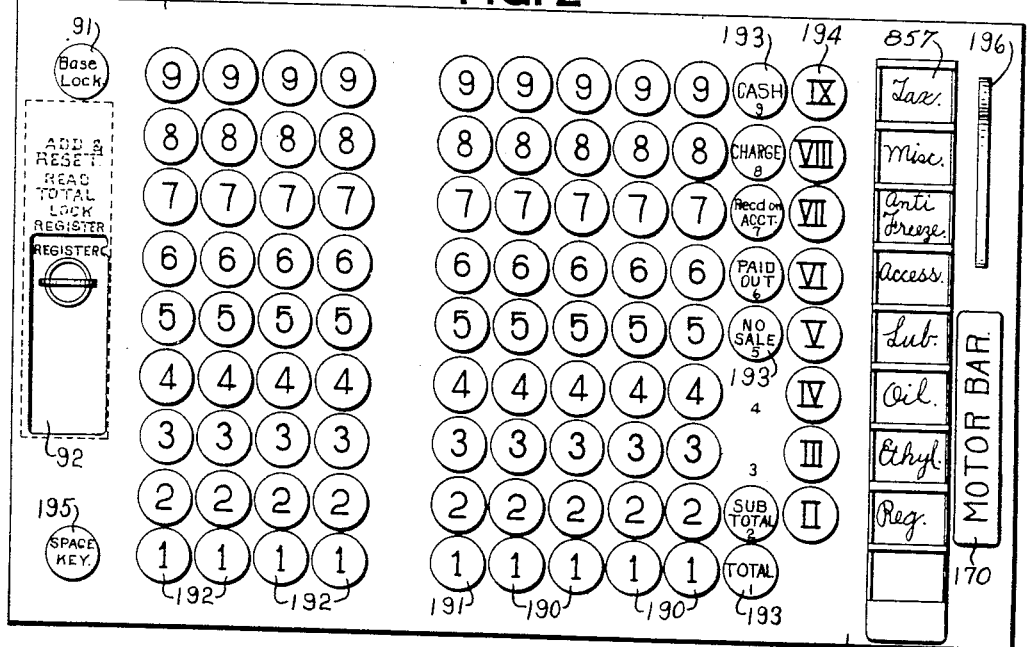

June 22, 1948.   E. J. CAREY ET AL   2,443,652
TOTALIZER ENGAGING MECHANISM
Filed Feb. 10, 1942   22 Sheets-Sheet 3

FIG. 4

|   |   |   |   |   |   |   |   |   |
|---|---|---|---|---|---|---|---|---|
| • | +Tot | 80.87 |  |  |  |  |  |  |
| • | + * |  | 5.00 |  |  |  |  |  |
| • | + * |  | 2.80 |  |  |  |  |  |
| • | 2+Tot | 7.80 |  |  |  |  |  |  |
| • | + * |  |  | 10.00 |  |  |  |  |
| • | 3+Tot | 10.00 |  |  |  |  |  |  |
| • | + * |  |  |  | 1.26 |  |  |  |
| • | 4+Tot | 1.26 |  |  |  |  |  |  |
| • | + * |  |  |  |  | 5.67 |  |  |
| • | 5+Tot | 5.67 |  |  |  |  |  |  |
| • | + * |  |  |  |  |  | 4.67 |  |
| • | 7+Tot | 4.67 |  |  |  |  |  |  |
| • | + * |  |  |  |  |  |  | 4.10 |
| • | 8+Tot | 4.10 |  |  |  |  |  |  |
| • | + * |  |  |  |  |  |  | .60 |
| • | + * |  |  |  |  |  |  | .20 |
| • | + * |  |  |  |  |  |  | .16 |
| • | 9+Tot | .96 |  |  |  |  |  |  |
| • |  | 30.61 |  |  |  |  |  |  |
| • |  | 1.20 |  |  |  |  |  |  |
| • |  | 1.25 |  |  |  |  |  |  |
| *Charge* • | +Tot | 33.06 |  |  |  |  |  |  |
| • | + * | 30.41 |  |  |  |  |  |  |
| • | + * | 16.00 |  |  |  |  |  |  |
| *Rec'd on Acct.* • | +Tot | 46.41 |  |  |  |  |  |  |
| • | + * | 45.60 |  |  |  |  |  |  |
| • | + * | 3.25 |  |  |  |  |  |  |
| *Paid Out.* • | +Tot | 48.85 |  |  |  |  |  |  |

FIG. 5

| | | |
|---|---|---|
| • | + * | 7.80 |
| • | + * | 10.00 |
| • | + * | 1.26 |
| • | + * | 5.67 |
| • | + * | 4.67 |
| • | + * | 4.10 |
| • | + * | .96 |
| • | + * | 46.41 |
| • | +Tot. | 80.87 |

*Edward J. Carey*
and John B. Geers, Deceased
By John H. More
Special Administrator
Inventors By *Karl Beust*
Their Attorney

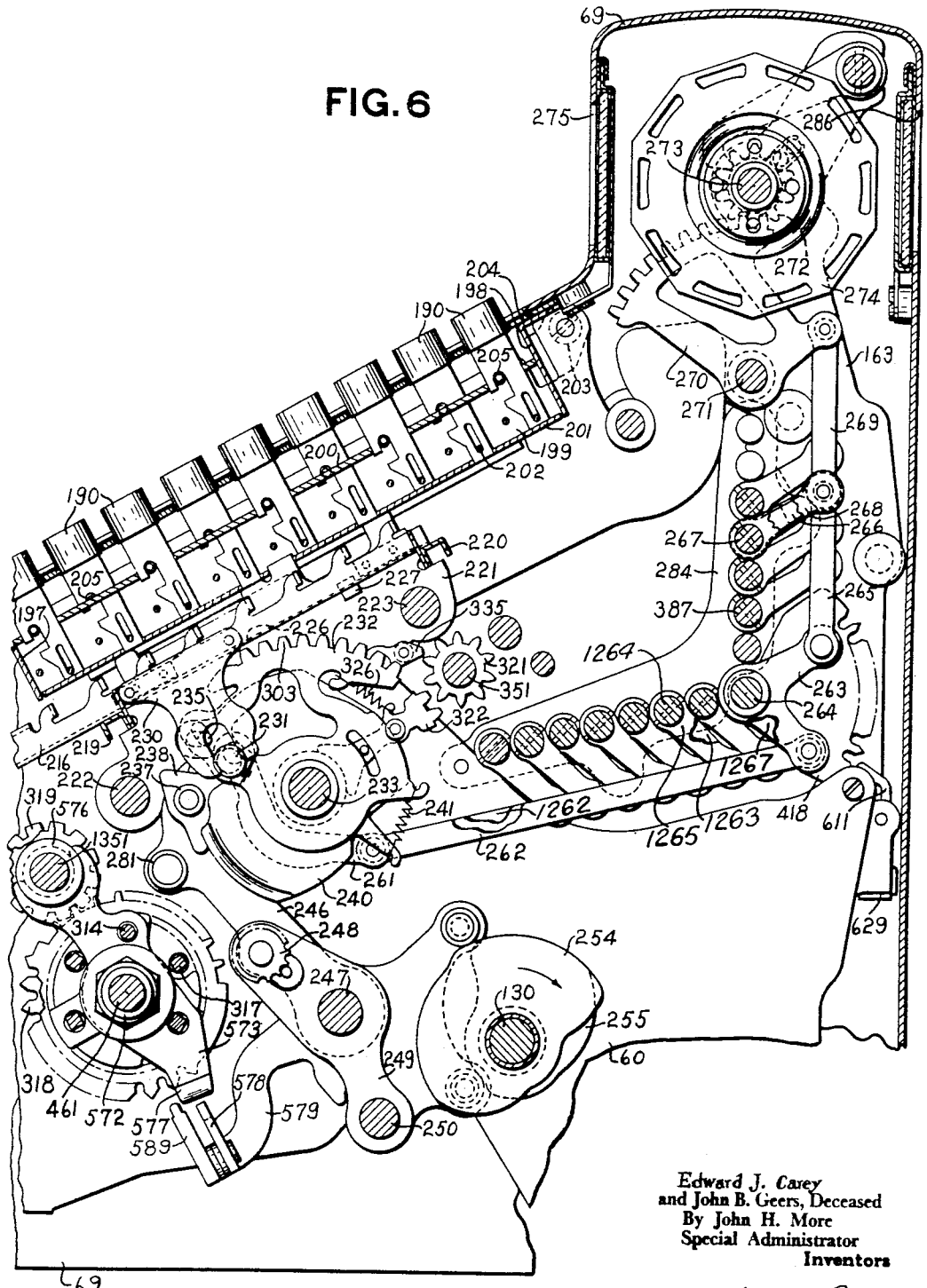

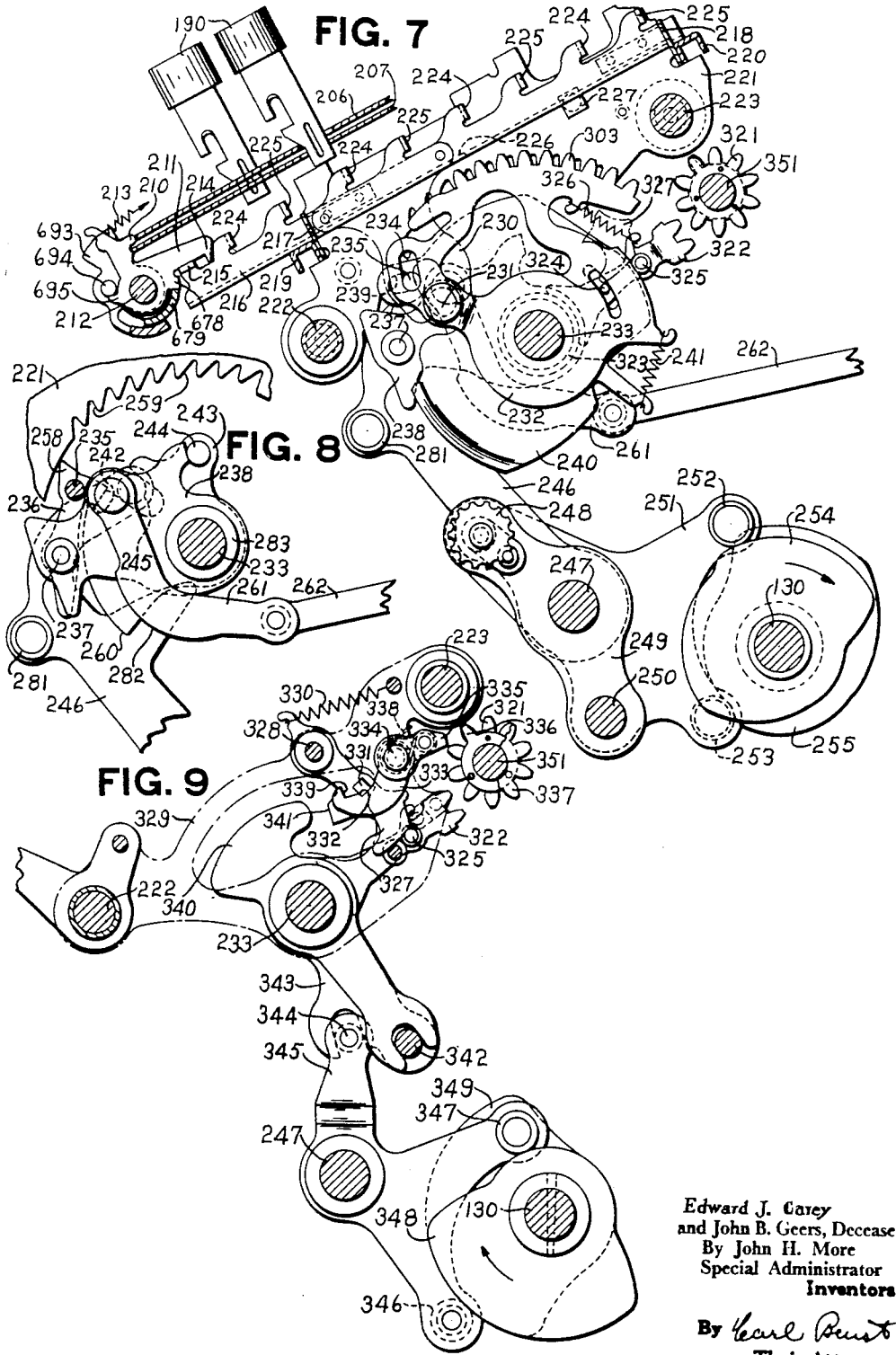

June 22, 1948.  E. J. CAREY ET AL  2,443,652
TOTALIZER ENGAGING MECHANISM
Filed Feb. 10, 1942  22 Sheets-Sheet 6
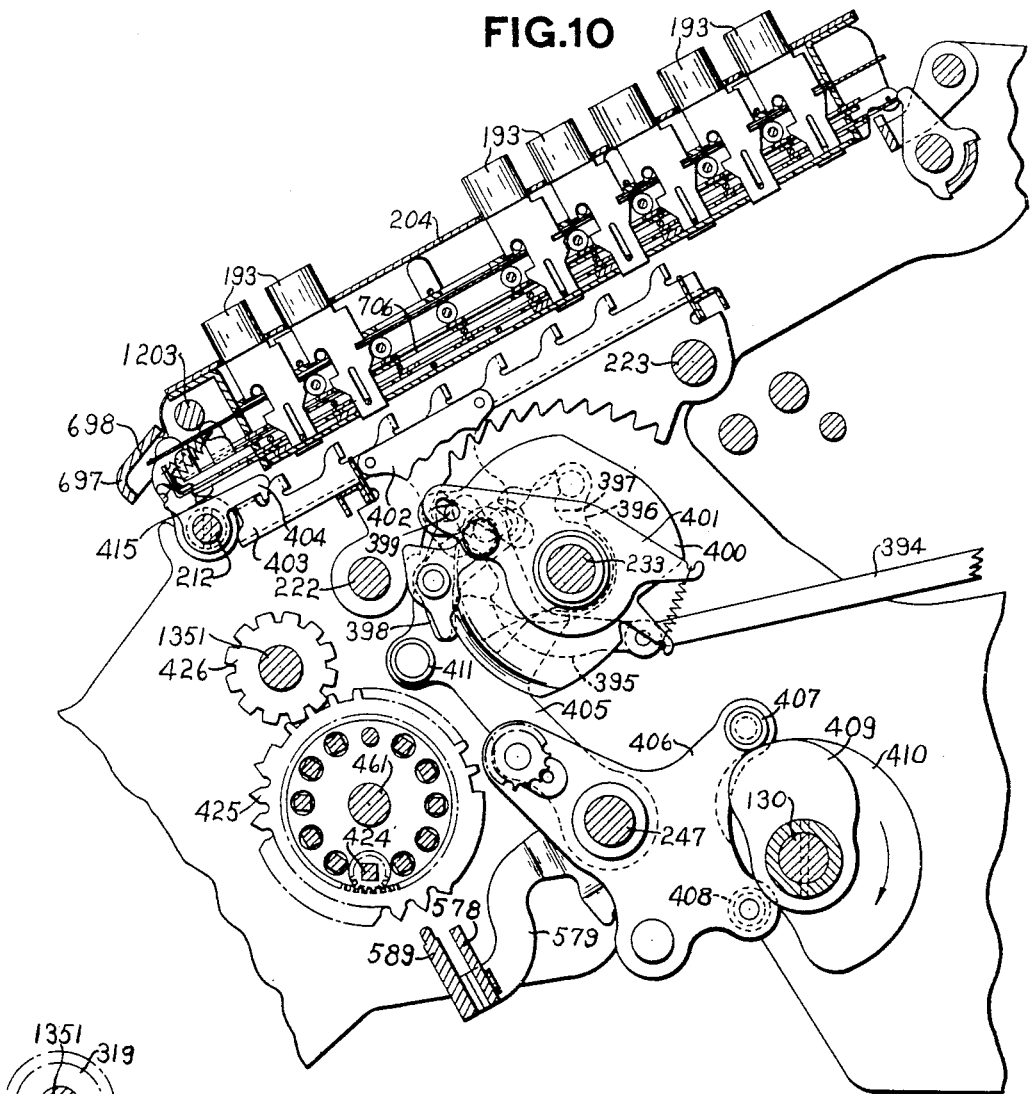
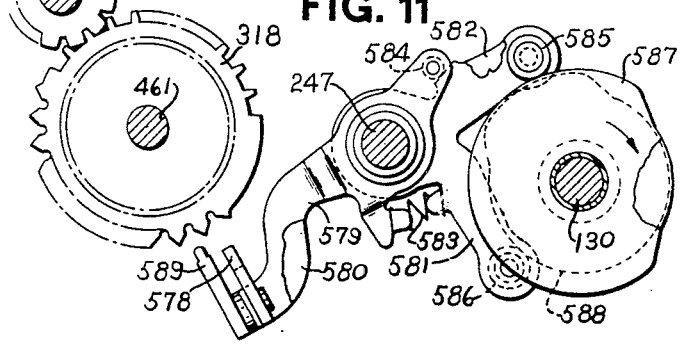
Edward J. Carey
and John B. Geers, Deceased
By John H. More
Special Administrator
Inventors
By *Pearl Beust*
Their Attorney

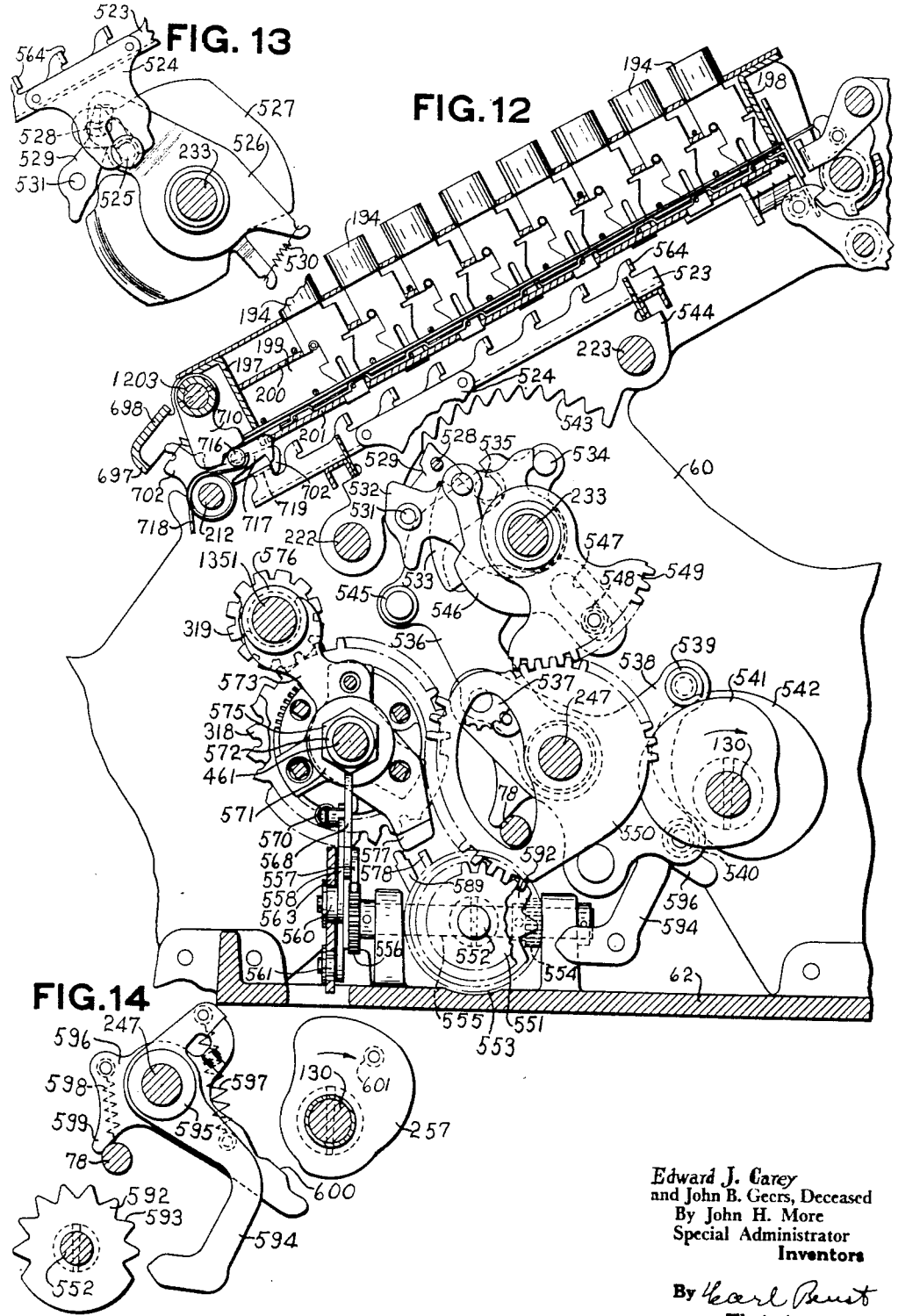
June 22, 1948.  E. J. CAREY ET AL  2,443,652
TOTALIZER ENGAGING MECHANISM
Filed Feb. 10, 1942  22 Sheets-Sheet 7
Edward J. Carey
and John B. Geers, Deceased
By John H. More
Special Administrator
Inventors
By Earl Benst
Their Attorney June 22, 1948.

E. J. CAREY ET AL 2,443,652

TOTALIZER ENGAGING MECHANISM

Filed Feb. 10, 1942

Edward J. Carey
and John B. Geers, Deceased
By John H. More
Special Administrator
Inventors By Karl Berns
Their Attorney

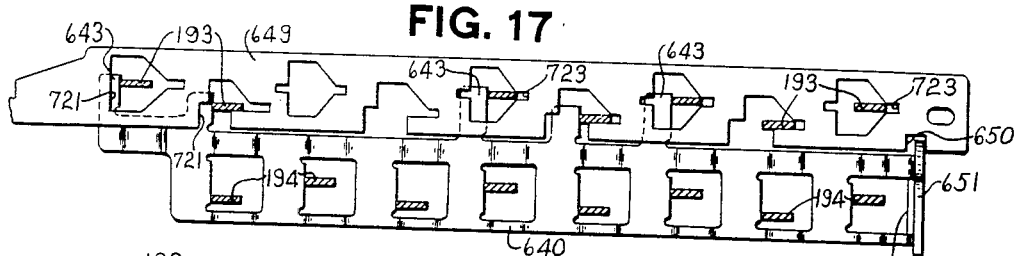
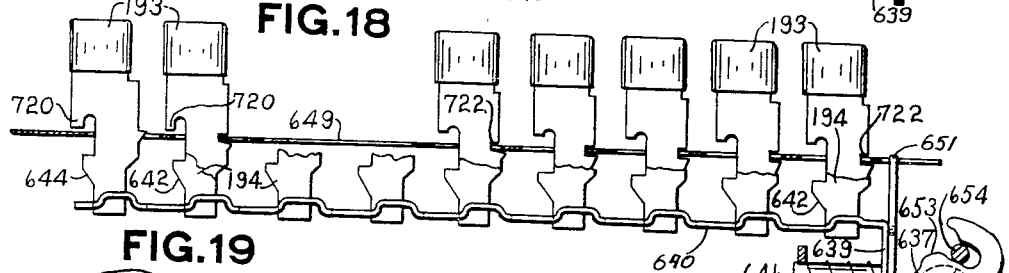
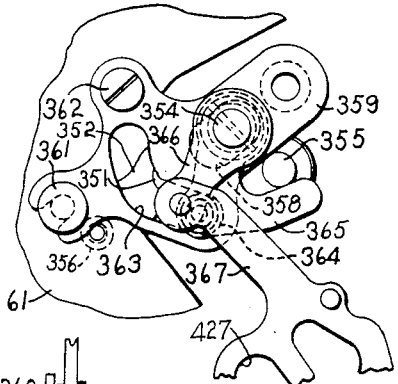
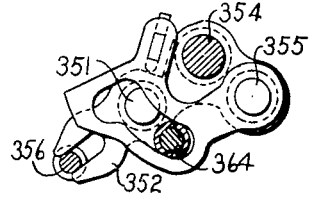
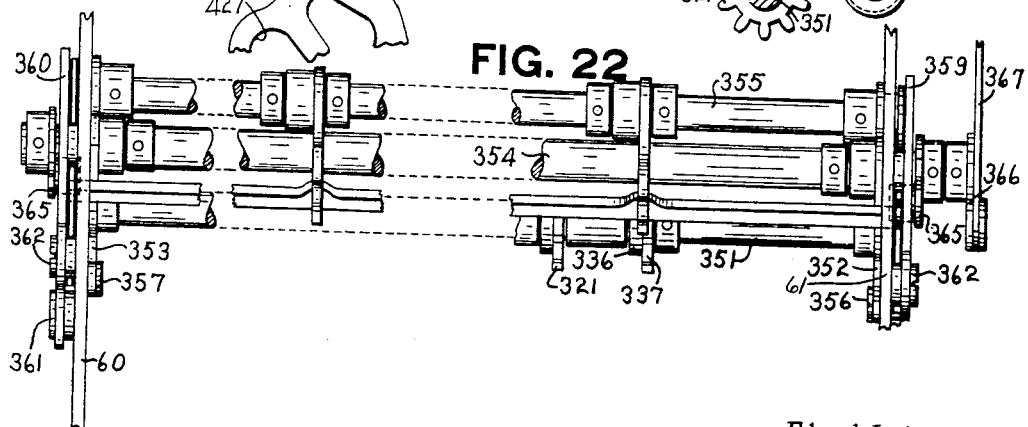

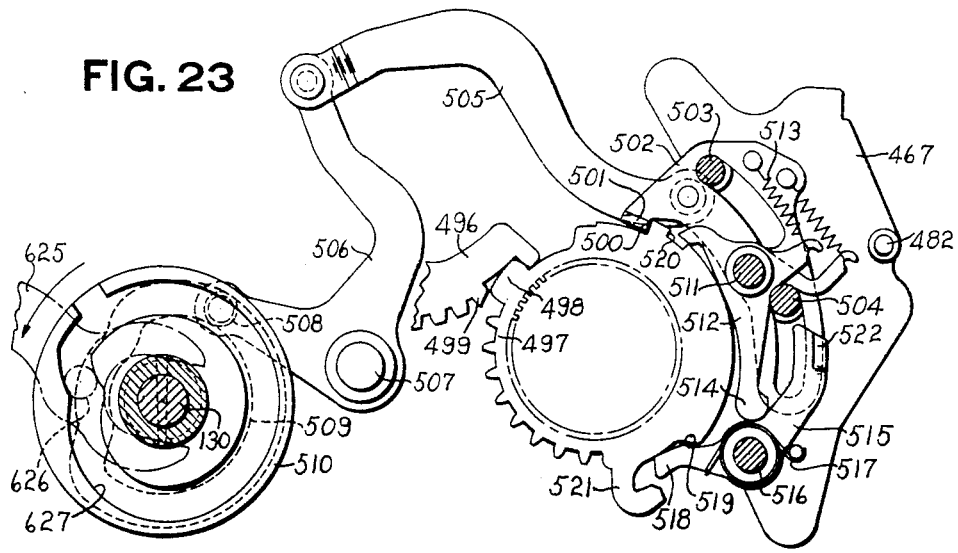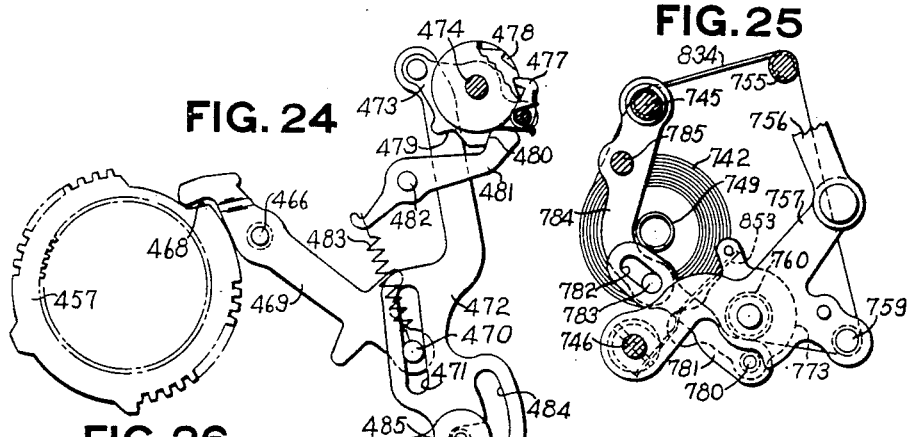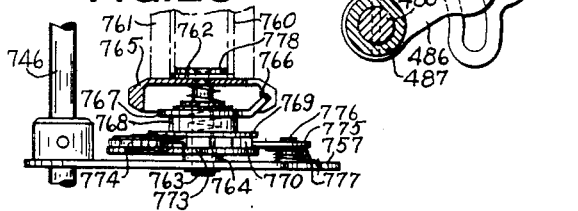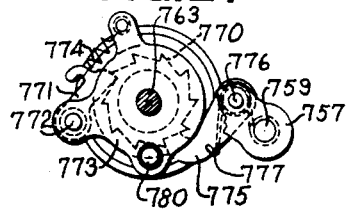

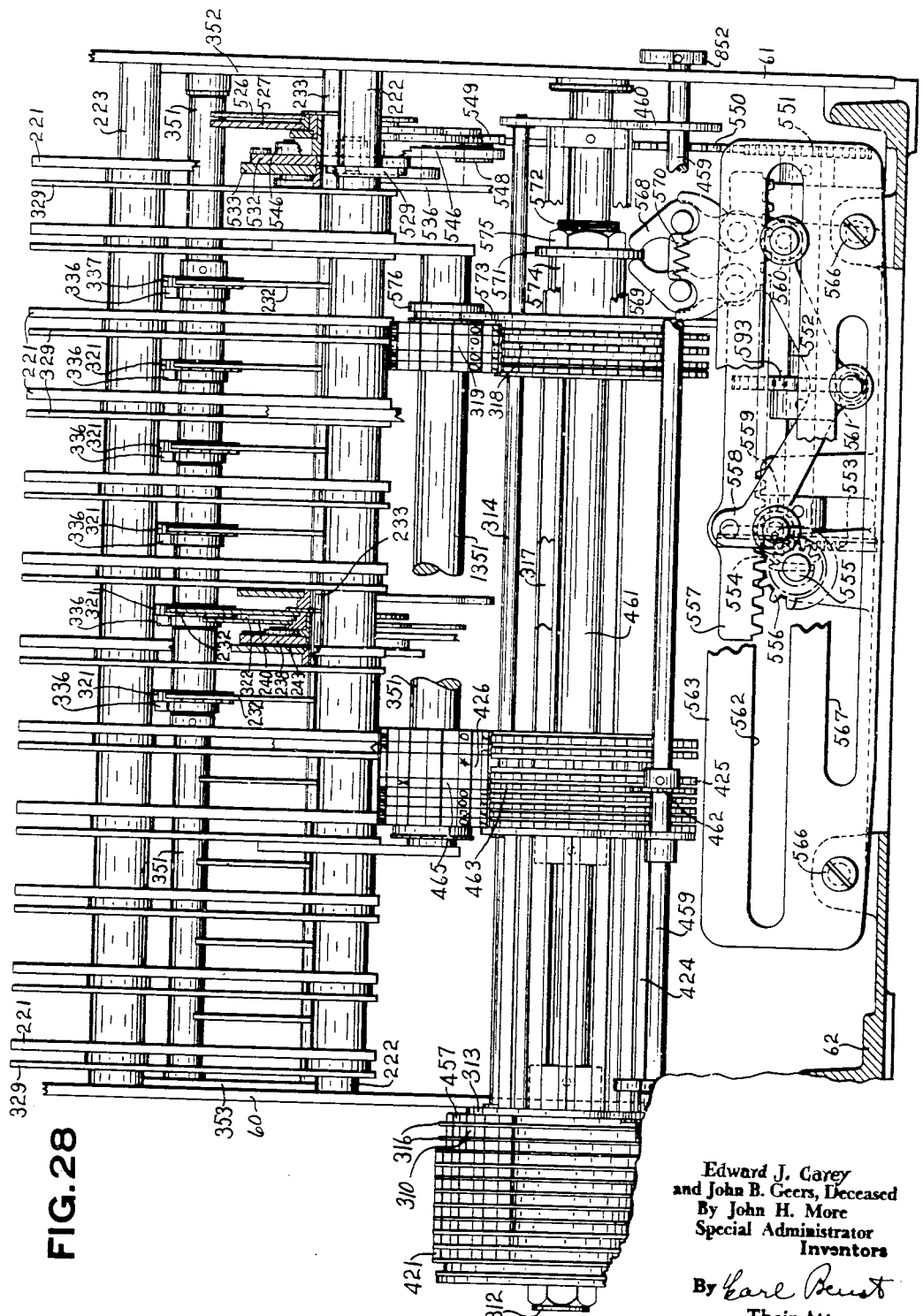

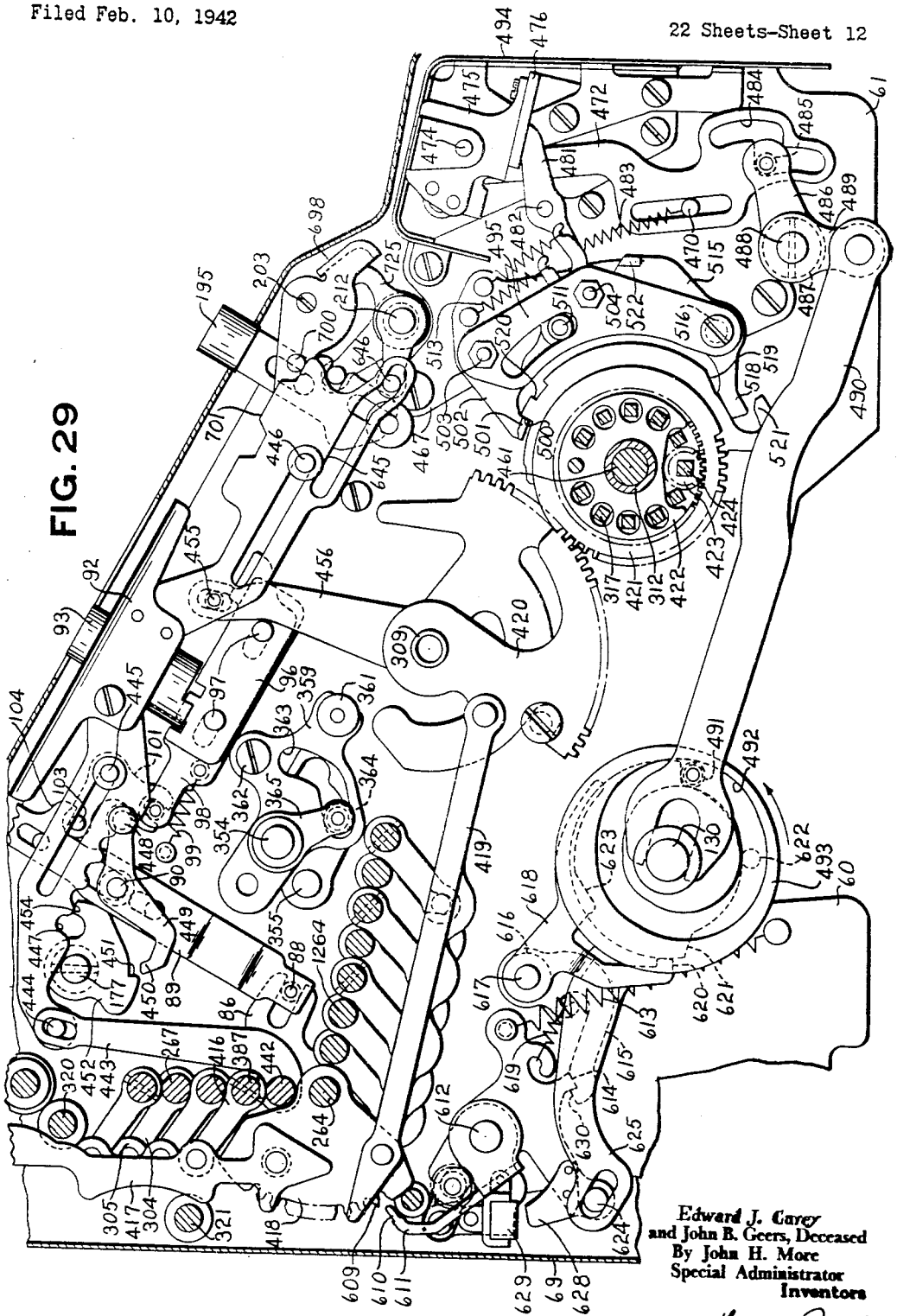

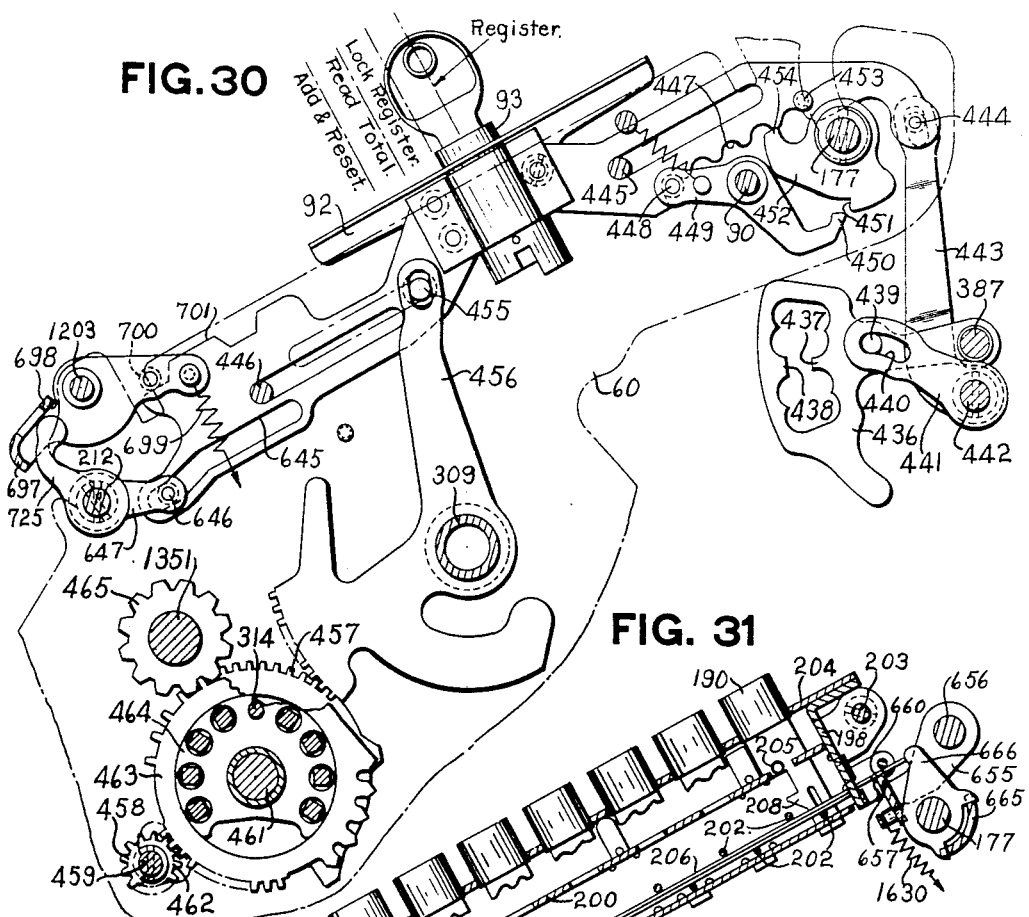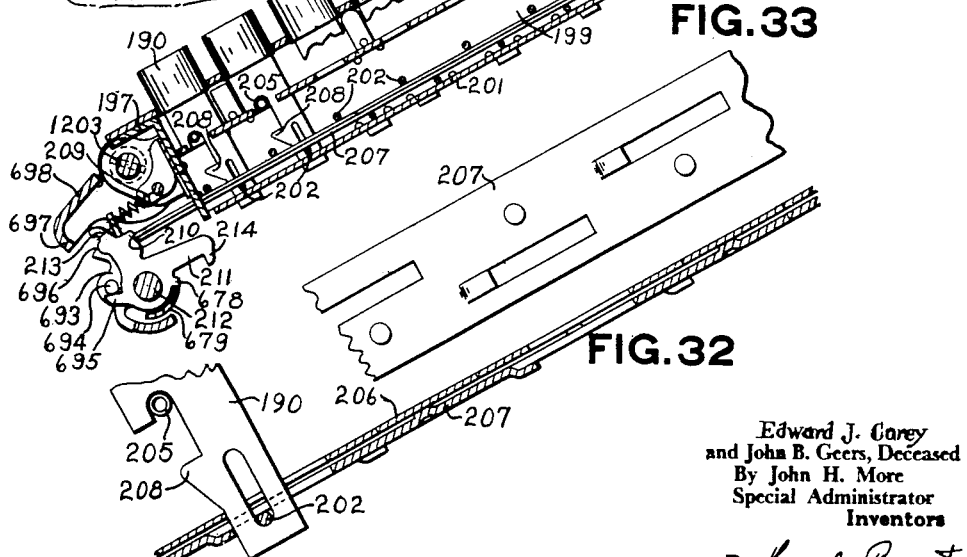

June 22, 1948.　　　E. J. CAREY ET AL　　　2,443,652
TOTALIZER ENGAGING MECHANISM
Filed Feb. 10, 1942　　　　　　　　　　　　22 Sheets-Sheet 14

Edward J. Carey
and John B. Geers, Deceased
By John H. More
Special Administrator
Inventors By Karl Benst
Their Attorney June 22, 1948.  E. J. CAREY ET AL  2,443,652
TOTALIZER ENGAGING MECHANISM
Filed Feb. 10, 1942  22 Sheets-Sheet 15
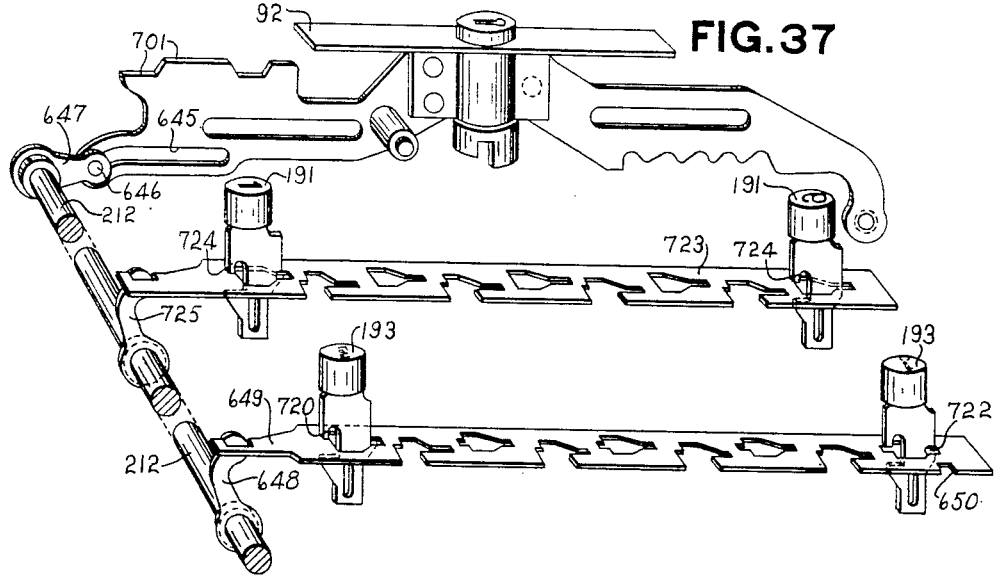
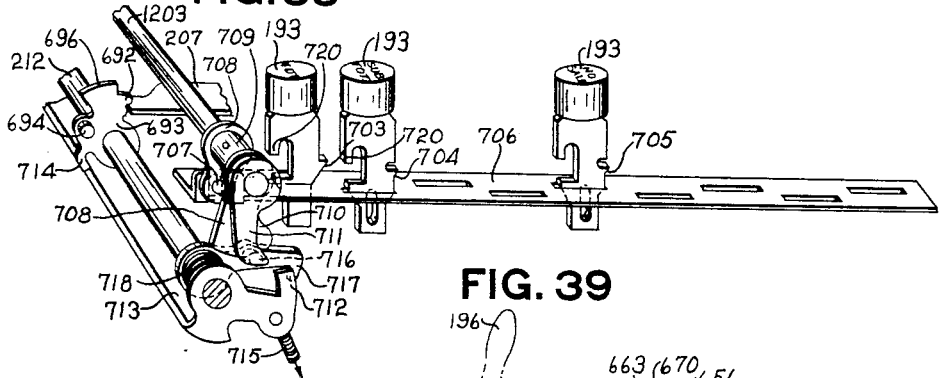
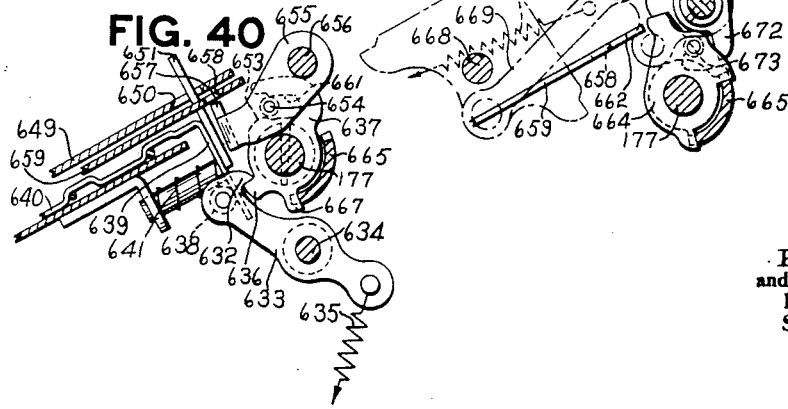
Edward J. Carey
and John B. Geers, Deceased
By John H. More
Special Administrator
Inventors
By Earl Brust
Their Attorney June 22, 1948.                E. J. CAREY ET AL                2,443,652
                        TOTALIZER ENGAGING MECHANISM
Filed Feb. 10, 1942                                    22 Sheets-Sheet 16
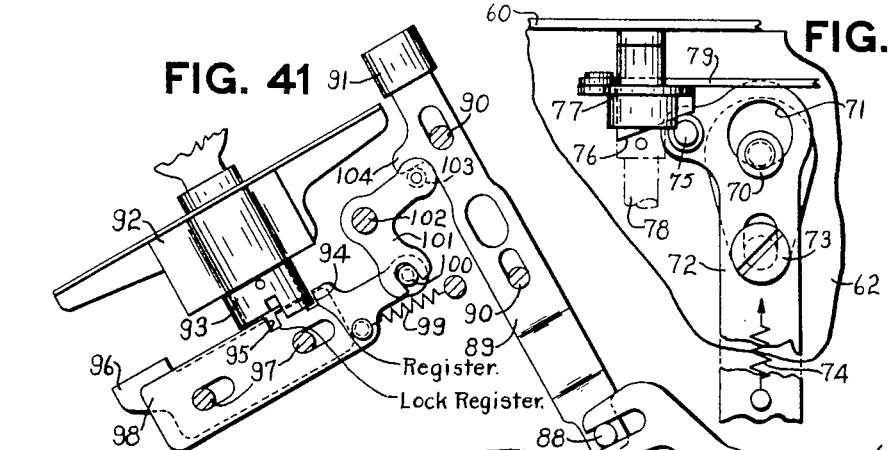
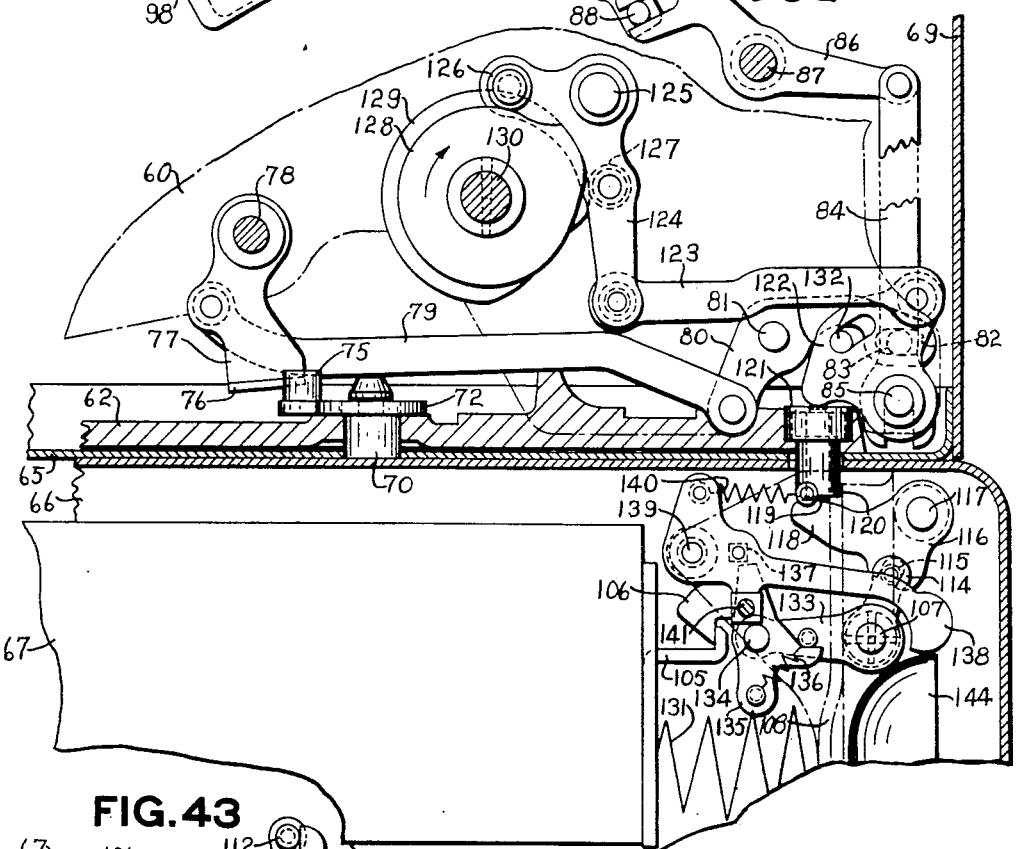
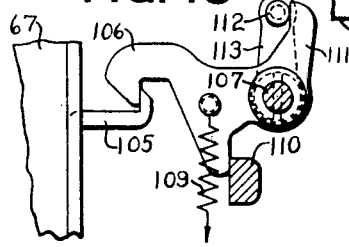
Edward J. Carey
and John B. Geers, Deceased
By John H. More
Special Administrator
Inventors
By *Carl Benst*
Their Attorney

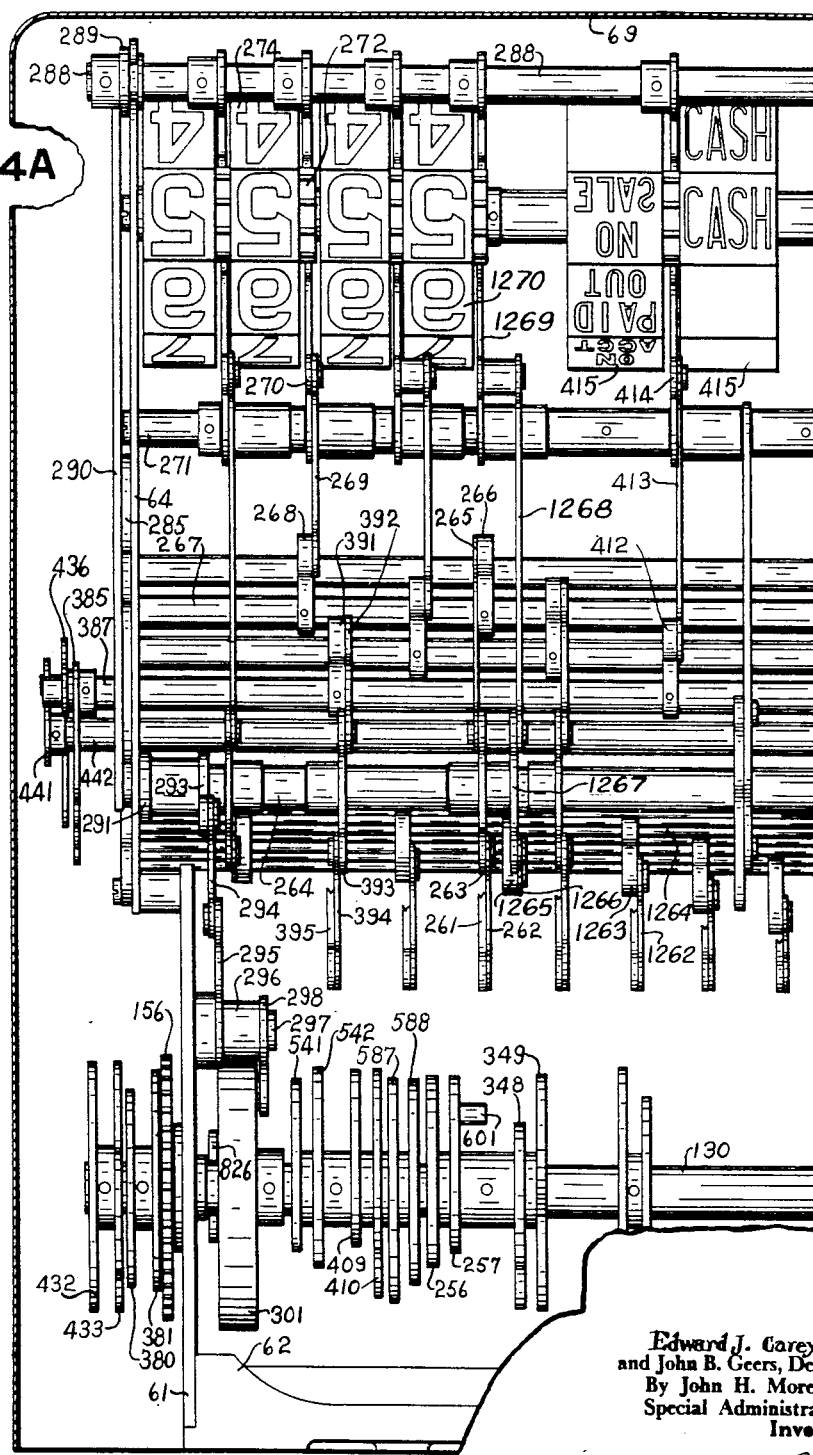

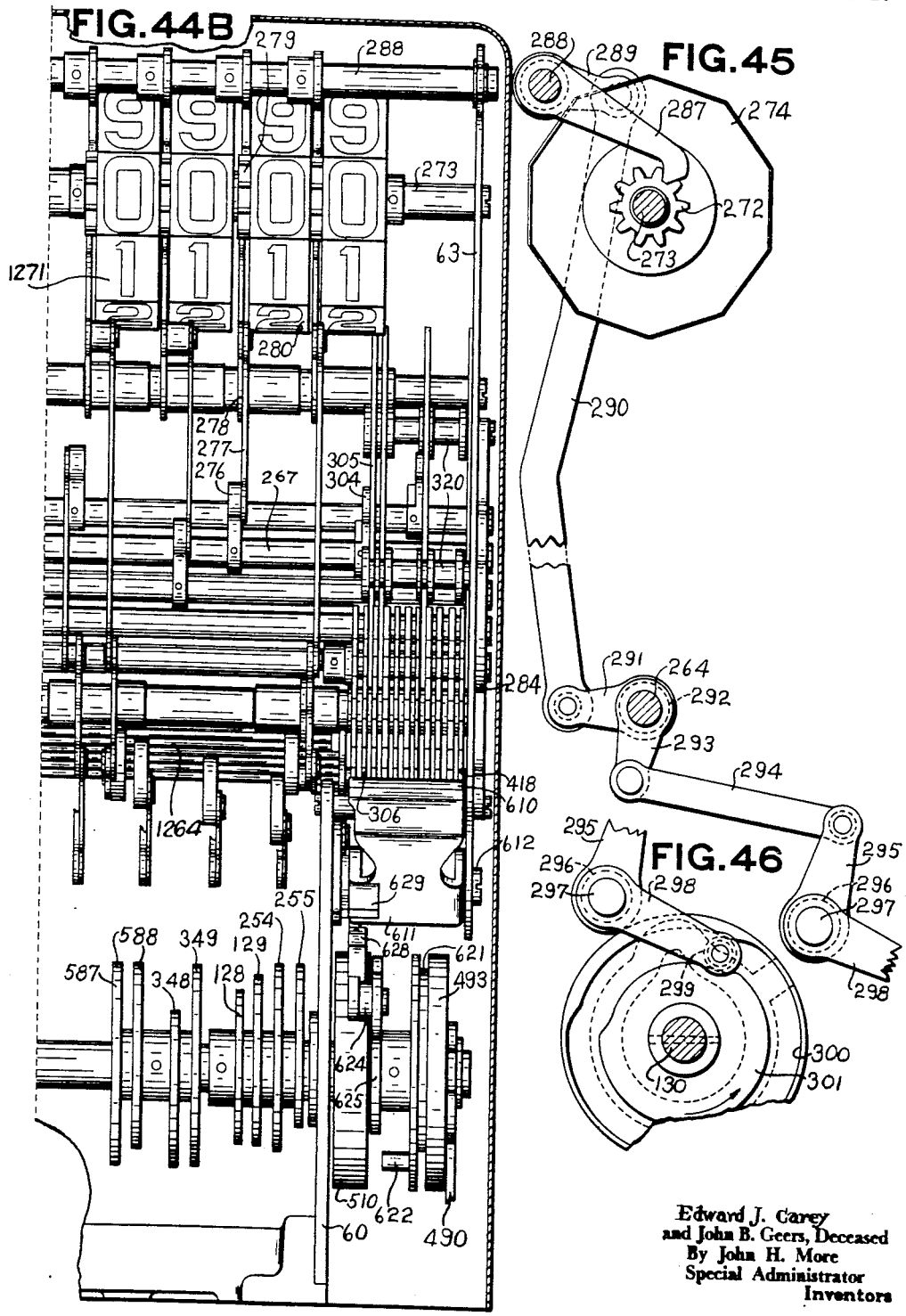

June 22, 1948.　　　　E. J. CAREY ET AL　　　　2,443,652
TOTALIZER ENGAGING MECHANISM
Filed Feb. 10, 1942　　　　　　　　　　22 Sheets-Sheet 19
FIG. 47
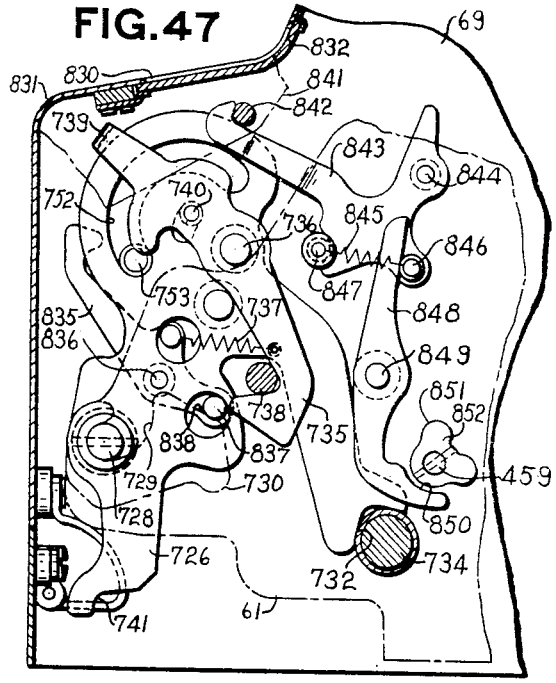
FIG. 48
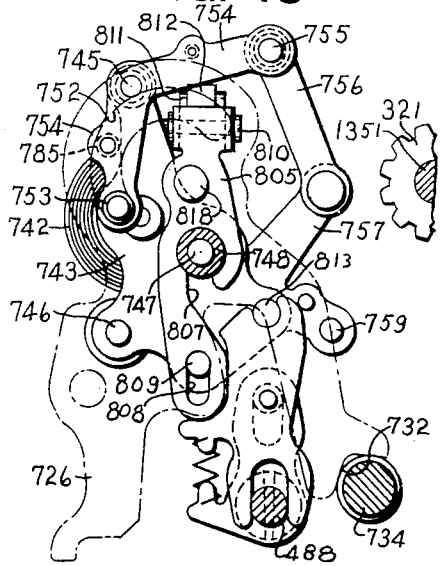
FIG. 49
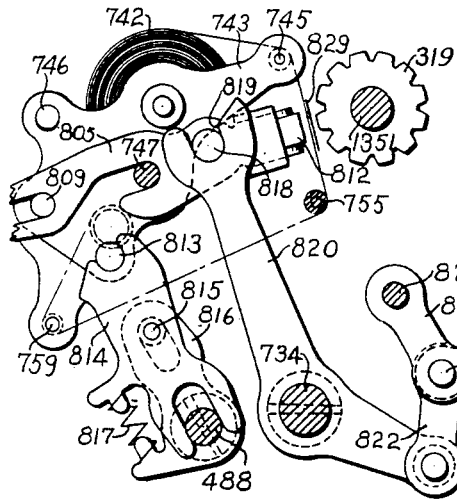
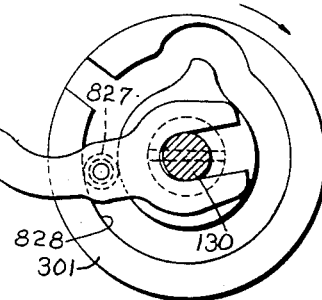
Edward J. Carey
and John B. Geers, Deceased
By John H. More
Special Administrator
Inventors
By Carl Benst
Their Attorney

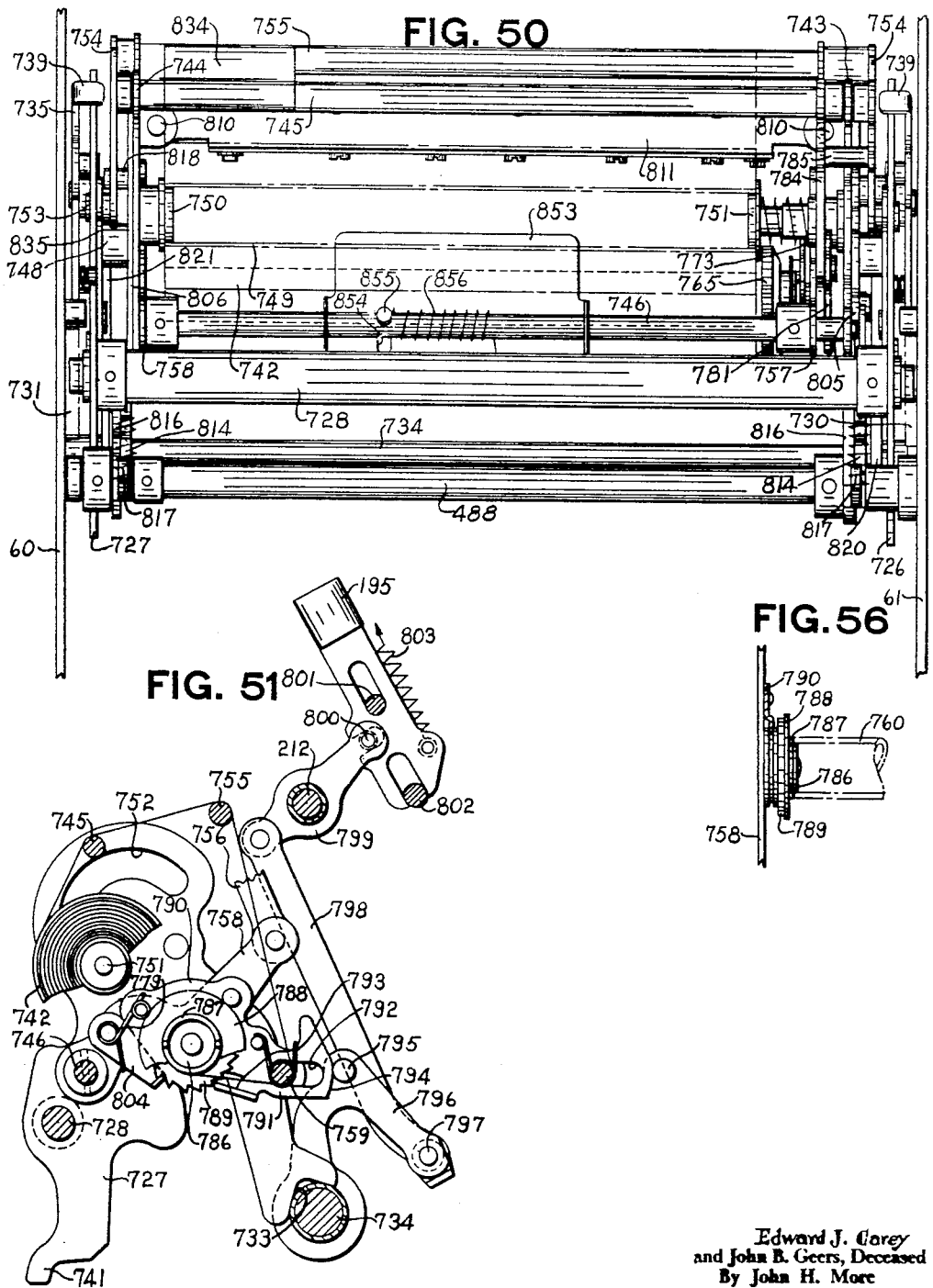

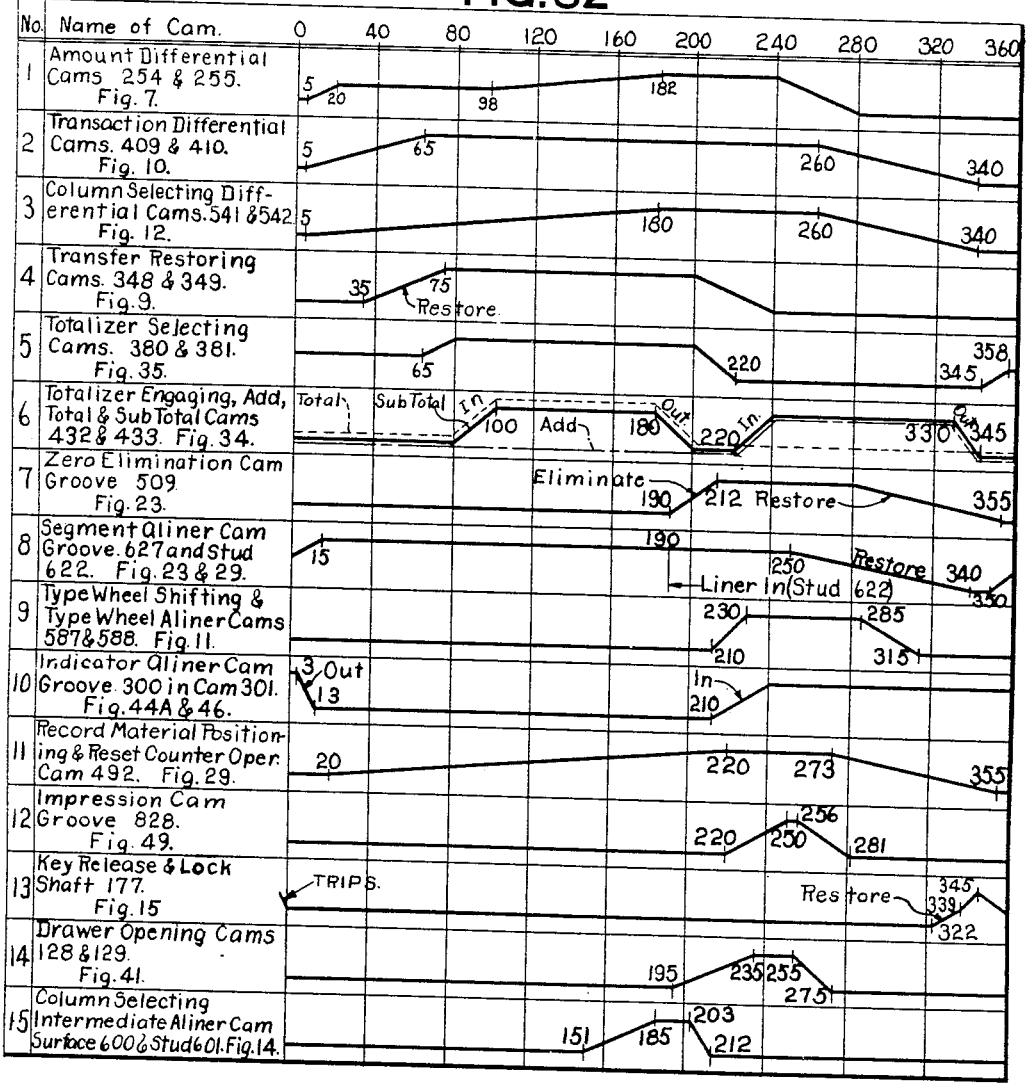

June 22, 1948. E. J. CAREY ET AL 2,443,652
TOTALIZER ENGAGING MECHANISM
Filed Feb. 10, 1942
22 Sheets-Sheet 22

Edward J. Carey
and John B. Geers, Deceased
By John H. More
Special Administrator
Inventors By Carl Benet
Their Attorney Patented June 22, 1948

2,443,652

UNITED STATES PATENT OFFICE 2,443,652

TOTALIZER ENGAGING MECHANISM

Edward J. Carey, Dayton, Ohio, and John B. Geers, deceased, late of Dayton, Ohio, by John H. More, special administrator, Cincinnati, Ohio, assignors to The National Cash Register Company, Dayton, Ohio, a corporation of Maryland Application February 10, 1942, Serial No. 430,214

19 Claims. (Cl. 235—2)

The present invention relates to combined cash registers and adding machines and is particularly directed to improvements in the type of machine disclosed in the application for Letters Patent of the United States, Serial No. 191,169, filed February 18, 1938, by B. M. Shipley, now United States Patent No. 2,286,116, issued June 9, 1942.

The present application is a parent application which discloses but does not claim the subject matter claimed in the divisional application for Letters Patent of the United States, Serial Number 654,645, filed March 15, 1946, by Joseph J. Klosterman, deceased, and divisional application, Serial Number 656,326, filed March 22, 1946, by Frederick Gantner, Joseph J. Klosterman, deceased, and John B. Geers, deceased.

One of the chief objects of the present invention is the provision of a small, compact, efficient, and readily portable combined cash register and adding machine for use in filling stations, beauty parlors, dry cleaning establishments, and analogous businesses.

Another object is to provide a machine of the above type with a simplified column printing device for entering various items in corresponding columns of multi-column record material.

Another object is to provide novel controlling means for causing the machine to function either as a cash register or as an adding machine.

Still another object is the provision of novel means to simplify the construction and to improve the operation of the differential mechanism, the totalizer mechanism, and the controlling mechanisms therefor.

A further object is to provide novel record material supporting means for moving the record material from reading position to printing position and return and for feeding said record material, said record material supporting means being readily removable from the machine for adjustment and for the convenient removal and insertion of the record material.

A further object is to supply novel means to press the record material against the printing wheels to secure a permanent record of each transaction.

Another object is to provide a unit keyboard assembly in which all the various rows of keys and their detents and control plates are assembled in a single compact unit, which unit may be readily removed from the machine for adjustments of any nature either to the machine proper or to the keyboard assembly.

Other objects of the present invention are the provision of various interlocks to prevent maloperation of the machine, to furnish improved means to eliminate the printing of zeros, to provide key-operated means to disconnect the machine proper from the drawer cabinet base, to provide key-operated means to advance the record material manually, and to provide means for unlocking a closure giving access to the record material mechanism when the machine is conditioned for a reading or resetting operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a diagrammatic view of the keyboard of the machine of this invention.

Fig. 3 is a facsimile of a fragmentary portion of the multi-column record material used in the machine of this invention and illustrates one method of using the machine as a regular business machine or cash register.

Fig. 4 is a facsimile of another fragmentary portion of the record material, illustrating the use of the machine as an adding machine in the recapping of various transactions to secure item totals thereof.

Fig. 5 is a facsimile of still another fragmentary portion of the record material, further illustrating the use of the machine as an adding machine for securing a grand total of the various item totals.

Fig. 6 is a cross-sectional view taken just to the right of the ten-cent amount bank, showing said amount bank, the differential mechanism associated therewith, and the indicators and the printing and totalizer mechanisms actuated by said differential mechanism.

Fig. 7 is a detail view of the differential mechanism for the ten-cent amount bank.

Fig. 8 is a detail view of the differential latch mechanism for the ten-cent amount bank.

Fig. 9 is a detail view of the tens transfer mechanism for the ten-cent amount bank.

Fig. 10 is a cross-sectional view of the machine, taken just to the right of the transaction bank and showing said bank and the differential mechanism associated therewith.

Fig. 11 is a detail view of the mechanism for alining the printing wheels, including the shiftable column printing wheels.

Fig. 12 is a cross-sectional view of the machine, taken just to the right of the column selecting bank and showing said bank and the differential mechanism associated therewith.

Fig. 13 is a detail view of a portion of the differential mechanism for the column selecting keys.

Fig. 14 is a detail view of the aliner mechanism for the column selecting mechanism.

Fig. 17 is a detail plan view of the control plates for the transaction bank and the column selecting bank.

Fig. 18 is a side view of the control plates shown in Fig. 17, showing how said plates control the releasing of the machine for operation.

Fig. 19 is a detail view of a portion of the mechanism for engaging the totalizer wheels with the amount actuators.

Fig. 20 is a detail view of the cam mechanism for operating the aliner for the totalizer wheels.

Fig. 21 is a detail view of the aliner for the totalizer wheels.

Fig. 22 is a fragmentary plan view of the totalizer assembly.

Fig. 23 is a left side elevation of the mechanism for eliminating the printing of zeros in one of the amount banks.

Fig. 24 is a left side elevation of the special counter mechanism.

Fig. 25 is a detail view, as observed from the right of the machine, showing a portion of the mechanism for moving the record material from reading position to printing position and for automatically advancing or line-spacing said record material.

Fig. 26 is a fragmentary plan view of a portion of the receiving roll for the record material and the mechanism for rotating said receiving roll to line-space the record material.

Fig. 27 is a detail view of a portion of the mechanism shown in Fig. 26 for automatically rotating the receiving roll for the record material.

Fig. 28 is a plan view of a portion of the machine, showing in particular the totalizer and one of the differential mechanisms associated therewith, the printing wheels, and a portion of the mechanism for positioning the column printing wheels.

Fig. 29 is a left side elevation of the slide for controlling the function of the machine, and of a part of the mechanism associated therewith.

Fig. 30 is a right side elevation of the control slide and the mechanism associated therewith.

Fig. 31 is a cross-sectional view of the amount bank shown in Fig. 6.

Fig. 32 is an enlarged sectional view of one of the amount keys and the detent and the control plate associated therewith.

Fig. 33 is a plan view of the control plate shown in Fig. 32.

Fig. 37 is a perspective view of the mechanism operated by the total control slide for controlling depression of the keys in the one hundred dollar amount bank and certain of the keys in the transaction bank.

Fig. 38 is a detail perspective view, showing the mechanism operated by certain of the transaction keys for controlling the column selecting mechanism, and the interlocking mechanism between certain of the transaction keys and the amount keys.

Fig. 39 is a detail view of mechanism controlled by the column selecting and transaction banks for unlocking the key lock shaft.

Fig. 40 is a detail view of the manual key releasing mechanism.

Fig. 41 is a right side elevation of the cash drawer releasing mechanism and the manually operated mechanism for unlocking the machine proper from the cash drawer base.

Fig. 42 is a detail view of a portion of the mechanism for unlocking the machine proper from the cash drawer base or cabinet.

Fig. 43 is a detail view of the latch for holding the cash drawer in closed position.

Figs. 44—A and 44—B together constitute a side spacing view, as observed from the back of the machine, showing in particular the main cam shaft and the indicator mechanism.

Fig. 45 is a left side elevation of one of the amount indicators and the alining mechanism associated therewith.

Fig. 46 is a detail view of the cam mechanism for operating the indicator aliner mechanism shown in Fig. 45.

Fig. 47 is an end view, as observed from the right of the machine, of the removable framework for supporting the record material mechanism.

Fig. 48 is a right-hand end view of a portion of the rockable record material framework, showing said framework and the mechanism supported thereby in normal or reading position.

Fig. 49 is a right-hand end view of the mechanism of Fig. 48 after it has been moved from normal position to working or printing position.

Fig. 50 is a front elevation of the removable record material supporting framework.

Fig. 51 is a detail view of the mechanism for manually rotating the record material receiving roll to advance the record material.

Fig. 52 is a time chart giving in graphic form the timing of the different cams for operating the various mechanisms of the machine.

Figure 53:
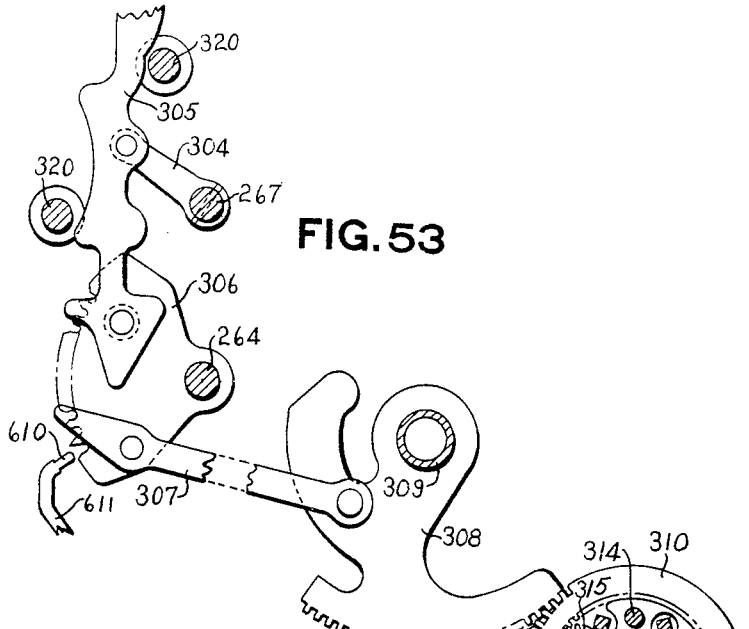

Fig. 53 is a left side elevation of the mechanism controlled by the amount bank shown in Fig. 6, for positioning the type wheel for this amount bank.

Figure 54:
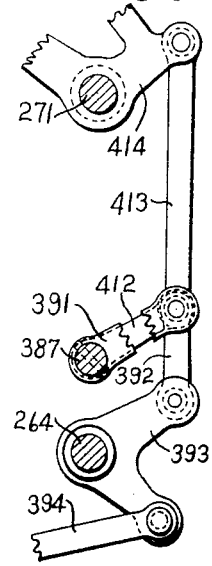

Fig. 54 is a right-hand elevation of a portion of the mechanism controlled by the transaction bank shown in Fig. 10, for transmitting the positioning of the differential mechanism of this bank to the transaction indicators.

Figure 34:
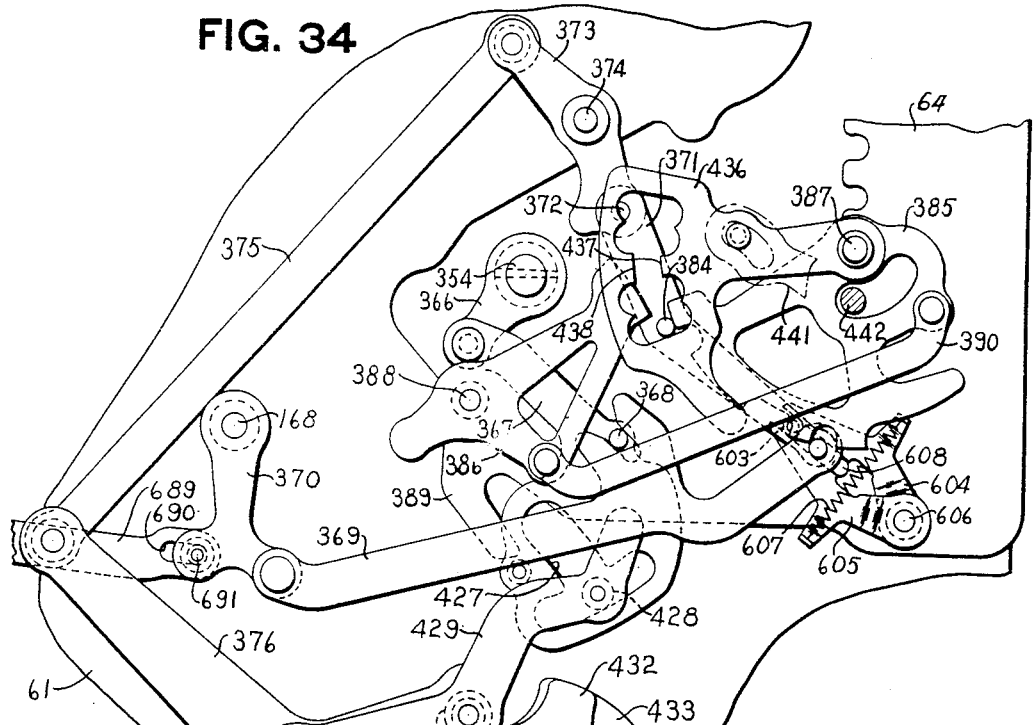
Fig. 34 is a right side elevation of the mechanism for selectively controlling the engaging and disengaging movements of the totalizer, and the mechanism for imparting the engaging and disengaging movements to said totalizer.
Figure 55:
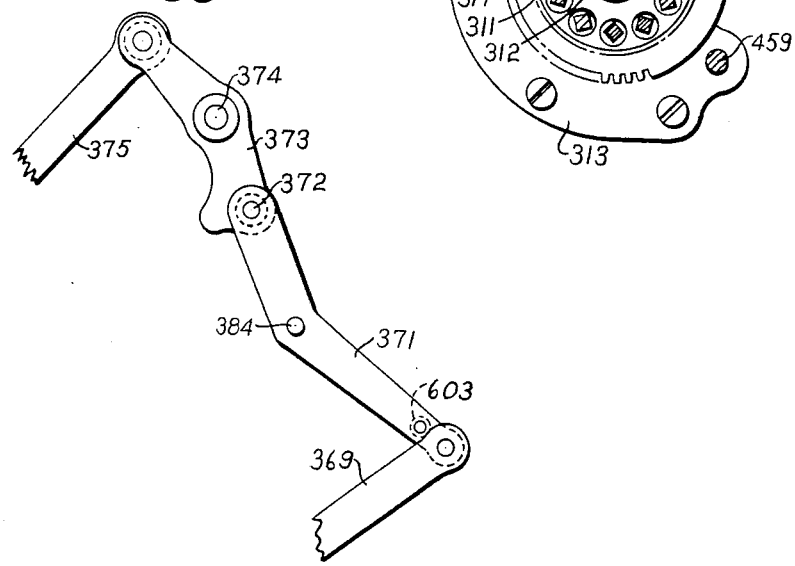

Fig. 55 is a detail view of a portion of the mechanism shown in Fig. 34, for controlling the engaging and disengaging movement of the totalizer.

Fig. 56 is a side spacing view of the mechanism for supporting the left-hand end of the record material receiving roll, and the ratchet mechanism for manually line-spacing said receiving roll.

GENERAL DESCRIPTION

As previously explained, the present invention is directed to a small, compact, efficient, and readily portable combined cash register and adding machine particularly adapted for use in such business concerns as filling stations, beauty shops, dry cleaning establishments, drug stores, etc.

The machine is normally attached to a base containing a cash drawer. However, when it is desired to use the machine as an adding machine, depression of a key, conveniently located on the keyboard, unlocks the machine from the drawer base, after which said machine may be readily lifted from said base and transported to the location where it is desired to use said machine as an adding machine.

The machine of this invention is arranged to be normally operated by electrical means; however, manual means is provided for operating the machine when necessary or desirable.

As presently constructed, the machine embodying this invention has five rows of adding or amount keys, four rows of ledger or number-printing keys, one row of transaction keys, and one row of column selecting keys.

The functioning of the machine, either as a cash register or as an adding machine, is controlled by a total control slide conveniently located on the left-hand side of the keyboard. The total control slide has four positions; namely, Register, Lock register, Read total, and Add and reset. The total control slide is provided with a lock having two keys, either of which may be used to lock the control slide in either Register position or Lock register position. One of the keys permits the total control slide to be moved to Add and reset position and is known as the Reset key. The other key, which is known as the Read key, does not permit the total control slide to be moved to Add and reset position, but only to Read total position. When the total control slide is in Register position, the machine functions as a cash register, and when said control slide is in Add and reset position, the machine functions as an adding machine.

When the machine is used as a cash register, the fifth or highest order row of amount keys is locked against depression, and only the four lower order rows of amount keys may be used for registering amounts, thus providing a maximum registering capacity of $99.99. When the machine is used as an adding machine, the fifth row of amount keys is unlocked, thus giving the keyboard a capacity of $999.99. This change in keyboard capacity is controlled by the total control slide, and when said slide is in Register position, the fifth or highest order row of adding or amount keys is locked against depression, and when said total control slide is in add and reset position, the fifth row of adding or amount keys is unlocked.

The total control slide, in addition to controlling the functions of the machine as a cash register or adding machine, likewise controls the engaging or disengaging of a totalizer having a wheel for each of the five amount banks and a sixth order wheel which is used to receive overflow amounts from the fifth order. When the total control slide is in Register position, the totalizer wheels are engaged with and disengaged from the amount actuators in adding time, and when said slide is in Lock register position, all the keys on the keyboard are locked against depression and the machine is locked against release. When the total control slide is in Read total position, operation of the machine causes the totalizer to be read automatically, and when said control slide is in Add and reset position, the machine functions as an adding machine, and in this case the totalizer is engaged with and disengaged from the actuators in adding time. When the total control slide is in Add and reset position and the machine is being used as an adding machine, the totalizer may be read or reset by depression of the Sub-total key or of the Total key prior to operation of the machine. When the total control slide is in any other position than Add and reset, the Sub-total key and the Total key are locked against depression.

The differential mechanisms for the five rows of adding or amount keys, in addition to controlling the positioning of their corresponding totalizer wheels, also control the positioning of corresponding type wheels for printing records upon record material. Also, the differential mechanisms for the four lower order rows of amount keys control the positioning of corresponding indicator wheels, which are visible through apertures in the front and back of the upper portion of the machine cabinet, for indicating amounts when the machine is used as a cash register. The type wheels for the four lower order rows of amount keys are mounted in a framework, which is shiftable laterally from a normal printing position to any one of eight columnar printing positions for the classifying of items when the machine is used as a cash register. The columnar positioning of the framework for the four lower order amount type wheels is controlled by the row of column selecting keys, which row is located on the right-hand side of the keyboard. The transaction keys, including the Sub-total key and the Total key, control the positioning of corresponding indicators and corresponding type wheels for indicating and recording the type of transaction being performed.

The record material, a fragmentary portion of which is shown in Fig. 3, is comparatively wide and is divided into nine vertical columns, the extreme left-hand column of which is considerably larger than the other eight columns and is used for the printing of the ledger numbers and all other identifying data, as well as amounts. In addition, the left-hand column is used for the autographic entering of identifying data opposite the printed entries. Likewise, all sub-totals and totals are printed in this wide left-hand column, and when the machine is used as an adding machine, it is possible to print any amount desired in this left-hand column.

When the machine is used as a cash register, cash and charge items cannot be printed in the left-hand column and therefore must be printed in one of the other eight columnar positions located to the right thereof. When the machine is used as a cash register, received-on-account and paid out items may be printed in the left-hand column or in any desired one of the other eight columns of the record material. However, no sale items are invariably printed in the left-hand column.

The web of the record material is contained on a supply roll and is unwound therefrom and threaded around various guide rods, between the impression mechanism and the printing mechanism, and thence onto a receiving roll. The entire record material mechanism, including the supply roll, the receiving roll, the guiding means therefor, and the impression platen, is mounted in a framework, which is rockable from a normal or reading position to a working or printing position and return, to move the record material to and from printing position without the necessity of sliding the web of said record material over stationary guides and supports. When the record material is in reading position, the last few entries thereon are visible through an opening in a closure of the cabinet, which closure gives access to the record material mechanism. Likewise, the autographic portion of the record material is accessible through said opening for the autographic entering of descriptive data thereon.

The rockable framework which supports the record material is in turn supported by a framework which is removably mounted in the front of the machine and which is accessible through the closure described above. The closure which gives access to the record material mechanism is normally locked in closed position, but is automatically unlocked when the total control slide is moved to either Read total position or Add and reset position. When the closure is opened, the removable framework may be easily removed from the machine, and, as this framework carries the rockable framework, the entire record material assembly, including the supply roll and the receiving roll, may be quickly and conveniently removed from the machine for the changing of record material or for the making of adjustments to the record material mechanism. As the record material framework is rocked from reading position to printing position, a portion of the guiding means for the web of the record material is momentarily retracted, to release the tension on the web of said record material, and, while the tension is thus released, the automatic means for rotating the record material receiving roll functions to line-space said record material. A key, located on the left-hand side of the keyboard, is provided for actuating mechanism which rotates the record material receiving roll for manually advancing or line-spacing said record material.

A special counter, which is controlled by the total control slide, automatically counts one each time said slide is moved to Add and reset position.

A legend indicator, located just to the right of the column selecting keys, is provided for visibly indicating the items to be recorded in the various columns of the record material.

In the ensuing pages, the mechanisms described in general above, which are pertinent to the present invention, will be described in detail.

Detailed Description

Machine framework

The mechanism of the machine is supported by two main frames, 60 and 61 (Figs. 12, 28, 44—A, and 44—B), secured to a machine base 62. The indicator mechanism and a part of the printer positioning mechanism are supported by auxiliary frames 63 and 64, secured, respectively, to the main frames 60 and 61. The base plate 62 fits in and is secured to a pan-shaped bottom piece 65 (Fig. 41), which in turn rests on the top surface of a drawer cabinet 66 (Fig. 1), which supports a cash drawer 67, and said drawer cabinet is in turn secured to a wood base 68. The mechanism of the machine is enclosed in a suitable cabinet 69, which is secured to the upturned edge of the bottom pan 65.

The machine is removably secured to the drawer cabinet 66 (Figs. 1 and 41) by means of two studs 70, only one here shown, secured in said cabinet and extending through holes in the base 62, said studs having tapered heads adapted to pass easily through clearance holes 71 (Figs. 41 and 42) in a locking slide 72 slidably mounted on the base plate 62 by means of parallel slots therein in cooperation with screw studs 73 threaded in said base plate 62. A spring 74 urges the slide 72 upwardly, as viewed in Fig. 42, to normally maintain the lower edges of the holes 71 in engagement with annular grooves formed by the heads of the studs 70, to secure the machine to the drawer cabinet 66.

An extension of the slide 72 carries a roller 75, which cooperates with a camming surface 76 on a cam arm 77 free on a stud 78 in the frame 60. A link 79 connects the arm 77 to a bell crank 80 free on a stud 81 in the frame 60. The bell crank 80 has a substantially horizontal slot 82, through which extends a stud 83 near the lower end of a link 84, the lower end of which link is bifurcated to straddle a stud 85 in the frame 60, while the upper end of said link is pivotally connected to one arm of a lever 86 free on a shaft 87 journaled in the frames 60 and 61. Another extension of the lever 86 has a slot which straddles a stud 88 in the lower end of the stem of a base lock key 89 (Figs. 2 and 41) having parallel slots which, in cooperation with studs 90 secured in the frame 60, slidably support said key 89. A fingerpiece 91 of the key 89 extends through the keyboard plate near the upper left-hand corner of said plate.

Depression of the base lock key 89 rocks the lever 86 (Fig. 41) counter-clockwise to lift the link 84, to cause the stud 83 to rock the bell crank 80 also counter-clockwise, which movement is transmitted to the arm 77 by the link 79. Counter-clockwise movement of the arm 77 causes the camming surface 76, in cooperation with the roller 75, to shift the slide 72 downwardly, as viewed in Fig. 42, against the action of the spring 74, to disengage the lower edges of the holes 71 from the annular grooves in the studs 70 and to move said holes into alinement with the heads of their respective studs 70. This permits the machine to be lifted from the drawer cabinet 66 when it is desired to use said machine as an adding machine instead of a cash register.

When the machine is again placed upon the drawer cabinet 66, the tapered heads of the studs 70 shift the slide 72 downwardly, as viewed in Fig. 42, against the action of the spring 74, until the annular grooves in said studs move in alinement with said slide 72, whereupon the spring 74 returns said bar into engagement with said annular grooves to lock the machine in place upon the drawer cabinet 66.

Means under control of the total control slide is provided for locking the base lock key 89 (Fig. 41) against depression when said total control slide is in Register or Lock register position.

Referring to Figs. 29, 30, and 41, a total control slide 92 is slidably mounted on the left side frame 60 in a manner to be described later, and said total control slide supports a lock having a rotary locking bolt 93 with a locking lug thereon adapted to engage notches 94 and 95 in a locking plate 96 when said bolt 93 is rotated by the possessor of a key to said lock. The plate 96 is secured on a pair of studs 97 in the frame 60, and the notches 94 and 95 in said plate correspond, respectively, to the Register position and the Lock register position of the slide 92, so that said slide may be locked in either of these positions by the possessor of a key to the lock in said slide.

A bar 98 is slidably supported by means of parallel slots therein in cooperation with the studs 97, and a spring 99 urges said bar toward the right, as viewed in Fig. 41, to normally maintain two notches in the upper edge thereof, which correspond to the notches 94 and 95 in the plate 96, in alinement with said notches 94 and 95. The bar 98 carries a stud 100, which is straddled by the bifurcated arm of a bell crank 101 free on a stud 102 secured in the frame 60. The other arm of the bell crank 101 carries a stud 103, which underlies an extension 104 of the key 89.

When the control slide 92 (Fig. 41) is in either Register position or Lock register position, operation of the lock bolt 93 causes a locking projection on said bolt 93 to engage the corresponding one of the notches 94 or 95 to lock said bar in either of said positions, and, at the same time, said locking projection engages the corresponding one of the notches in the bar 98 to lock the base lock key 89 against depression when said total control slide 92 is in either of the above positions. When the lock in the control slide 92 is unlocked, the bar 98 is free to move forwardly against the action of the spring 99 and therefore does not prevent depression of the base lock key 89.

*Drawer operating mechanism*

Mechanism is provided for opening the cash drawer automatically each time the machine is operated. In this particular adaptation of the machine, no manual means is provided for opening the cash drawer.

Directing attention to Figs. 41 and 43, the cash drawer 67, which, as previously explained, is slidably supported in the drawer cabinet 66, has a catch 105 secured to the back panel thereof, adapted to be engaged by a latch 106 free on a shaft 107 journaled in a frame 108 supported by the cabinet 66. A spring 109 urges the latch 106 counterclockwise to normally maintain a downward extension thereof in contact with a portion 110 of the frame 108. An upward extension 111 of the latch 106 cooperates with a stud 112 in a crank 113 secured on the shaft 107. Also secured on the shaft 107 is a crank 114 (Fig. 41) having a stud 115 embraced by a slot in a drawer release arm 116 free on a stud 117 in an extension of the frame 108.

A forwardly extending finger 118 of the arm 116 cooperates with the lower end of a plunger 119 free in a bushing 120 secured in the machine base 62. The upper end of the plunger 119 is secured in a cap 121 having therein a clearance boring which fits freely over the upper end of the bushing 120. The upper surface of the cap 121 cooperates with the rounded nose of an arm 122 free on the stud 85. The arm 122 is connected by a link 123 to a cam lever 124 free on a stud 125 in the left frame 60. The lever 124 carries rollers 126 and 127, which cooperate respectively, with the peripheries of companion plate cams 128 and 129 secured on a main cam shaft 130 journaled in the main frames 60 and 61.

During each machine operation, the main cam shaft 130 is driven one clockwise (Fig. 41) revolution by mechanism presently to be described, to cause the cams 128 and 129 to rock the lever 124 first clockwise and then back to normal position according to the time given in space 14 of the chart (Fig. 52). This movement of the lever 124, through the link 123, rocks the arm 122 first counter-clockwise and then back to normal position.

Initial movement counter-clockwise of the arm 122 (Figs. 41 and 43) causes the rounded nose thereof, in cooperation with the cap 121, to depress the plunger 119 to rock the arm 116 counter-clockwise to cause said arm to rock the crank 114, the shaft 107, and the crank 113 clockwise. Clockwise movement of the crank 113, through the stud 112 in cooperation with the extension 111, carries the latch 106 in unison therewith, against the action of the spring 109, to disengage said latch from the catch 105. This releases the drawer 67 to the action of a spring 131, the rearward end of which is secured to the frame 108, which spring immediately opens the cash drawer. When the cams 128 and 129 return the parts to normal position, as here shown, the spring 109 returns the latch 106 into latching position, so that, when the drawer 67 is closed, the beveled edge of the catch 105, in cooperation with the beveled nose of the latch 106, will cause said catch to by-pass said latch, whereupon the spring 109 returns said latch to effective position to latch the drawer in closed position. A fixed stud 132 (Fig. 41) in the frame 60, in cooperation with a slot in the arm 122, limits the movement of said arm in either direction.

*Bell ringing mechanism*

Each time the drawer opening mechanism functions, it operates a hammer, which rings a bell to call attention to the fact that the cash drawer 67 is being opened.

Secured on the shaft 107 (Figs. 41 and 43) is a crank 133 carrying a stud 134, which rotatably supports a bell ringing pawl 135, the upper end of which pawl is arranged to cooperate with a square stud 137 in a bell hammer 138 free on a stud 139 in an extension of the frame 108. A spring 140 urges the hammer 138 clockwise to normally maintain a depending surface thereof in contact with the upper surface of a square stud 141 secured in the frame 108. The stud 141 normally holds the hammer 138 a slight distance away from a bell 144 secured to the frame 108, so that the sound of said bell will not be muffled.

Initial movement clockwise of the shaft 107 and the crank 133, under influence of the cams 128 and 129 (Fig. 41), causes the pawl 135 to engage the stud 137 and carry the hammer 138 counter-clockwise against the action of the spring 140. Continued movement of the parts causes the upper end of the pawl 135 to ride off of the stud 137 to release the hammer 138 to the action of the spring 140, which causes said hammer to strike the bell 144 at approximately the same time the latch 106 is disengaged from the catch 105, to call attention to the fact that the cash drawer 67 is being opened. Although the hammer 138 strikes the stud 141 before said hammer strikes the bell 144, there is enough resiliency in the parts, acting under the influence of momentum, to permit said hammer to strike said bell. Upon return movement counter-clockwise of the shaft 107 and the crank 133, the pawl 135 by-passes the stud 137 and moves beneath said stud, as here shown, when the parts are fully restored to normal position.

*Operating mechanism*

Under normal conditions, a conventional type of electric motor 145 (Fig. 15) drives the main shaft 130 one clockwise revolution each machine operation. However, an operating handle 864 is provided for driving said main shaft when necessary or desirable.

The electric motor 145 is secured to the right frame 61, and said motor has an armature shaft 146 having secured thereon a pinion 147, which meshes with a gear 148 free on a stud 149 secured in the frame 61. The gear 148 has integral therewith a four-toothed ratchet 150, the teeth of which cooperate with a shoulder 151 on a clutch pawl 152 free on a stud 153 in a clutch disk 154 free on the stud 149 and secured to a gear 155 also free on the stud 149. The gear 155 meshes with a similar gear 156 secured to the main shaft 130. The train of gearing and the clutch mechanism just described constitute a driving connection between the motor 145 and the main shaft 130.

Figure 15:
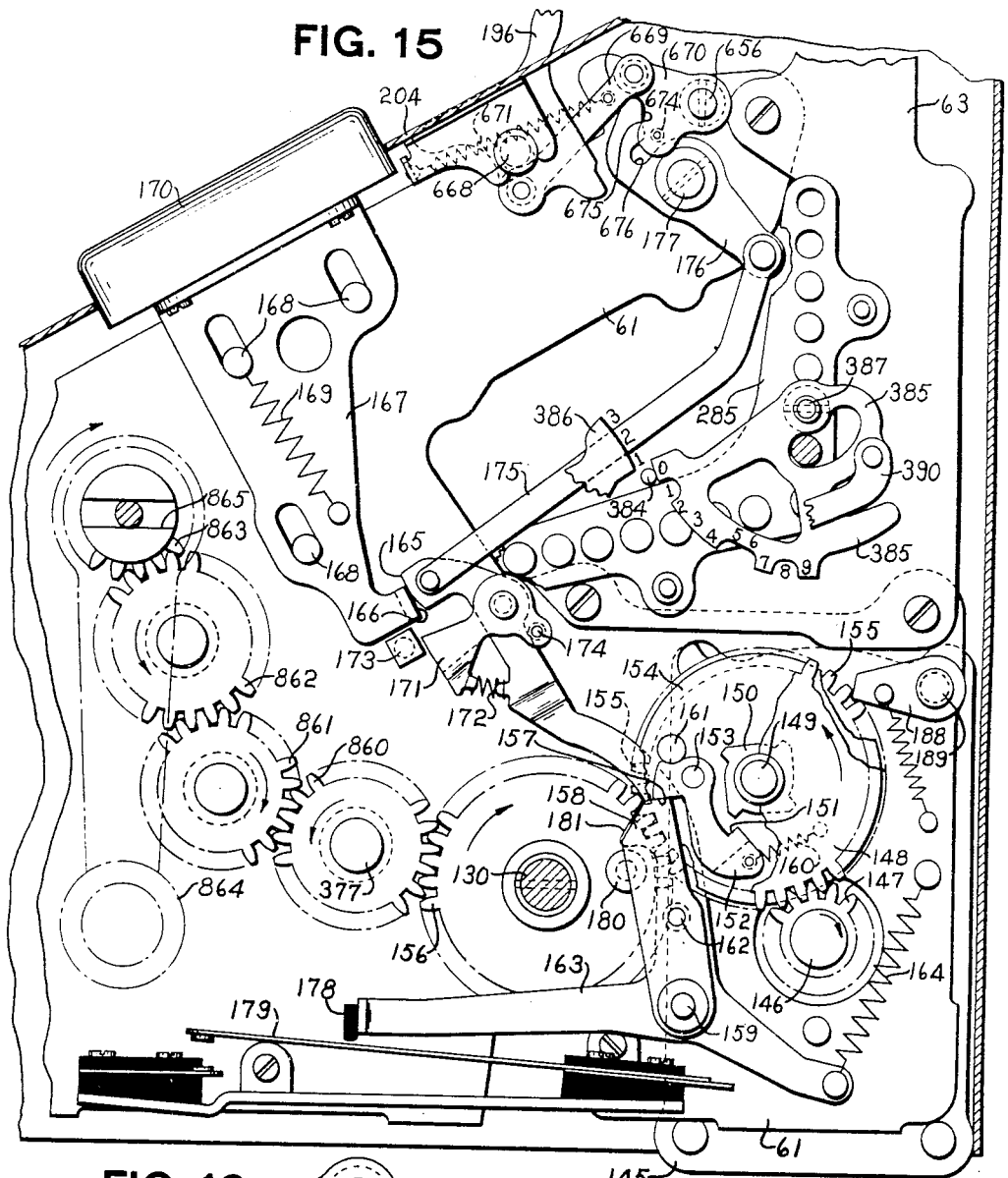
Fig. 15 is a right side elevation of the machine, showing in particular the machine releasing and operating mechanisms.

When the machine is at rest, or in home position, as shown in Fig. 15, a surface 157 on the pawl 152 is engaged by the upper end of a clutch control arm 158 free on a stud 159 in the frame 61, to retain said pawl in its clockwise or disengaged position against the action of a spring 160, which position is determined by a curved surface on said pawl 152 contacting a stud 161 in the disk 154, so that the shoulder 151 will be held out of the path of the teeth of the ratchet 150.

The arm 158 is fixedly connected, by a stud 162, to a clutch control lever 163 free on the stud 159, and said lever 163 is urged counter-clockwise by a spring 164 to normally maintain a surface 165 on an upward extension of the lever 163 in engagement with a bent-over ear 166 on a motor release or starting bar 167. The bar 167 is slidably mounted, by means of parallel slots therein in cooperation with studs 168 fast in the frame 61, and said bar is normally maintained in its upward or undepressed position by a spring 169. A fingerpiece 170 of the starting bar 167 projects through an opening in the keyboard top plate and is conveniently located on the right-hand side of the keyboard. Pivotally mounted on the upward extension of the lever 163 is a non-repeat pawl 171 urged clockwise by a spring 172 into the path of a square stud 173 secured in the right frame 61. A stud 174, carried by the pawl 171, engages the edge of the lever 163 to limit the clockwise movement of said pawl under influence of the spring 172.

When the machine is at rest, the spring 164 (Fig. 15) urges the lever 163 counter-clockwise to normally maintain the surface 165 in engagement with the ear 166. When the surface 165 is in engagement with the ear 166, the end of the non-repeat pawl 171 is retained a slight distance away from the stud 173 to provide clearance between said pawl and said stud. A link 175 (Fig. 15) connects the upper extension of the lever 163 to an arm 176 secured to a key lock shaft 177 journaled in the frames 60 and 61.

Before the machine can be released for operation, it is necessary that the key lock shaft 177 be free to rock in a clockwise direction. For example, the key lock shaft 177 is locked against releasing movement when the total control slide 92 is being moved from one position to another, when an amount key is partially depressed, and when the proper transaction and column selecting keys are not depressed in registering operations. The locking mechanism for the key lock shaft, controlled by the transaction and column selecting keys, is rendered inoperative when the total control slide is moved to Add and reset position.

When the key lock shaft 177 and the arm 176 are locked against releasing movement clockwise, the link 175 holds the lever 163 against releasing movement counter-clockwise, under influence of the spring 164, when the release bar 167 is depressed. In this case, a lower angular portion of the surface 165 on the upward extension of the lever 163 prevents the ear 166 from nibbling or catching on the edge of said surface when the release bar 167 is returned upwardly by the spring 169.

When the key release shaft 177 and the arm 176 are free to move in a releasing direction, depression of the release bar 167 causes the ear 166 to move beneath the surface 165 and into alinement with a clearance portion of the lever 163, and simultaneously causes said ear to engage and rock the non-repeat pawl 171 out of engagement with the stud 173. This frees the lever 163 to the action of the spring 164, which immediately rocks said lever and the arm 158 counter-clockwise to disengage the upper end of said arm from the surface 157 on the clutch pawl 152. This releases said pawl 152 to the action of the spring 160, which immediately rocks said pawl counter-clockwise, as here viewed, to move the shoulder 151 into the path of the four teeth of the ratchet 150. Simultaneously with the disengaging of the arm 158 from the pawl 152, a block 178 of insulation material, secured to a forward arm of the lever 163, deflects the spring fingers 179 of a motor switch mechanism to complete an electrical circuit to the motor 145 to cause the armature shaft 146 and the pinion 147 to revolve in a clockwise direction. The pinion 147 drives the gear 148 and the ratchet 150 in a counter-clockwise direction, causing one of the four teeth on said ratchet to engage the shoulder 151 and carry the disk 154 and the gear 155 counter-clockwise in unison therewith. The gear 155 rotates the gear 156, which has exactly the same number of teeth as said gear 155, in a clockwise direction.

As the gear 156 and the main shaft 130 near the end of one revolution, a roller 180, carried by said gear 156, engages a camming surface 181 on the upward extension of the lever 163 to rock said lever and the arm 158 clockwise against the action of the spring 164 to release the switch 179 and to move the upper end of said arm 158 into the path of the surface 157 of the pawl 152. Continued rotation of the disk 154 causes the surface 157 on the pawl 152 to engage the upper end of the arm 158 to rock said pawl clockwise to disengage the shoulder 151 from the ratchet 150, to release the clutch mechanism to terminate clockwise movement of the main shaft 130, after said shaft has completed one revolution. Clockwise restoring movement of the lever 163 moves the non-repeat pawl 171 well beyond the stud 173, so that the spring 172 will restore said pawl clockwise into the path of said stud to retain said clutch lever 163 in restored position, when the roller 180 moves beyond the camming surface 181 and opposite a clearance portion of said lever.

In case the motor release bar 167 is retained depressed at the end of a machine operation, the roller 180 restores the lever 163 a sufficient distance clockwise to permit the pawl 171 to move beyond the ear 166 and come to rest on the stud 173 when said roller 180 moves off of the camming surface 181, to prevent a repeat operation of the machine. When pressure on the bar 167 is released, the spring 169 restores said bar upwardly, causing the ear 166 to engage the surface 165 to retain the parts in the position shown in Fig. 15. When the motor release bar 167 is depressed, the hook-shaped upper end of the upward extension of the lever 163 passes over the ear 166, to retain said release bar in depressed position until said lever 163 is restored by the roller 180, as explained above.

Figure 16:
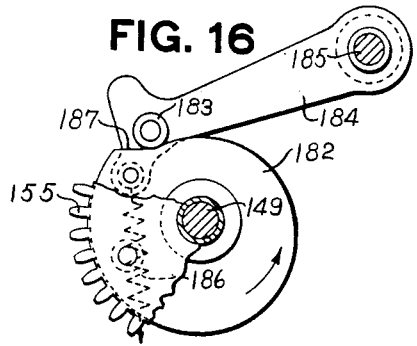
Fig. 16 is a detail view of the mechanism for assisting the machine operating mechanism to home or normal position.

A spring-operated device, shown in Fig. 16, is provided for assisting the clutch mechanism and the main shaft 130 to home position after the electrical circuit to the motor 145 has been broken by the opening of the switch 179 (Fig. 15).

Secured to the gear 155, which constitutes a part of the driven member of the clutch mechanism, is a plate cam 182, the camming surface of which cooperates with a roller 183 carried by an arm 184 free on a stud 185 in the frame 61. A comparatively strong spring 186 maintains the roller 183 in contact with the camming edge of the cam 182. Revolution of the gear 155 and the cam 182 causes the roller 183 to climb the spiral surface of said cam to tension the spring 186. Near the end of machine operation and about the same time that the lever 153 (Fig. 15) is restored by the roller 180 to open the switch 179 and to disengage the pawl 152 from the ratchet 150, the roller 183 rides off the highest part of the cam 182 and onto a declining surface 187, whereupon the spring 186 causes the roller 183, in cooperation with the declining surface 187, to assist the clutch-driven member to home position, as shown in Fig. 15.

A spring-pulled pawl 188 (Fig. 15), pivoted on a stud 189 in the frame 60, cooperates with the teeth of the gear 155 to prevent retrograde movement of said gear and the clutch-driven member to insure that the pawl 152 is retained out of the path of the teeth of the ratchet 150.

A train of gears 860 to 863 inclusive connects the operating handle 864, here shown in dot-and-dash lines (Fig. 15), to the gear 156, so that the machine may be manually operated if necessary or desirable. A hub of the handle 864 has clutch teeth therein, which engage a clutch cut 865 in a hub of the gear 863, to form a disengageable connection which prevents the handle 864 from being rotated when the machine is operated electrically.

The hub of the handle 864 projects through an opening in the cabinet 69, which opening is closed by a plate 866 (Fig. 1) when the handle is not used in the normal operations of the machine.

*Keyboard*

Figure 1:
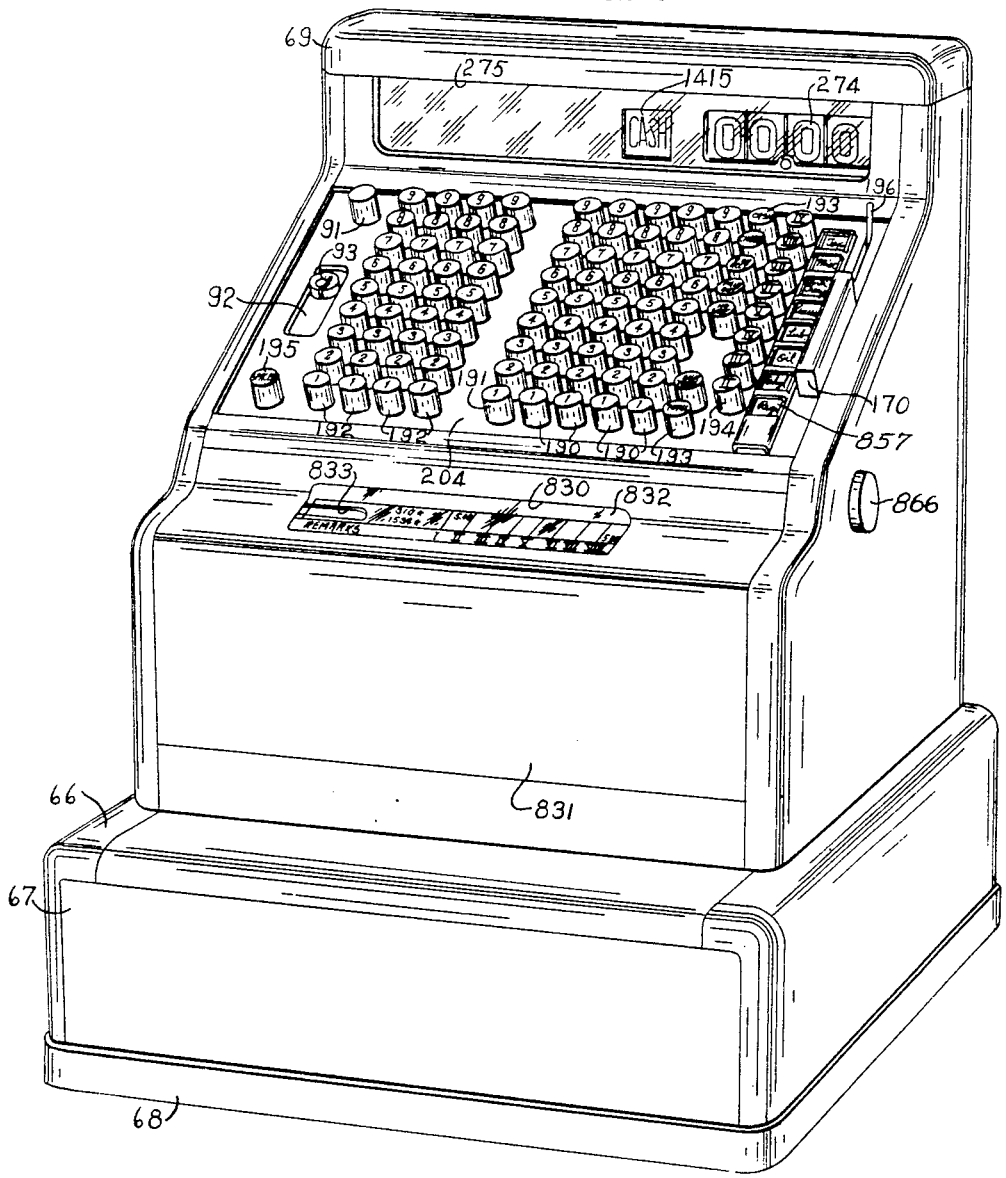
Fig. 1 is a perspective view of the complete machine embodying the present invention.

Directing attention to Figs. 1 and 2, the keyboard of the present machine comprises four rows of amount keys 190, giving a maximum registering capacity of $99.99; one row of adding keys 191 used in conjunction with the amount keys 190 when the machine is used as an adding machine, to increase the keyboard capacity to $999.99; four rows of number printing keys 192 used in conjunction with the keys 190 and 191 for printing identifying numbers; and one row of transaction keys 193 for controlling the positioning of a corresponding printing wheel to record the type of transaction being performed and also for controlling the functioning of a single totalizer with which the machine is equipped. The keyboard also comprises a row of column selecting keys 194 (Fig. 2) for selectively controlling the shifting of the four amount type wheels corresponding to the four rows of amount keys 190, to cause various items to be printed in corresponding columns of the record material; a space key 195 for manually line-spacing the record material; and a key release lever 196 for manually releasing any of the keys when the machine is at rest. The motor bar 167 is provided for initiating machine operation; the control slide 92 for controlling the functions of the machine; and the base lock key 89 for unlocking the machine proper from the cash drawer base or cabinet.

The keys 89 and 190 to 194 inclusive are not assembled in individual banks, as is the usual custom, but, instead, all of said keys are assembled in a single framework (Figs. 6, 12, and 31), which is removable from the machine as a single unit. This type of keyboard construction makes for simplicity and compactness and has all the advantages of the individual bank construction without any of the disadvantages. For example, the keyboard capacity of the machine may be varied to suit different requirements by the simple expedient of adding or removing the desired rows of amount keys. This is likewise true of the number of printing keys 192. Likewise, the number of keys in the transaction row 193 may be varied from the maximum of nine keys down to the number required to meet a particular business system.

The single-unit keyboard framework comprises front and back frames 197 and 198 (Figs. 12 and 31), a partition plate 199 for each row of keys and one at each end of the framework, an upper support plate 200, and a lower support plate 201. All of the above plates are secured together by means of tenon-and-slot connections and by means of small tie rods 202, which pass through holes in the partition plates 199 and are flattened on each end to secure them in place. The keyboard assembly is retained in place on the machine by means of four screws 203, which pass through clearance holes in bent-over ears on the front and back frames 197 and 198 and are threaded into holes in the main frames 60 and 61. All that is necessary to remove the entire keyboard assembly from the machine is to remove the four screws 203.

A keyboard top plate 204 (Figs. 1, 2, 6, and 31) is provided for covering the keyboard framework and for giving a finished appearance to the keyboard assembly. The keyboard top plate 204 has therein clearance openings for clearing the tips of all of the keys of the keyboard and, in addition, has openings for the total control slide 92, the motor bar 167, and the manual key release lever 196. The keyboard top plate has four guide studs (not shown), which engage corresponding openings in bent-over portions of the front and back frames 197 and 198, to locate said plate in position, and said plate is retained in position by the machine cabinet, a portion of which, adjacent the opening therein for the keyboard, fits snugly over the keyboard top plate 204.

*Amount keys*

Inasmuch as the key mechanism and the associated differential mechanism are substantially duplicated for each row of amount keys, it is believed that a description of the ten-cent denomination of amount keys, shown in Fig. 6, will suffice for all.

The keys 190 (Figs. 6 and 31) for the ten-cent amount bank are depressibly supported in slots in the plates 200 and 201 and are retained against removal by means of slots therein in cooperation with the corresponding ones of the rods 202. Each of the amount keys 190 is normally retained in undepressed position by a coil spring 205, which extends horizontally through the entire keyboard assembly, there being one such spring for all keys of like numerical order, said springs adapted to be engaged by notches in the keys of the like orders. The springs 205 rest on the top surface of the keyboard plate 200, and when a key is depressed, said spring is forced or tensioned downwardly through an opening in said plate adjacent the key stem, and, when said key is released, the spring 205 returns it upwardly to undepressed position, as here shown.

This type of keyboard spring construction is fully disclosed in United States Patent No. 2,210,099, issued August 6, 1940, to B. M. Shipley, to which reference may be had for a more detailed description of the keyboard spring construction.

Each of the rows of amount keys has a detent 206 (Figs. 7, 31, 32, and 33) for locking the keys in depressed position and a control plate 207 for releasing the zero stop pawls so that the differential mechanisms may move away from zero position and be positioned by the depressed amount keys 190.

Depression of any one of the ten-cent amount keys 190 causes an angular camming surface on a projection 208 thereof, in cooperation with the forward edge of a corresponding slot in the detent 206, to shift said detent forwardly or toward the left, as here viewed, against the action of a spring 209 until said projection passes beneath said detent, whereupon the spring 209 returns said detent rearwardly to lock the depressed key 190 in depressed position. The amount keys are of flexible construction, wherein the depression of a key releases a previously depressed key in the same order, and so on.

The control plate 207 (Figs. 31 and 32) lies directly beneath the detent 206, and depression of any one of the amount keys 190 causes the camming surface of the projection 208 thereon, in cooperation with the edge of a corresponding slot in the plate 207, to shift said plate forwardly and retain said plate in its forward position while said key is depressed. The forward end of the plate 207 underlies a rounded nose 210 on a zero stop pawl 211 free on a shaft 212 journaled in the frames 60 and 61. Forward movement of the plate 207, when an amount key is depressed, rocks the pawl 211 counter-clockwise against the action of a spring 213. Counter-clockwise movement of the zero stop pawl 211 (Fig. 7) rocks a tooth 214 thereon out of the path of a bent-over ear 215 on a differential slide 216 shiftably supported in a framework comprising front and back members 217 and 218 secured, respectively, to inverted U bars 219 and 220, in turn secured to partition plates 221 for each order (only one here shown), said plates in turn mounted on rods 222 and 223 supported by the main frames 60 and 61.

There is one of the differential slides 216 for each denominational order of amount keys, for each row of number printing keys, for the transaction row, and for the column selecting row. The rods 222 and 223 are retained between the side frames 60 and 61 by means of four screws, the removal of which permits the entire differential slide assembly to be removed from the machine. The differential slide 216 (Fig. 7) has thereon four upward projections having ears 224 bent toward the left, said ears adapted to cooperate with the odd-numbered keys 1, 3, 5, and 7, and said slide likewise has four similar projections with ears 225 thereon bent toward the right and arranged to cooperate with the even-numbered keys 2, 4, 6, and 8. The stems of the nine amount keys 190 are staggered, the odd-numbered keys being toward the left and the even-numbered keys toward the right.

Depression of any one of the keys 190, except the 9 key, moves the stem thereof into the path of the corresponding ear 224 or 225 and simultaneously moves the zero stop pawl 211 out of the path of the ear 215, as previously explained. Initial movement rearwardly of the differential slide 216, under influence of the amount differential mechanism, to be described later, causes the ear 224 or 225 to engage the lower end of the stem of the depressed key 190, to position the slide 216 and the corresponding differential mechanism in proportion to the value of the depressed amount key 190. When the 9 key is depressed, the slide 216 travels full distance rearwardly to 9 position, which is determined by a projection 226 thereon coming in contact with a square stud 227 in the left-hand partition plate 221 for this particular denomination.

The slide 216 (Fig. 7) is connected to and positions a corresponding differential mechanism in accordance therewith, after which the corresponding wheel of the totalizer is engaged with said differential mechanism, and return movement of the slide 216 positions said totalizer wheel in accordance with the value of the depressed amount key 190, as will be explained fully later.

*Amount differential mechanism*

The differential positioning of the slide 216 (Figs. 6, 7, and 8) is transmitted to the differential mechanism by means of an arm 230 secured thereto, said arm having a slot which engages a stud 231 in a differential segment 232 free on a rod 233 supported by the frames 60 and 61. The segment 232 has therein an angular slot 234 (Fig. 7), through which extends a stud 235 in a differential latch 236 (Fig. 8) free on a stud 237 carried by a latch plate 238 free on the rod 233. The stud 235 also extends through a slot 239 (Fig. 7) in a latch control plate 240 free on the rod 233, said slot 239 being angularly opposed to the slot 234. A spring 241 urges the segment 232 clockwise and the plate 240 counter-clockwise, creating a scissors action between the slots 234 and 239 and the stud 235 to normally retain the latch 236 in its clockwise position, as shown in Fig. 8, in which position a projection on said latch engages a shoulder 242 on the periphery of a segment 243 also free on the rod 233.

When the latch 236 is in engagement with the shoulder 242, an extension on the plate 238 engages a stud 244 in the segment 243 to form a driving connection between said segment and said plate. The differential drive segment 243 has therein a slot which engages a stud 245 (Fig. 8) in a differential drive arm 246 (see also Figs. 6 and 7) free on a rod 247 supported by the frames 60 and 61. An eccentric 248 adjustably connects the arm 246 to a companion arm 249, also free on the rod 247, and said arm 249, and similar arms for the other differential mechanisms, are connected by a rod 250 to a differential cam arm 251 also free on the rod 247. The cam arm 251 carries rollers 252 and 253, which cooperate, respectively, with the peripheries of companion plate cams 254 and 255 secured to the main shaft 130. The arm 251 (Fig. 7) is located on the left-hand end of the rod 247 and supports the left-hand end of the rod 250, while a similar arm (not shown) is located near the right-hand end of said rod 247 and supports the right-hand end of said rod 250 and carries rollers which cooperate with companion plate cams 256 and 257 (Fig. 44—A), similar in every respect to the cams 254 and 255, the timing of which is given in space 1 of the chart (Fig. 52). The rod 250 forms an operating connection between the arms 249 for the differential mechanisms for the amount keys 190 and 191 and the number printing keys 192, and the cam arms 251.

As previously explained, the main shaft 130 (Fig. 7) makes one clockwise revolution during machine operation. When the machine is in home position, the slide 216 (Fig. 7) is retained one step beyond zero, as here shown, for the purpose of effecting transfers, as will be explained later. At the beginning of machine operation, the cams 254 to 257 inclusive, through the connections here shown, rock the arm 246 a slight distance clockwise to move the segment 243 (Fig. 8) clockwise in unison therewith, which movement is transmitted by the latch 236 to the plate 238. The stud 235, carried by the latch 236, in cooperation with the slots 234 and 239 (Figs. 6, 7, and 8) in the differential segment 232 and the plate 240, carries said parts clockwise in unison therewith. Clockwise movement of the differential segment 232 causes the stud 231, in cooperation with the slot in the arm 230, to shift the slide 216 rearwardly from home position to zero position. While the slide 216 is retained in zero position, the transfer mechanism for this denominational order is restored to untripped position in case it was tripped in the preceding operation.

After the transfer mechanism has been restored, if a key 190 has been depressed, the segment 232 and the slide 216 continue their initial movement under influence of the cams 254 and 255 (Fig. 7) and 256 and 257 (Fig. 44—A) until one of the bent-over ears 224 or 225 comes into contact with the lower end of the stem of the depressed key 190 or, in the case of the 9 key being depressed, the slide 216 is arrested by the stud 227. This obstructs further movement rearwardly of the slide 216 and positions the segment 232 in accordance with the value of the depressed amount key 190. Stopping the segment 232 causes the stud 235 to ride up the inclined surface of the slot 234, against the action of the slot 239 and the spring 241, to disengage the latch 236 from the shoulder 242 (Fig. 8) of the driving segment 243 and simultaneously to engage a tooth 258 on said latch with the corresponding one of a series of alining notches 259 in an arcuate surface of the plate 221, said notches 259 corresponding to the different positions of the slide 216 and the segment 232. This disengaging of the latch 236 disconnects the latch plate 238 from the drive segment 243 to position the differential mechanism in accordance with the value of the depressed amount key 190, said segment 243 being free to complete its initial movement clockwise. When the latch 236 (Fig. 8) is disengaged from the shoulder 242, as explained above, and engaged with the corresponding alining notch 259, an arcuate surface 260 on the segment 243 passes beneath the extension of said latch to lock said latch and the differential mechanism in set positions.

The upper end of a beam 261 (Figs. 6, 7, and 8) is pivotally connected to the plate 238, and, when the arm 246 nears the terminus of its initial movement clockwise, a roller 281, carried thereby, engages an arcuate surface 282 on the forward edge of said beam 261 and forces a curved surface on the inside edge of said beam into engagement with the periphery of a hub 283 free on the rod 233, to position said beam 261 in accordance with the value of the depressed amount key 190. The differential positioning of the beam 261 is transmitted to the indicator mechanism and the printing mechanism in the following manner:

The beam 261 is connected by a link 262 (Figs. 6, 7, 8, 44—A, and 44—B) to a bell crank 263 free on a shaft 264 supported by the frames 63 and 64. The bell crank 263 is connected by a link 265 to a crank 266 secured on a shaft 267 journaled in sub-frames 284 and 285 secured, respectively, to the indicator frames 63 and 64. Also secured on the shaft 267 is a crank 268 connected by a link 269 to an indicator positioning segment 270 free on a rod 271 supported by the frames 63 and 64. Teeth in the segment 270 mesh with a pinion 272 free on a rod 273 supported by the frames 63 and 64, and said pinion 272 is flexibly connected to a front indicator wheel 274 for the ten-cent amount bank. Numbers on the wheel 274, which correspond to the keys 190, are visible through a glass-covered aperture 275 in the front of the cabinet 69. Also secured on the shaft 267 (Figs. 44—A and 44—B) is a crank 276 connected by a link 277 to a segment 278 free on the rod 271 and having teeth which mesh with a pinion 279 flexibly connected to a back indicator 280 for the ten-cent amount bank, said indicator having thereon numbers corresponding to the keys 190, which numbers are visible through a glass-covered aperture 286 in the back of the cabinet 69.

The positioning of the differential mechanism for the ten-cent amount bank and the beam 261 (Figs. 6, 8, 44—A, and 44—B) is transmitted, by the mechanism described above, to the front and back indicators 274 and 280 to position said indicators in accordance with the value of the depressed key 190.

Referring to Figs. 6, 44—A, and 44—B, the shaft 267 and other similar shafts for the other rows of keys have, near each end thereof, annular grooves which cooperate with corresponding notches in the indicator frames 63 and 64 to secure said shafts against lateral displacement while the frames 284 and 285 rotatably support said shaft.

The description above of the linkage for connecting the differential mechanism for the ten-cent amount bank to the corresponding indicators is generally applicable to the other amount banks and the number-printing or ledger banks. However, there is a slight variation in some of the connections, and a good example of this variation is the linkage of the ten-dollar amount bank, which will be described briefly as representative of all the banks varying in linkage from the ten-cent amount bank.

The beam 261 for the differential mechanism for the ten-dollar amount bank (Figs. 6, 44—A, and 44—B) is connected by a link 1262, similar to the link 262, to the lower end of a crank 1263 secured on a transmission shaft 1264 journaled in the frames 284 and 285. The shaft 1264 is one of seven such transmission shafts located adjacent each other in a line which is slightly inclined from the horizontal. Also secured on the shaft 1264 is a crank 1265 connected by a short link 1266 (Fig. 44—A) to a downward arm of a bell crank 1267 similar in outline to the bell crank 263. An upward arm of the bell crank 1267 is connected by a link 1268 to a segment 1269 free on the rod 271 and similar in outline to the segment 270. The segment 1269 has gear teeth which mesh with a pinion integral with a front indicator 1270 for the ten-dollar bank. The shaft 1264 is operatively connected to a back indicator 1271 (Fig. 44—B) for the ten-dollar amount bank by mechanism similar in every respect to that described for the front indicator 1270.

The mechanism described above operatively connects the differential mechanism for the ten-dollar amount bank to the corresponding front and back indicators 1270 and 1271, to cause said indicators to be positioned under influence of the row of ten-dollar keys 190 (Fig. 2) in a manner similar to that described for the ten-cent amount bank.

The shaft 1264 is operatively connected to and positions a corresponding type wheel in a manner similar to that presently to be described for the ten-cent amount bank.

Indicator aliners

After the amount indicators have been positioned in the manner explained above, an alining mechanism functions to hold said indicators in set positions until the beginning of the succeeding operation. Referring to Figs. 44—A, 44—B, 45, and 46, the pinion 272 for the indicator 274 has cooperating with the teeth thereof an aliner pawl 287 secured on a shaft 288 journaled in bushings in the frames 63 and 64. There is an aliner pawl exactly like the pawl 287 for each of the amount indicators. Secured on the left-hand end of the shaft 288, as viewed in Fig. 44—A, is a crank 289 connected by a link 290 to an arm 291 connected by a hub 292, free on the shaft 264, to a similar arm 293. The arm 293 is connected by a link 294 to an arm 295 connected, by a hub 296 free on a stud 297 in the frame 61, to an arm 298. The arm 298 carries a roller 299, which cooperates with a cam groove 300 in one face of a box cam 301 secured on the main shaft 130.

The timing of the cam groove 300 is given in space 10 of the time chart (Fig. 52), from which it will be seen that said groove, through the mechanism shown in Figs. 45 and 46, disengages the pawl 287 from the teeth of the pinions 272 at the beginning of machine operation, and said pawl remains thus disengaged until after the amount differential mechanism has positioned the amount indicators, whereupon the cam groove 300 engages the pawl 287 with the teeth of the pinion 272 to retain the indicator 274 in set position.

Positioning of the type wheels

The shaft 267 is positioned by the differential mechanism for the ten-cent amount bank, shown in Fig. 6 and described above, and the positioning of the shaft 267 is transmitted to the type wheel for this particular denomination by means of the mechanism shown in Figs. 44—B and 53 and now to be described.

Secured near the right-hand end (Fig. 44—B) of the shaft 267 is a crank 304 (see also Fig. 53) connected by a link 305 to a segment 306 free on the shaft 264. The segment 306 is connected by a link 307 to a segment 308 free on a bushing 309 secured in the left frame 60. Gear teeth in the segment 308 mesh with the external teeth of an external-internal gear 310, the internal teeth of which bear on the periphery of a disk 311 free on a bushing 312 secured in a plate 313 (Figs. 28 and 53) in turn secured to the left frame 60. A locating rod 314, which passes through the entire type wheel gear assembly, is a slip fit in a locating hole in the disk 311, and locates said disk 311 so that a cut-away or clearance portion thereof is opposite a pinion 315, which meshes with the internal teeth of the gear 310. The pinion 315 is rotatably supported by means of tenons on each side thereof, in cooperation with borings in separating plates 316 (Fig. 28) supported by the bushing 312 and the rod 314 in exactly the same manner as the disk 311. A square hole in the pinion 315 freely engages a square shaft 317 (Figs. 28 and 53), said shaft likewise freely engaging another pinion, similar to the pinion 315, which meshes with the internal teeth of an internal-external gear 318 similar to the gear 310, the external teeth on said gear 318 adapted to mesh with and drive a type wheel 319 for the ten-cent denomination.

The type wheels for the four lower order amount banks, including the type wheel 319 (Fig. 28), are supported in a shiftable framework, which is positioned under influence of the column selecting keys 194 (Fig. 2) to select the different columns of the record material (Fig. 3) for the entering of various items. The shiftable framework for the above type wheels will be described later in connection with the differential mechanism for the column selecting keys 194.

Positioning of the shaft 267 (Fig. 53) by the differential mechanism for the ten-cent row of amount keys, shown in Fig. 6, is transmitted to the type wheel 319 for this particular order by the mechanisms shown in Figs. 28 and 53 and described above. The link 305 (Figs. 44—B and 53) is retained against lateral displacement by means of extensions thereon in cooperation with annular grooves in two studs 320 secured to the indicator frame 63 (Fig. 44—B).

As previously brought out, there are a differential mechanism and a type wheel positioning mechanism, similar to that described above, for each row of amount keys 190 (Fig. 2), for the row of adding keys 191, and for each of the four rows of ledger number keys 192, and, inasmuch as the mechanism is substantially duplicated for each row of keys, it is believed that the description above, for the ten-cent amount bank, will suffice for all. The row of transaction keys 193 (Fig. 2) and the row of column selecting keys 194 each has a differential mechanism which is similar to the amount differential mechanism described above but varies enough therefrom in mechanical structure to justify a brief description, which will be given later.

After the differential actuator 232 (Fig. 7) has been positioned under influence of the depressed key 190, a totalizer wheel 321 for this particular denomination is engaged with a plurality of gear teeth 303 in said actuator 232. Return movement counter-clockwise of the arm 246 (Figs. 7 and 8), under influence of the cams 254—255 and 256—257 (space 1, Fig. 52), returns the segment 243 also in a counter-clockwise direction, causing the stud 244 to engage the hook-shaped extension on the plate 238 at the same time that the undercut portion 242 of the periphery 260 of said segment 243 passes opposite the latching portion of the latch 236. When the undercut portion of the segment 243 moves opposite the latch 236, the camming action of the angular slots 234 and 239 in the actuator 232 and the plate 240, under influence of the spring 241, immediately disengages the tooth 258 from the alining notch 259 and engages said latch with the shoulder 242 on the segment 243.

The plate 238 and the latch 236 are now free to return counter-clockwise in unison with the segment 243 and, through the stud 235, carry the plate 240 and the actuator 232 counter-clockwise in unison therewith from set position to home position. Return movement counter-clockwise of the actuator 232 causes the teeth 303 to rotate the totalizer wheel 321 for this particular denomination in a clockwise direction, in accordance with the value of the depressed amount key 190, to add in said wheel said value. After the actuator 232 has been returned to home position, the wheel 321 of the totalizer is disengaged therefrom.

*Transfer mechanism*

The mechanism for transferring tens digits from lower denominations to higher denominations comprises a transfer sector 322 for the ten-cent amount bank (Figs. 6, 7, and 9) interposed between the actuators 232 and the control plate 240, said sector mounted for circular movement around the same center as the actuator 232 by means of an arcuate surface on the lower end thereof in cooperation with the periphery of a hub member 323 for said actuator 232. The sector 322 is held against lateral displacement by a stud 324 in said sector, in cooperation with a curved slot in the actuator 232, which slot is concentric with the center of said actuator. The transfer sector 322 is held against side displacement by a flanged portion of a stud 325 carried thereby, which flanged portion overlies a circumferential surface on the actuator 232.

When the parts are in home position, as here shown, a spring 326, tensioned between the actuator 232 and the transfer sector 322, urges said sector counterclockwise to normally maintain a reduced portion of the stud 325 (Figs. 7 and 9) in contact with the sole of a foot-shaped extension of a transfer lever 327 free on a stud 328 in a differential hanger plate 329 supported by the rods 222 and 223, there being one such hanger plate for each row of keys. A spring 330 urges the lever 327 clockwise, and said lever is retained in untripped position, against the action of said spring, by a square stud 331 carried thereby, in cooperation with a notch 332 in a trip pawl 333. The pawl 333 is connected, by a hub free on a stud 334 in the plate 329, to a tripping arm 335, which, when in untripped position, as here shown, extends into the path of a tooth 336 on a tripping plate secured to the left-hand face of a totalizer wheel 337 for the one-cent order. A torsion spring 338 urges the pawl 333 in a clockwise direction to normally maintain the notch 332 in engagement with the stud 331.

In adding operations, when the one-cent wheel 337 (Figs. 7 and 9) passes from nine to zero while traveling in a clockwise or additive direction, the tripping tooth 336 wipes past the end of the arm 335 to rock said arm and the tripping pawl 333 counter-clockwise against the action of the spring 338 to disengage the notch 332 from the stud 331. Disengaging the notch 332 from the stud 331 permits the spring 330 to rock the transfer lever 327 clockwise until said stud 331 comes in contact with a stop surface 339 on said pawl. This moves the sole of the foot-shaped extension of the lever 327 out of the path of the stud 325.

When the machine is at rest, the differential slide 216 and the actuator 232 are retained one step beyond zero in a neutral position, as shown in Fig. 7, and when the transfer lever 327 is in untripped position (Fig. 9), it stops and holds the transfer sector 322 in zero position against the action of the spring 326, which spring forms a yieldable connection between the actuator 232 and said transfer sector 322. At the beginning of machine operation, the cams 254 and 255 (space 1, Fig. 52) cause the slide 216 and the actuator 232 to move from neutral position to zero position to take up the space between the toothed portions of said actuator and the transfer sector 322, and to cause said actuator to come into contact with said sector. As the actuator 232 moves away from zero position, to be positioned under control of the depressed amount key 190, it picks up and carries the transfer sector 322 in unison with itself.

When the transfer lever 327 has been tripped, as explained above, by the tripping tooth 336 in the one-cent order, the transfer sector 322 travels beyond zero to neutral position in unison with the actuator 232 during its return movement, and moves the wheel 321 for the ten-cent amount bank an additional step in adding direction to effect a tens transfer. When the transfer lever 327 has not been tripped, said lever remains in the path of the stud 325 and, during return movement of the actuator 232 and the sector 322, engages said stud 325 to stop said sector in zero position, as shown in Fig. 7, while the actuator 232 travels on beyond zero to neutral position. Obviously, in this latter case, as the wheel 321 for the ten-cent amount bank is in engagement with the sector 322 when said sector arrives at zero, the actuating movement of said wheel is terminated, and no transfer takes place.

All tripped transfer levers 327 and tripping pawls 333 are restored at the beginning of the succeeding machine operation just prior to initial movement of the actuators 232 but after said actuators have been moved from home or neutral position, as shown in Fig. 7, to zero position. The actuators 232, in moving from neutral to zero position, carry all previously tripped transfer sectors 322 to zero in unison therewith.

While the actuator 232 for the ten-cent bank is in zero position, a transfer restoring lever 340 free on the rod 233 (Fig. 9) is rocked clockwise, causing a rounded nose thereon to engage a surface 341 on the transfer lever 327 to restore said lever counter-clockwise to untripped position, as here shown, in which position the stud 331 engages the notch 332 in the trip pawl 333.

There is a restoring lever, similar to the lever 340 (Fig. 9), for each amount bank, including the adding bank 191 and the overflow bank, and a downward extension of the restoring lever 343 for the one-dollar bank supports one end of a rod 342, the other end of which rod is supported by a similar extension on a lever free on the rod 233 and similar to the lever 343 but not shown here. An extension of the lever 343 and a similar extension of its companion lever are each bifurcated to straddle respective studs 344 in respective cam levers 345 free on the rod 247, and each lever carries rollers 346 and 347, which cooperate respectively with two identical sets of companion plate cams 348 and 349 (Figs. 9, 44—A, and 44—B) secured on the main shaft 130.

The transfer restoring lever 340 for the ten-cent bank, and the other similar levers for all the amount banks except the one-dollar bank, each has a downward extension, which is bifurcated to straddle the rod 342. Consequently, said restoring levers travel in unison with the levers 343 and the rod 342 when said arms are rocked by the cam levers 345 and the cams 348 and 349, first in a clockwise direction and back to normal position according to the time given in space 4 of the time chart (Fig. 52) to restore all tripped transfer mechanisms in the manner explained above.

By comparing spaces 1 and 4 of the time chart (Fig. 52), it will be seen that all tripped transfer levers and their corresponding tripping pawls are restored to untripped position while the actuators 232 are in zero position. The transfer restoring mechanism is returned to normal position, as shown in Fig. 9, prior to return movement counter-clockwise of the actuators 232.

A transfer mechanism similar to that of the ten-cent amount bank, described above, is provided for each of the amount banks, including the adding bank 191 and the overflow bank adjacent thereto. In Fig. 28, a side-spacing view is shown of the differential mechanism and a part of the transfer mechanism for the adding bank 191, and, as these parts are identical with the corresponding parts for the ten-cent bank, they have been given the same reference numbers.

Totalizer mechanism

There is a totalizer wheel similar to the wheels 321 and 337 (Figs. 6, 9, and 28) for each of the amount banks 190, one for the adding bank 191, and one for the overflow bank, making six totalizer wheels in all, which wheels are rotatably mounted on a totalizer shaft 351 supported in a framework which is shiftable under control of the total control slide 92 (Fig. 2) and the transaction keys 193, to properly engage the totalizer wheels with and disengage said wheels from their corresponding actuators, which are similar in every respect to the actuator 232, explained above in connection with the ten-cent amount bank (Fig. 6).

The shiftable totalizer framework comprises right and left plates 352 and 353 (Figs. 19, 20, 21, 22, and 29), which support the shaft 351, an engaging shaft 354, and a rod 355, which in turn secure said plates in fixed relationship to each other. The plates 352 and 353 are shiftably mounted in the machine by means of slots therein in cooperation with studs 356 and 357 secured in the frames 61 and 60, respectively, and by means of the ends of the shaft 354, which engage, respectively, slots 358 in totalizer framework support plates 359 and 360 removably attached, respectively, to the frames 61 and 60 by means of slots in extensions thereof in cooperation with studs 361 and screws 362. The plates 359 and 360 have therein identical camming slots 363, which cooperate with rollers 364 carried by arms 365 secured to the shaft 354.

Secured to the right-hand end of the shaft 354 (Figs. 19 and 34) is a crank 366 pivotally connected to the upper end of a selecting link 367 carrying a stud 368, which cooperates with an open-mouthed slot in a link 369, the forward end of which link is pivotally connected to an arm 370 free on the stud 168 in the frame 61, and the rearward end of which link 369 is pivotally connected to the lower end of a shifting lever 371. The upper end of the lever 371 (Figs. 34 and 55) is pivotally supported by a stud 372 in a lever 373 free on a stud 374 in the frame 61. A link 375 connects the lever 373 (Figs. 34 and 35) to an upward extension of a cam lever 376 free on a stud 377 in the frame 61. The lever 376 carries rollers 378 and 379, which cooperate, respectively, with the peripheries of companion plate cams 380 and 381 secured on the main cam shaft 130, the timing of which cams is given in space 5 of the chart (Fig. 52).

The lever 371 (Figs. 15, 34, and 55) carries a stud 384, which cooperates with the peripheries of companion selecting segments 385 and 386. The segment 385 (Figs. 34, 44—A, and 44—B) is secured on a shaft 387 journaled in the frames 284 and 285, said shaft being positioned under control of the transaction keys 193 (Figs. 2 and 10) in a manner presently to be explained. The segment 386 (Figs. 34, 44—A, and 44—B) is free on a stud 388 in a plate 389 secured to the frame 285. A link 390 connects the segments 385 and 386, so that when the segment 385 is positioned under control of the transaction keys 193, the segment 386 is positioned in reverse relationship thereto. In other words, when the portion of the segment 385 which cooperates with the stud 384 is positioned upwardly one step, the portion of the periphery of the segment 386 which cooperates with said stud 384 is moved downwardly one step, as will be explained more in detail later.

Transaction differential mechanism

The shaft 387 is connected to the differential mechanism for the transaction keys 193 shown in Fig. 10, which mechanism is similar to and operates in exactly the same manner as the differential mechanism for the amount bank shown in Fig. 6 and explained earlier herein, with the exception that the actuator teeth and the tens transfer mechanism are omitted from the transaction differential.

The shaft 387 (Figs. 34, 44—A, 44—B, and 54) has secured thereon a crank 391 connected by a link 392 to a bell crank 393 free on the shaft 264. A link 394 (Figs. 10 and 54) connects the bell crank 393 to a transaction differential beam 395 pivoted on a differential latch plate 397, on which is pivoted a latch 398, to connect the latch plate 397 to a drive plate 396. A stud 399 in the latch 398 extends through angular slots in a differential balance plate 400, and a differential segment 401 to operatively connect these parts to the driving plate 396. The segment 401 carries a stud engaged by the bifurcated lower end of a plate 402 secured to a transaction differential slide 403 slidably mounted in the differential slide framework in exactly the same manner as the ten-cent amount slide 216 (Figs. 6 and 7).

The transaction slide 403 is normally retained in zero position by a zero stop pawl 404 free on the shaft 212. However, depression of any one of the transaction keys 193 (Fig. 10) shifts a control plate 415 forwardly to rock the zero stop pawl 404 to ineffective position, and moves the lower end of the stem of said depressed key into the path of the corresponding one of a series of bent-over ears on the slide 403. The differential drive plate 396 is connected to an arm 405 free on the rod 247, and said arm is connected by an adjustable eccentric to a cam lever 406 also free on the rod 247. The lever 406 carries rollers 407 and 408, which cooperate, respectively, with the peripheries of companion plate cams 409 and 410, the timing of which is given in Fig. 2 of the chart (Fig. 52).

Clockwise rotation of the shaft 130 (Fig. 10) causes the cams 409 and 410 to rock the lever 406 and the arm 405 first in a clockwise direction, according to the time given in space 2 of the chart (Fig. 52), to rock the transaction differential mechanism also clockwise to shift the slide 403 rearwardly until such rearward movement is interrupted by the depressed key 193. This positions the slide 403 and the differential members 401, 400, and 397 in accordance with the depressed transaction key 193, after which the arm 405, when it nears the terminus of its initial movement clockwise, engages a roller 411, carried thereby, with an arcuate surface on the beam 395 to force said beam into contact with a bushing on the rod 233 to position said beam and, through the linkage shown in Figs. 10 and 54, the shaft 387 in accordance with the depressed transaction key 193. Inasmuch as the control segment 385 (Fig. 34) is secured to the shaft 387, it and its companion segment 386 are positioned in accordance with the depressed transaction key 193.

The positioning of the shaft 387, under influence of the transaction keys 193, is transmitted, by an arm 412 secured thereon (Figs. 44—A and 54) and a link 413, to an indicator segment 414 free on the rod 271 and operating in the same manner as the similar segment 270 (Fig. 6) for the ten-cent amount bank to position front and rear indicators 1415 (Figs. 1 and 44—A) for the transaction keys 193.

The transaction differential mechanism likewise positions a transaction printing wheel to record, on the record material, an identifying symbol of the type of transaction being performed.

The shaft 387 (Figs. 29, 44—A, and 44—B) has secured thereto a crank 416 pivotally connected by a link 417, similar to the link 305 (Fig. 53) for the ten-cent amount bank, to a segment 418 free on the shaft 264. A link 419 pivotally connects the segment 418 to a segment 420 free on the bushing 309, said segment 420 having teeth which mesh with the external teeth of an external-internal gear 421. The internal teeth of the gear 421 bear on the periphery of a disk 422 supported by the bushing 312. The internal teeth of the gear 421 mesh with a pinion 423, which drives a square shaft 424, which shaft is connected by a similar pinion (not shown) to another external-internal gear 425 (Fig. 28), the external teeth of which drive a transaction type wheel 426 having thereon characters corresponding to the transaction keys 193.

The mechanism shown in Figs. 28 and 29 and described above forms an operating connection between the shaft 387 and the transaction type wheel 426 to position said type wheel in accordance with the depressed transaction key 193 to record a symbol characteristic of the type of transaction being performed.

*Totalizer engaging*

The selecting segments 385 and 386 (Fig. 15) have thereon small numerals corresponding to their different positions in relation to the stud 384, these numerals corresponding to the different transaction keys 193 (Fig. 2), which are numbered in a like manner.

When the differential mechanism for the transaction keys 193 (Fig. 10) is located in zero position by the zero stop pawl 404, the segments 385 and 386 (Figs. 15 and 34) are positioned as shown here, so that a high portion of the control surface of the segment 385 obstructs right-hand movement of the stud 384 and the control surface of the segment 386 is above and out of the path of said stud 384. This is the proper position for said segments 385 and 386 when the machine is being used as an adding machine and it is desired to have the totalizer engage and disengage in adding time.

After the segments 385 and 386 have been positioned by the transaction differential mechanism, the cams 380 and 381 (Figs. 34 and 35) function according to the time given in space 5 of of the time chart (Fig. 52) to rock the lever 376 and, through the link 375, the lever 373 first in a clockwise direction (see also Fig. 55). Clockwise movement of the lever 373 moves the lever 371 forwardly or counterclockwise without imparting any movement to the link 369, as this movement forwardly of the stud 384 is not obstructed by the control surface of the segment 386.

After the amount differentials 232 have been positioned according to the time given in space 1 of Fig. 52, the cams 380 and 381 rock the levers 376 and 373 counter-clockwise a greater distance than they were previously rocked clockwise, causing said lever 373 to shift the lever 371 rearwardly or in a clockwise direction. Rearward movement of the lever 371 causes the stud 384 to engage the high portion of the control surface of the segment 385 to form a pivot point for said lever 371 to impart clockwise movement to the lower end thereof to shift the link 369 forwardly to cause the slot in said link, in cooperation with the stud 368 (Fig. 34), to shift the link 367 forwardly or clockwise, as here viewed. Forward movement of the link 367 engages the right-hand branch of an inverted T-shaped slot 427 therein with a stud 428 in a cam lever 429 free on the stud 377.

The lever 429 carries rollers 430 and 431, which cooperate, respectively, with the peripheries of companion plate cams 432 and 433 secured on the main shaft 130 and functioning according to the time given in space 6 of the time chart (Fig. 52).

During each operation of the machine, revolution of the cams 432 and 433 causes the lever 429 to make two excursions of movement, each of which comprises a counter-clockwise movement and a return movement of said lever, according to the time given in space 6 of Fig. 52. In adding operations, the first excursion of the lever 429 causes the stud 428 to move idly back and forth in the upper branch of the T-shaped slot 427 without imparting any movement to the link 367. From a comparison of spaces 5 and 6 of the chart (Fig. 52), it will be seen that the link 367 is rocked forwardly in adding operations to engage the rearward branch of the slot 427 with the stud 428, as explained above, after the lever 429 has completed its first excursion of movement and is dwelling in normal position, as shown in Fig. 34.

Counter-clockwise movement of the lever 429 during its second excursion of movement causes the stud 428, in cooperation with the rearward branch of the slot 427, to shift the link 367 upwardly to rock the crank 366 and the shaft 354 in a clockwise direction. Clockwise movement of the shaft 354 (Figs. 19, 20, 21, and 22) and of the arms 365 secured thereon causes the rollers 364 carried by said arms, in cooperation with the cam slots 363 in the plates 359 and 360, to shift the totalizer framework, including the plates 352 and 353 and the shaft 351, downwardly to engage the totalizer wheels 321 and 337 (Figs. 7, 9, and 28) with the amount actuators 232 after said actuators have been positioned under influence of the amount keys. After the totalizer wheels have been engaged with the amount actuators, return movement counter-clockwise of said actuators rotates said totalizer wheels in an additive or clockwise direction to add therein the values of the depressed amount keys. After the amount actuators 232 have returned to normal or home position, the cams 432 and 433 (Fig. 34) return the lever 429 clockwise to normal position to return the shaft 354 counter-clockwise to disengage the totalizer wheels from said amount actuators. After the lever 429 has returned the link 367 downwardly to normal position, the cams 380 and 381 function to return said link 367 counter-clockwise to aline the upward branch of the slot 427 with the stud 428, as here shown.

A spring-actuated device is provided for assisting the cams 380 and 381 (Figs. 34 and 35) in returning the lever 371 and the links 369 and 367 to normal position, said device also adapted to retain said parts in normal position when no high portion of either of the working surfaces of the segments 385 and 386 is opposite the stud 384, in which case said lever 371 is rocked back and forth idly without imparting any shifting movement to said links 369 and 367.

Secured in the lower end of the lever 371 (Fig. 34) is a stud 603, which cooperates with flat opposed surfaces on fingers 604 and 605 free on a stud 606 in the auxiliary frame 64. A spring 607, tensioned between the fingers 604 and 605, urges said fingers toward each other to normally maintain the flat opposed surfaces thereon in contact with a stationary stud 608 in the auxiliary frame 64. The stud 608 normally maintains the flat opposed surfaces of the fingers 604 and 605 in parallel relationship to each other to form a yieldable slot in which the stud 603 may slide up and down when the lever 371 is rocked by the cams 380 and 381 (Fig. 35) and the stud 384 is not obstructed by high portions of the working surfaces of the control segments 385 and 386.

The spring-actuated arms 604 and 605 (Fig. 34), coacting with the studs 608 and 603, center the common pivot for the lever 371 and the link 369, and thereby return the link 367 to normal or neutral position after the rocking of said lever 371 in either direction under influence of the cams 380 and 381 (Fig. 35) and the control segments 385 and 386.

When the machine is used as a cash register and the Cash transaction key 193, located in position 9 of the transaction bank, is depressed (Fig. 2), the segment 385 (Figs. 15 and 34) is positioned so that a raised portion of the working periphery thereof is opposite the stud 384, and the segment 386 is positioned so that the entire working surface thereof is beneath said stud 384 to cause the totalizer to be engaged and disengaged in adding time, in exactly the same manner as explained above. Likewise, depression of the Received-on-account transaction key 193, located in position 7, causes the segment 385 to be positioned so that a high portion of the working surface thereof is opposite the stud 384 and said segment 385 positions the segment 386 so that the entire working surface thereof is beneath the stud 384, and, as in the two former cases, the totalizer is engaged and disengaged in adding time.

When the Charge key 193, which is located in position 8 of the transaction bank (Figs. 2, 15, and 34), is depressed, the segment 385 is positioned so that a low or undercut portion of the control surface thereof is opposite the stud 384, and the segment 386 is positioned so that the working surface thereof is below the stud 384. Consequently, no shifting movement is imparted to the links 369 and 367. As a result, the long branch of the T-shaped slot 427 remains in the path of the stud 428, and therefore the lever 429 does not impart engaging and disengaging movement to the totalizer. This is likewise true of the No sale and Paid out transaction keys 193, which are located, respectively, in positions 5 and 6 of the transaction bank and which cause an undercut portion of the working surface of the segment 385 to be positioned opposite the stud 384, and said segment 385 in turn positions the working surface of the segment 386 beneath or out of the path of said stud, so that no engaging and disengaging movement is imparted to the totalizer when these keys are depressed.

When the Total key 193 (Figs. 2, 15, and 34), which is located in position 1 of the transaction bank, is depressed in total-recording or resetting operations, the transaction differential mechanism positions the segment 385 so that an undercut portion of the periphery thereof is opposite the stud 384, and said segment 385 positions the segment 386 so that the working surface thereof is opposite the stud 384 to block forward movement thereof. Consequently, when the cams 380 and 381 (Fig. 35) rock the levers 376 and 373 clockwise, near the beginning of machine operation and before the amount actuators begin their initial movements, they cause the lever 371 to shift the link 369 rearwardly to rock the link 367 counter-clockwise to move the forward branch of the slot 427 over the stud 428. Initial movement counter-clockwise of the lever 429, under influence of the cams 432 and 433, shifts the link 367 upwardly to rock the shaft 354 clockwise, in the manner explained in connection with adding operations, to engage the wheels of the totalizer with the amount actuators 232 prior to their initial movements clockwise.

Initial movement clockwise of the amount actuators 232 (Figs. 7 and 9) reversely rotates the wheels 321 and 337 of the totalizer until their corresponding tripping teeth 336 contact the ends of the arms 335 to locate said wheels in zero position and to position the amount actuators, the indicating mechanism, and the printing mechanism in accordance with the amount standing on said totalizer wheels. In this case, obstruction of further movement of the actuators 232 causes the latch mechanisms therefor to be broken in exactly the same manner as the breaking of the latch mechanism for the ten-cent bank is accomplished when the slide 216 (Fig. 6) comes into contact with the stem of a depressed amount key 190, as explained earlier herein in connection with the amount differential mechanism.

After the totalizer wheels have been zeroized, they are disengaged from the amount actuators by the first return movement clockwise of the lever 429 (Fig. 34) under influence of the cams 432 and 433. After the totalizer wheels have been disengaged, the cams 380 and 381 (Fig. 35) impart counter-clockwise movement to the levers 376 and 373 to actuate the lever 371, and, as there is an undercut portion of the working surface of the segment 385 opposite the stud 384, no shifting movement is imparted to the links 369 and 367. Consequently, the upper branch or clearance portion of the slot 427 remains opposite the stud 428, whereupon the second excursion of movement of the lever 429 does not rock the shaft 354, and, as a result, the totalizer wheels remain in a zeroized condition at the end of machine operations.

In sub-total recording or reading operations, the wheels of the totalizer are engaged with the amount actuators prior to their initial movements, exactly the same as in total recording operations, during which initial movements said wheels are reversely rotated to zero and the amount thereon is recorded upon the record material, as before. However, the zeroized totalizer wheels are not disengaged from the amount actuators, as in total recording operations, but remain engaged with the amount actuators during their return movements, which restores said totalizer wheels to their original positions.

A total recording operation is often referred to as a "reset operation," and a sub-total recording operation is often referred to as a "reading operation." Therefore, the terms "total" and "reset" are considered interchangeable, as also are the terms "sub-total" and "read."

Depression of the Sub-total key 193, located in position 2 of the transaction bank (Figs. 2 and 10), causes the differential mechanism for said bank to move the control segments 385 and 386 (Figs. 15 and 34) to second position, in which position the control surfaces of said segments block the movement of the stud 384 in either direction. Therefore, initial movement clockwise of the levers 376 and 373 rocks the lever 371 counter-clockwise, the stud 384, in cooperation with the control surface of the segment 386, forming a pivot for said lever. Counter-clockwise movement of the lever 371 shifts the links 369 and 367 rearwardly to move the forward branch of the lower portion of the slot 427 into engagement with the stud 428.

Initial movement of the cams 432 and 433 (Fig. 34 and space 6 of the chart, Fig. 52) rocks the lever 429 counter-clockwise to shift the link 367 upwardly to rock the shaft 354 (Figs. 19 and 34) clockwise to engage the wheels of the totalizer with the amount actuators prior to initial movement of said actuators. First return movement of the lever 429, under influence of the cams 432 and 433, returns the link 367 downwardly to normal position as here shown, to disengage the wheels of the totalizer from the amount actuators. While the totalizer wheels are thus disengaged, counter-clockwise movement is imparted to the levers 376 and 373 by the cams 380 and 381 to cause said levers to rock the lever 371 clockwise, the stud 384, in cooperation with the high portion of the control surface of the segment 385, forming a pivot point. Clockwise movement of the lever 371 shifts the link 369 forwardly to engage the rearward branch of the slot 427 with the stud 428. Second engaging movement of the cams 432 and 433 (Figs. 34 and 35 and space 6 of the chart, Fig. 52) engages the wheels of the totalizer with the amount actuators prior to return movement of said actuators.

After the wheels of the totalizer are thus engaged with the amount actuators, return movement of said actuators restores said totalizer wheels to their original positions to effect a sub-total recording or reading operation. After the amount has been reentered in the totalizer wheels, the cams 432 and 433 disengage said wheels from the amount actuators, after which the cams 380 and 381 (Fig. 35 and space 5 of the chart, Fig. 52) function to restore the link 367 to normal position (Fig. 34), so that the upward or clearance branch of the slot 427 is in alinement with the engaging stud 428.

Position 3 of the segments 385 and 386 (Figs. 15 and 34) would also cause the totalizer to be engaged and disengaged in sub-total or reading time in exactly the same manner as position 2 of these segments effects this result. However, there is no transaction key 193 (Fig. 2) for the third position, and consequently this position is not used in the present adaptation. Also in the present adaptation, position 4 of the transaction bank is not used; however, if this position should be used, the segments 385 and 386 would cause the totalizer to be engaged and disengaged in adding time.

It will be noted that the section of the control surface of the segment 385 (Figs. 15 and 34) corresponding to the No sale and Paid out keys 193 (Fig. 2) located, respectively, in positions 5 and 6 of the transaction bank is undercut, and, as the control surface of the segment 386 is moved beyond the stud 384 when said segment is moved to either position 5 or position 6, no shifting movement is imparted to the link 369 (Fig. 34). Consequently, the upward or clearance branch of the slot 427 remains in the path of the stud 428, and, as a result, no engaging or disengaging movement is imparted to the totalizer when either the No sale key or the Paid out key is depressed. In other words, no sale and paid out transactions are non-add transactions.

The Received-on-account key 193 (Fig. 2), located in position 7 of the transaction bank, causes the segments 385 and 386 to be moved to seventh position, in which position a raised portion of the control surface of said segment 385 is opposite the stud 384 and the control surface of said segment 386 is beyond said stud 384. This positioning of the segments 385 and 386 causes the totalizer to be engaged with and disengaged from the amount actuators in adding time, in exactly the same manner as explained before in connection with the use of the machine as an adding machine, in which case said segments are located in zero position, so that receiver-on-account items will be added in the totalizer.

The Charge key 193, located in position 8 of the transaction bank, causes the segments 385 and 386 to be located in eighth position, in which position an undercut portion of the control surface of said segment 385 is opposite the stud 384 and the control surface of said segment 386 is beyond said stud 384. When the segments 385 and 386 are thus positioned, no engaging or disengaging movement is imparted to the totalizer; consequently, charge items will not be added therein. The Cash key 193 (Fig. 2), located in position 9 of the transaction bank, causes the segments 385 and 386 to be located in ninth position, in which position a raised portion of the control periphery of said segment 385 is opposite the stud 384 and the control surface of said segment 386 is beyond said stud 384. Consequently, when the Cash key 193 is depressed, the segments 385 and 386 will cause the totalizer to be engaged and disengaged with the amount actuators in adding time, so that cash items will be added therein.

The No sale, Paid out, Received-on-account, Charge, and Cash keys 193 (Fig. 2) are used only when the machine is used as a cash register; therefore, when the control slide 92 is in Register position, as here shown, the above named transaction keys are unlocked, and when said slide is out of Register position, these keys are always locked against depression, as will be explained fully later. Likewise, the Total and Sub-total keys 193 (Fig. 2), located, respectively, in positions 1 and 2 of the transaction bank, are locked against depression except when the control slide 92 is in Add and reset position.

The reading feature of the totalizer, in addition to being controlled by the Sub-total key 193, is also controlled by the total control slide 92 (Figs. 30 and 34), which when moved to Read total position, causes a control segment 436 to be positioned so that opposed projections 437 and 438 in an opening therein are opposite the stud 384 and cooperate with said stud to cause the totalizer to be engaged and disengaged in reading time in exactly the same manner as when the segments 385 and 386 are located in second position under influence of the Sub-total key 193 (Fig. 2), as explained earlier herein.

The segment 436 (Figs. 29, 30, and 34) is free on the shaft 387, and said segment carries a stud 439, which is engaged by a slot 440 in an arm 441 secured on a shaft 442 journaled in the frames 284 and 285 (Figs. 44—A and 44—B). Also secured on the shaft 442 is an arm 443 having in the upper end thereof a slot which engages a stud 444 in the slide 92. The slide 92 is shiftably mounted by means of parallel slots therein in cooperation with studs 445 and 446 secured in the left frame 60.

The slide 92 has therein a series of notches 447 corresponding to the various positions of said slide, which notches cooperate with a stud 448 in a spring-pulled arm 449, free on the stud 90, to locate said slide in its various positions. As the stud 448 rides from one notch 447 to another, the arm 449 is rocked against the tension of its spring to momentarily raise a projecting finger 450 on said arm into the path of a shoulder 451 on an arm 452 secured on the left-hand end of the key lock shaft 177 to obstruct clockwise releasing movement of said shaft (see also Fig. 15) when the slide 92 is being moved from one position to another. When the total control slide 92 is moved to Lock register position, a stud 453 (Fig. 30) carried thereby moves over a projecting finger 454 of the arm 452 to lock the key lock shaft 177 against releasing movement, thereby preventing an operation of the machine.

Moving the total control slide 92 to Read total position causes the arm 443 (Figs. 30 and 34), the shaft 442, the arm 441, and the stud 439 to position the segment 436 so that the projections 437 and 438 are opposite the stud 384 to cause the wheels of the totalizer to be engaged with and disengaged from the amount actuators in reading or sub-total time.

In the present adaptation, all other positions of the control slide 92 position the segment 436 so that clearance portions of the opening therein are opposite the stud 384, and consequently said segment 436 has no influence upon the engaging and disengaging of the totalizer except when said control slide is in Read total position. Obviously, other projections similar to the projections 437 and 438 may be placed in the opening of the segment 436 to control the engaging and disengaging movements of the totalizer in any manner desired.

The slide 92 also positions a type wheel corresponding thereto, to record a symbol characteristic of the position of said slide or of the type of operation being performed.

The slide 92 (Figs. 28, 29, and 30) carries a stud 455, which is engaged by a slot in the upper end of a segment 456 free on the hollow stud 309. Teeth on the segment 456 mesh with the teeth of a gear 457 rotatably supported by one of the disks 422, said gear in turn meshing with a pinion 458 secured on one end of a shaft 459 journaled in the printer framework. The printer framework comprises the plate 313 (Figs. 28 and 29) and a plate 460, said plate 460 secured on a rod 461, one end of which is secured in the bushing 312 and the other end of which is supported by the right frame 61.

Also secured on the shaft 459 (Figs. 28 and 30) is a pinion 462, which meshes with the teeth of a gear 463 rotatably supported by a disk 464 in turn supported by the rod 461. Teeth on the gear 463 mesh with a type wheel 465 free on the shaft 351, which type wheel is positioned by the train of mechanism just described to print a symbol on the record material corresponding to the position of the slide 92 or the type of operation being performed. In the present adaptation, only two positions of the control slide type wheel 465 (Figs. 28 and 30) have printing characters thereon, for printing an X on the record material when the total control slide 92 is in Read total position and for printing a plus mark (+) on said record material when the total control slide is in Add and reset position.

The rod 461 (Fig. 28), in addition to rotatably supporting the gear 457, also rotatably supports the transaction gear 425, the gears for the two highest order amount type wheels, and the gears for the four ledger number printing type wheels. The wheels mentioned above constitute the stationary portion of the printer. The rod 461 likewise supports the shiftable framework, later to be described, which carries the gears and the corresponding type wheels for the four lower order amount banks, so that amounts of not over four digits may be printed in any of the columns of the record material.

*Reset counter*

A step-by-step counter is provided for counting "one" each time the total control slide 92 is moved to Add and reset position.

The external-internal gear 457 (Figs. 24, 29, and 30) for the total control slide 92 has thereon a camming surface 468, which cooperates with the rounded nose of a cam lever 469 free on a stud 466 in the frame 60. The lever 469 carries a stud 470, which engages a slot 471 in a link 472, the upper end of which is pivotally connected to a yoke 473 free on a shaft 474 journaled in the side members of a reset counter framework 475 secured on a bracket 476 in turn secured to the frame 60. The yoke 473 carries a rod which rotatably supports a counter wheel operating pawl 477 having graduated teeth which cooperate with the teeth of ratchets secured to each of a series of counter wheels 478 free on the shaft 474. A spring normally maintains the teeth of the pawl 477 (Fig. 24) in engagement with the teeth of the ratchets carried by the reset counter wheels 478. Each of the counter wheels 478 has numerals on the face thereof, which are visible through an opening in a cover plate 494 (Fig. 29) for the reset counter mechanism, said plate being secured to the frame 60.

The right-hand arm of the yoke 473 (Figs. 24 and 29) has therein two notches 479 and 480, corresponding, respectively, to the fed and take-up positions of said yoke and the pawl 477. The notches 479 and 480 cooperate with the angular retaining tooth of a retaining pawl 481 free on a stud 482 in a plate 467 (Figs. 23 and 29) secured to the frame 60. A spring 483 (Fig. 24), tensioned between an extension of the pawl 481 and the stud 470, retains the tooth of the pawl 481 in engagement with the notches 479 and 480 and urges the lever 469 counter-clockwise to normally maintain the rounded nose thereof in contact with the camming surface 468.

The lower end of the link 472 has therein a Z-shaped slot 484 having two offset vertical branches connected by a horizontal branch, said slot cooperating with a stud 485 in a crank 486 secured on one end of a hub 487 secured to a printer operating shaft 488 journaled in the frames 60 and 61. Secured on the other end of the hub 487 is a crank 489 (Fig. 29) having pivotally connected thereto the forward end of a pitman 490, the rearward end of which is slotted to embrace the main shaft 130. The pitman 490 carries a roller 491, which cooperates with a cam groove 492 in a cam 493 secured to the main shaft 130 and functioning according to the time given in space 11 of the chart (Fig. 52) to oscillate the crank 489, the shaft 488, and the crank 486 first in a counter-clockwise direction (Fig. 24) and then back to normal position, as here shown.

When the total control slide 92 (Figs. 2, 24, and 30) is in Register, Lock register, or Read total position, the gear 457 is positioned so that a low portion of the periphery of the camming surface 468 is opposite the nose of the lever 469, and, as a result, said lever is retained in the position shown in Fig. 24 and, through the stud 470 and the slot 471, retains the link 472 in the position shown in Fig. 24, so that the left-hand branch of the slot 484 is in alinement with the stud 485. When the link 472 is in this position, oscillation of the crank 486, under influence of the cam groove 492, imparts no movement to said link 472, as the stud 485 is free to ride idly in the left-hand branch of the slot 484, and, as a result, the counter wheels are not actuated.

When the total control slide 92 (Figs. 24 and 29) is moved to Add and reset position, the inclined portion of the camming surface 468, in cooperation with the rounded nose of the lever 469, rocks said lever clockwise, causing said lever in turn to rock the link 472 also clockwise to move the right-hand branch of the slot 484 into alinement with the stud 485. During machine operation, clockwise movement of the crank 486 causes the stud 485, in cooperation with the downward wall of the horizontal portion of the slot 484, to shift the link 472 downwardly to rock the yoke 473 counter-clockwise from the take-up position, in which it is shown in Fig. 24 and in which position the pawl 481 engages the notch 480, to fed position, in which position the pawl 481 engages the notch 479 to retain said yoke 473 in fed position. Counter-clockwise movement of the yoke 473 and the pawl 477, from take-up to fed position, causes said pawl, in cooperation with the ratchet of the units wheel 478, to advance said wheel one step to count "one" during the first operation of the machine after the total control slide 92 is moved to Add and reset position. A deep notch in each of the lower order ratchets permits the graduated teeth of the pawl 477 to advance the next higher order wheel 478 one step when the adjacent lower order wheel passes through zero.

As long as the total control slide 92 remains in Add and reset position, the right-hand branch of the slot 484 (Fig. 24) will remain in alinement with the stud 485, and, upon subsequent machine operations, the stud 485 will oscillate idly in the right-hand branch of said slot without imparting movement to the link 472, so that the reset counter will be actuated only once each time the total control slide is moved to Add and reset position.

When the total control slide 92 (Fig. 29) is moved out of Add and reset position, the inclined portion of the cam surface 468 (Fig. 24) is withdrawn from the nose of the lever 469. However, at this time, the link 472 is in its rocked and lowered positions, with the upper portion of the right-hand branch of the slot 484 over the stud 485; consequently, the spring 483 cannot rock the lever 469 and the link 472 to their counter-clockwise positions until near the end of initial movement clockwise of the crank 486 and until the stud 485 is alined with the horizontal branch of said slot. Immediately thereafter, the spring 483 rocks the link 472 and the lever 469 counter-clockwise, to position the left-hand branch of the slot 484 over the stud 485. After the link 472 has been thus rocked, return movement counter-clockwise of the crank 486 causes the stud 485, in cooperation with the upper wall of the horizontal branch of the slot 484, to move said link 472 upwardly to normal position, as here shown, in which position the pawl 481 engages the notch 480 in the yoke 473.

*Zero elimination mechanism*

Referring to Fig. 2, the one dollar and the ten dollar rows of keys 190, the one hundred dollar row of keys 191, the overflow bank for the keys 191, and the four rows of ledger number printing keys 192 are provided with a zero elimination mechanism for preventing the printing of zeros when no keys are depressed in the higher orders and for permitting the printing of zeros in the lower orders when a key is depressed in the adjacent higher order. The units of cents row of keys and the tens of cents row of keys are not provided with the zero elimination mechanism, as it is desirable that the zeros print in these two orders at all times.

The zero elimination mechanism for the one hundred dollar or highest order amount bank 191 is shown in Fig. 23, and, inasmuch as the zero elimination mechanism is substantially duplicated in the other banks where it is used, it is believed that a description of the mechanism shown here will suffice for all.

It will be recalled that the keys 191 in the highest order amount bank are locked against depression when the total control slide 92 (Fig. 2) is in any position except Add and reset position. In other words, the keys 191 are used only when the machine is being used as an adding machine. The keys 191 have a differential mechanism similar in every respect to that of the ten-cent amount bank 190, shown in Fig. 6 and explained earlier herein, which, through a linkage similar to that which connects the differential mechanism for the ten-cent amount bank to the segment 308 (Figs. 44—A, 44—B, and 53), connects the differential mechanism for said keys 191 to a segment 496 (Fig. 23), which is comparable to the segment 308. The segment 496 meshes with and positions an external-integral gear 497, comparable to the gear 310 (Fig. 53), which gear 497, in a similar manner to the gear 310, positions a type wheel for the highest order amount bank 191.

When the segment 496 and the gear 497 are in zero position, as shown in Fig. 23, a wide space in the periphery of said segment cooperates with a wide tooth 498 on the gear 497. The wide space in the segment 496 permits the gear 497 to be moved counter-clockwise independently of said segment, the wide tooth 498 therein passing out of mesh with the wide space in said segment. When the gear 497 is moved out of zero position for the purpose of eliminating the printing of zeros, the periphery of the wide tooth 498 moves into the path of a large tooth 499 on the segment 496 to block counter-clockwise movement of said segment and thereby lock said segment in zero position.

The gear 497 has a shoulder 500 (Fig. 23) arranged to be engaged by a bent-over ear 501 on a plate 502 mounted for oscillating movement around the axis of the gear 497 by means of two curved slots therein in cooperation with studs 503 and 504 secured in the plate 467. A link 505 pivotally connects the plate 502 to a cam lever 506 free on a stud 507 in the frame 60. The lever 506 carries a roller 508, which engages a camming groove 509 in a cam 510 secured to the main cam shaft 130. The cam groove 509 oscillates the lever 506 and the plate 502 first counter-clockwise and then back to normal position, according to the time given in space 7 of the chart (Fig. 52). The plate 502 carries a stud 511, upon which is pivoted a pawl 512 urged counter-clockwise by a spring 513 to normally maintain a rounded extension 514 thereof in contact with the left-hand surface of a zero elimination pawl 515. The pawl 515 is rotatably supported by a stationary stud 516 in the plate 467, and said pawl is urged counter-clockwise by a torsion spring 517 to normally maintain an extension 518 thereof in contact with a camming surface 519 on the periphery of the gear 497.

When no key is depressed in the highest order amount bank 191 (Figs. 2 and 23), the segment 496 and the gear 497 remain in zero position, as here shown. Counter-clockwise movement of the lever 506 and the plate 502, under influence of the cam groove 509, causes the rounded extension 514 of the pawl 512 to ride away from the inclined surface of the pawl 515 and permits the spring 513 to engage the tooth of the pawl 512 with the left-hand shoulder of a notch 520 in the periphery of the gear 497. After the pawl 512 engages the notch 520, it moves the gear 497 and the type wheel for the highest order amount bank counter-clockwise in unison therewith, from zero position to a position beyond zero, which is a blank or non-printing position, to eliminate the printing of the zero in this particular order.

When the gear 497 is in non-printing position, the periphery of the wide tooth 498 (Fig. 23) is in the path of the tooth 499 on the segment 496 to retain said segment in zero position, and a hook 521 on said segment moves over the extension 518 to lock the pawl 515 in its ineffective position, as here shown. Return movement clockwise of the lever 506 and the plate 502 causes the ear 501 to engage the shoulder 500 to return the gear 497 to zero or normal position, as here shown, after the printing mechanism has functioned (compare spaces 7 and 12 of Fig. 52).

When one of the keys 191 (Fig. 2) in the highest order amount bank is depressed, the segment 496, under influence of the differential mechanism for said amount bank, moves counter-clockwise (Fig. 23) out of zero position, carrying the gear 497 clockwise in unison with it. When the gear 497 moves away from zero position while traveling in a clockwise direction, the camming surface 519 thereon, in cooperation with the extension 518 of pawl 515, rocks said pawl counter-clockwise against the action of the spring 517. As the pawl 515 moves counter-clockwise under influence of the camming surface 519, said pawl, in cooperation with the extension 514, rocks the pawl 512 clockwise against the action of the spring 513 to move and retain the tooth thereof away from the periphery of the gear 497, so that said tooth will be held out of engagement with the notch 520 during oscillating movement of the plate 502, as explained above. The pawl 515 for the highest order amount bank 191 (Fig. 23) has a bent-over projection 522, which overlies the pawl 515 for the next lower order. Consequently, counter-clockwise movement of the pawl 515 for the highest order, under influence of the camming surface 519, rocks the pawl 515 for the next lower order counter-clockwise in unison therewith to rock and retain the tooth of the pawl 512 for said lower order out of the path of the notch 520 in the gear 497 for said lower order, so that said gear and the printing mechanism positioned thereby will remain in zero position, as it is desirable to record the zeros in lower orders when a key in a higher order is depressed.

As previously explained, the ten-dollar and one-dollar amount banks 190 (Fig. 2) the overflow bank for the one hundred dollar amount bank, and all four of the ledger number banks 192 each has a zero elimination mechanism which is similar to that shown in Fig. 23 for the one hundred dollar amount bank and which functions exactly like said zero elimination mechanism for controlling the printing of zeros in their respective banks. However, only one plate 502 is provided, the flange 501 of which extends over all the gears 497, so that when this plate is restored, the flange 501 will engage the shoulders 500 of all the gears 497 which were moved to their respective non-print positions. The units and tens of cents banks 190 are not provided with zero elimination mechanism, as it is desirable that the zeroes of these banks print at all times.

A plate 495 (Figs. 23 and 29), secured to the threaded ends of the studs 503 and 504, assists the plate 467 in holding the zero elimination mechanism in place. The plate 495 has a curved slot engaged by a roller on the stud 511 to assist in guiding the plate 502 in its oscillating movement.

*Column selecting keys*

It will be recalled, by referring to Figs. 2 and 28, that the four lower order amount type wheels 319 and their driving gears 318 are mounted in a shiftable framework which is positioned under control of the eight column selecting keys 194 (numbered II to IX) to print in any selected one of eight vertical columns on the record material shown in Fig. 3, said columns having various designations to identify the item corresponding to the amount printed in said column. The column selecting keys 194 may be depressed only when the total control slide 92 is in either Register position or Add and reset position. When no column selecting key 194 is depressed, a zero stop mechanism causes the differential mechanism to position the shiftable amount type wheels adjacent to the stationary portion of the printer, which includes the two higher order amount type wheels, the transaction type wheel, the type wheel for the total control slide 92, and the four ledger number type wheels. In this case, all of the type wheels print in a wide column located on the left-hand side of the record material shown in Fig. 3 and identified as column I.

The Total key, the Sub-total key, and the No sale key 193 (Fig. 2), when depressed, cause the differential mechanism for the column selecting keys 194 to be positioned at zero, to position the shiftable amount type wheels, adjacent to the stationary type wheels, to cause items corresponding to these keys to be printed in the left-hand column (I) of the record material.

Referring now to Fig. 12, depression of any one of the column selecting keys 194 moves the lower end of the stem thereof into the path of the corresponding one of a series of bent-over projections 564 on a column selecting slide 523, similar in every respect to the amount slide 216 and mounted in exactly the same manner in the slide supporting framework. The slide 523 (Figs. 12 and 13) has secured thereto a depending arm 524 bifurcated to straddle a stud 525 in a differential segment 526 free on a bushing on the rod 233. Associated with the segment 526 is a balance plate 527, said segment and said balance plate having opposed angular camming slots, through which extends a stud 528 in a latch 529. A spring 530, tensioned between extensions of the segment 526 and the plate 527, urges said parts in opposite directions, causing the angular camming slots to normally maintain the stud 528 in the bottom thereof to retain the latch 529 in latched position, as shown in Fig. 12.

The latch 529 (Figs. 12 and 13) is pivoted on a stud 531 carried by a latch plate 532 free on the rod 233, and the scissors action of the angular slots in the segment 526 and the plate 527 on the stud 528 causes said latch 529 to normally engage a notch in the periphery of an operating segment 533 free on the rod 233. An extension of the plate 532, in cooperation with a stud 534 carried by the segment 533, and the latch 529, in cooperation with the shoulder on said segment 533, normally connects said plate and said segment in fixed relationship to each other, so that said plate 532 may be moved back and forth by said segment 533. The segment 533 has therein a slot which cooperates with a stud 535 in a lever 536 free on the rod 247 and connected by an eccentric adjustment 537 to a cam lever 538 also free on the rod 247. The lever 538 carries rollers 539 and 540, which cooperate, respectively, with the peripheries of companion plate cams 541 and 542 secured on the main shaft 130 and functioning according to the time given in space 3 of the time chart (Fig. 52) to oscillate the levers 538 and 536 first clockwise and back to normal position, to operate the differential mechanism. The lever 536, being connected to the segment 533 by the stud 535, oscillates said segment in unison therewith, first clockwise and then back to normal position. The segment 533 being connected to the plate 532 by the latch 529 and said latch being connected by the stud 528 and the angular slots to the plate 527 and the segment 526, said parts move clockwise in unison with said segment 533, said segment 526 in turn carrying the slide 523 rearwardly in unison therewith.

The slide 523 (Figs. 12 and 13) moves rearwardly until the corresponding one of the projections 564 thereon comes into contact with the stem of the depressed column selecting key 194, whereupon further rearward movement of said slide and further clockwise movement of the segment 526 are terminated. Termination of clockwise movement of the segment 526 causes the stud 528 to ride upwardly in the angular slot therein, to disengage the latch 529 from the shoulder on the segment 533 and to engage a tooth on said latch with the corresponding one of a series of alining notches 543 in a plate 544 supported by the rods 222 and 223. This breaking of the latch 529 permits the segment 533 to complete its initial movement clockwise without interruption and positions the plate 532 in accordance with the depressed column selecting key 194. After the latch 529 has been disengaged from the segment 533, an arcuate surface on said segment moves into the path of an extension thereof, to lock said latch and the plate 532 in set positions.

After the plate 532 has been positioned under influence of the depressed column selecting key, and when the lever 536 nears the end of its initial movement clockwise, a roller 545, carried by said lever, engages an outcurved surface on a beam 546, the upper end of which beam is pivotally connected to the plate 532, and forces an incurved surface of said beam into contact with a bushing free on the rod 233, to position said beam in accordance with the position of the plate 532. The beam 546 has a slot 547, which, in cooperation with a roller 548 carried by a segment 549, positions said segment in accordance with the plate 532, which plate, as previously explained, is positioned in accordance with the depressed column selecting key 194.

The segment 549 (Figs. 12 and 28) meshes with a segment 550 free on the rod 247 and having teeth which mesh with a gear 551 secured on one end of a short shaft 552 journaled in upward extensions of the base 62. Secured on the other end of the shaft 552 is a crown gear 553, the teeth of which mesh with a pinion 554 secured on a short shaft 555 journaled in upward extensions of the base 62, said shaft being at right angles to the shaft 552. Secured on the forward end of the shaft 555 is a gear 556, which meshes with the teeth of a rack 557 secured to a Y-shaped plate 558 (Fig. 28) having secured thereto three studs which rotatably support rollers 559, 560, and 561. The rollers 559 and 560 are in horizontal alinement and engage a horizontal slot 562 in a plate 563 secured by screws 566 to upward extensions of the base 62. The roller 561, which is located beneath and midway between the rollers 559 and 560, engages a horizontal slot 567 in the plate 563 and, together with the rollers 559 and 560, supports the plate 558 and the rack 557 for horizontal shifting movement. Washers supported by the studs which support the rollers 559, 560, and 561 are larger in diameter than the width of the slots 562 and 567 and maintain the plate 558 in proper side-spacing relationship with the plate 563.

An upward extension of the plate 558 (Fig. 28) pivotally supports two similar fingers 568 and 569 having studs which extend through enlarged notches in said upward extensions. A spring 570, tensioned between said studs, urges the fingers 568 and 569 toward each other, to cause said fingers to yieldably grip opposite faces of a disk 571 free on a bushing 572 free on the rod 461. The bushing 572 is secured in a plate 573, and a reduced end of said bushing extends to the left of said plate to rotatably support the external-internal driving gears 318 for the four lower order amount type wheels 319. The disk 571 is spaced from the plate 573 by a collar 574, and said parts are clamped against said plate 573 by a nut 575 threaded on the end of the bushing 572. The upper end of the plate 573 (Figs. 6 and 28) fits in an annular groove in a sleeve 576 free on the rod 1351, and said plate 573 is slotted to straddle the reduced portion of the sleeve 576 formed by said annular groove. The left-hand end of the sleeve 576 (Fig. 28) rotatably supports the four lower order amount type wheels 319, said type wheels being driven by their respective gears 318, rotatably supported by the bushing 572.

The mechanism just described, including the plate 573, the bushing 572, and the sleeve 576, forms a framework which is shiftable upon the rods 461 and 351, under influence of the column selecting keys 194, to print in the various columns of the multi-columned record material, shown in Fig. 3.

Positioning of the beam 546 and the segment 549 (Figs. 12 and 28), under influence of the depressed column selecting key 194 and through the train of gearing described above, positions the plate 558, and said plate, through the medium of the resilient fingers 568 and 569 and the disk 571, in turn positions the four lower order amount type wheels in accordance with the depressed key 194 to cause the amount of the transaction to be recorded in a column of the record material corresponding to said depressed key 194. The shiftable framework, including the plate 573, is not returned to normal position adjacent the other type wheels at the end of machine operation, but remains as positioned until the next operation, during which said framework is moved directly from its old position to its new position.

*Type wheel alining mechanism*

After the four lower order type wheels and their supporting framework have been positioned in the manner explained above, an aligning mechanism functions to aline and retain said framework in set position.

Referring now to Figs. 6, 10, 11, and 12, the plate 573 has a downward projection 577 adapted to be engaged by any one of nine notches in an alining bar 578, said notches corresponding to the nine columnar positions of the shiftable framework for the four lower order type wheels, said nine positions including the normal or home position of said framework, in which the four lower order type wheels are located adjacent to the nonshiftable type wheels. The bar 578 is secured to two similar arms 579 and 580 (Fig. 11), each of which is rotatably connected to corresponding companion cam arms 581 and 582 by hubs free on the rod 247. A compression spring 583, tensioned between each of the pairs of arms 579 and 581 and 580 and 582, forms a yieldable connection between said arms and maintains a stop stud 584, carried by each of the arms 579 and 580, in contact with a raised surface on the corresponding cam arms 581 and 582. Each of the cam arms 581 and 582 carries rollers 585 and 586, which cooperate, respectively, with the peripheries of companion plate cams 587 and 588 (Figs. 11, 44—A, and 44—B) secured on the main shaft 130.

After the plate 573 (Figs. 11 and 28) has been positioned under influence of the depressed column selecting key 194, as explained above, the cams 587 and 588 function according to the time given in space 9 of the time chart (Fig. 52) to cause the angular slot in the bar 578, corresponding to the position of said plate 573, to engage the projection 577 to aline said plate and the four lower order type wheels in set position. After printing has been effected (compare spaces 9 and 12 of Fig. 52), the cams 587 and 588 disengage the alining bar 578 from the projection 577 of the plate 573.

Another alining bar 589 (Figs. 6, 10, 11, and 28), secured to the arms 579 and 580, engages alining teeth of the external-internal gears 318, which drive the shiftable type wheels 319, regardless of what columnar position they are in, and likewise engages alining teeth of the external-internal gears for driving the non-shiftable type wheels, including the transaction gears 425 and the total control slide gear 463 (Fig. 28), to aline said gears and the type wheels in set positions.

An intermediate aliner is provided for assisting the differential mechanism for the column selecting keys 194 in accurately locating the shiftable amount wheel framework in selected position, so that the aliner 578 (Fig. 10) will not stumble on the projection 577 and to insure that the proper alining notch in said aliner 578 engages said projection 577 to hold the shiftable amount framework in selected position during operation of the printing mechanism.

Secured on the shaft 552 (Figs. 12 and 14) is an alining wheel 592 having therein a series of angular alining notches 593 corresponding to the different columnar positions of the shiftable type wheel framework. The notches 593 are adapted to be engaged by the angular alining tooth of an alining pawl 594 free on a hub 595 rotatably supported by the rod 247, said hub 595 being secured to a cam arm 596. A spring 597 urges the pawl 594 and the arm 596 in opposite directions to normally maintain extensions thereof in contact with each other, as here shown, said spring forming a flexible connection between said arms. Another spring 598, tensioned between the arm 596 and the stud 78, urges said arm and the pawl 594 in a counter-clockwise direction to normally maintain a projection 599 of said arm 596 in contact with said stud 78, to normally maintain the pawl 594 in disengaged position, as here shown. The arm 596 has thereon a camming surface 600, which cooperates with a stud 601 carried by the cam 257, said camming surface and said stud functioning according to the time given in space 15 of the time chart (Fig. 52).

By comparing spaces 3, 9, and 15 of the chart (Fig. 52), it will be seen that, as the differential mechanism for the column selecting keys 194 nears the end of its initial movement, the cam surface 600, in cooperation with the stud 601 (Fig. 14), engages the pawl 594 with the notch 593 corresponding to the selected position of the column printing type wheels 319, to assist the differential mechanism in accurately locating said type wheels in selected columnar position. After the column printing type wheels have thus been alined, and before the aliner 594 is disengaged, the aliner 578 (Fig. 11) functions under influence of the cams 587 and 588 to complete the alining of the column printing type wheels.

*Aliner for intermediate segments*

A spring-actuated snap-type aliner is provided for alining the intermediate segments, including the amount segments 306 and the transaction segment 418 (Figs. 23, 29, 44—B, and 53), said aliner working in conjunction with the aliner 589 (Fig. 11) to insure the proper positioning of the type wheels under influence of the differential mechanisms.

The intermediate segments, including the amount segments 306 and the transaction segment 418 (Figs. 29 and 44—B), rotatably supported on the shaft 264, have therein a plurality of alining notches 609 corresponding to the various positions of said segments and adapted to be engaged by an alining tooth 610 of an aliner 611 having bent-over arms which are free on a stud 612 supported between the frames 60 and 63. A comparatively strong spring 613 is tensioned to urge the aliner 611 in a clockwise or alining direction, but is normally restrained from doing so by a projection 614 thereon in cooperation with a shoulder 630 on a latch 615 connected, by a hub 616 free on a stud 617 in the frame 60, to a latch cam arm 618. A spring 619 (Fig. 29), tensioned between an arm of the aliner 611 and the latch 615, urges said latch into engagement with the projection 614, and said latch is normally effective, as shown in Fig. 29, to retain the alining tooth 610 out of engagement with the alining notches 609. An extension 620 of the arm 618 cooperates with a camming surface 621 cut in the periphery of the cam 493, and said cam 493 likewise carries a stud 622 adapted to cooperate with a camming surface 623 on an extension of said arm 618, to disconnect the latch 615 from the projection 614, as will be explained presently.

An arm of the aliner 611 (Figs. 29 and 44—B) carries a stud 624, which is engaged by a slot in one end of a pitman 625, the other end of which pitman is bifurcated to straddle an undercut portion of the hub of the cam 493. The pitman 625 carries a roller 626 (Fig. 23), which cooperates with a cam groove 627 cut in the outside face of the cam 510, said groove 627 functioning according to the time given in space 8 of the time chart (Fig. 52) to reciprocate the pitman 625.

By referring to Figs. 23 and 29 and space 8, Fig. 52, it will be seen that the cam groove 627 leaves the pitman 625 in a partially restored position at the end of machine operations. At the very beginning of machine operation, the cam groove 627, in cooperation with the roller 626, completes the restoration of the pitman 625 rearwardly or toward the left, as here viewed, to provide ample clearance in the left-hand end of the slot for the stud 624, so that the alining tooth 610 will be free to fully engage the alining notches 609 when the latch 615 is released. Rotation of the cam 493 and the cam surface 621 during machine operations causes a declining portion of said surface to ride away from the extension 620, to provide the necessary clearance so that the latch 615 may be disengaged. Continued rotation of the cam 493 causes the stud 622 to ride beneath a tail of the arm 618 and finally to engage the camming surface 623 to rock said arm 618 and the latch 615 counter-clockwise against the action of the spring 619, to disengage the shoulder 630 of said latch from the projection 614. This releases the aliner 611 to the action of the spring 613, which immediately engages the alining tooth 610 with the alining notches 609, to aline the intermediate segments, including the amount segments 306 and the transaction segment 418, in set positions. When the stud 622 moves beyond the surface 623, the spring 619 returns the latch 615 clockwise until the upper surface of the shoulder 630 comes to rest on the lower surface of the projection 614.

As the alining tooth 610 (Fig. 29) goes into engagement with the alining notches 609, a projection 628, secured to one arm of the aliner 611, contacts a rubber block 629, mounted in a bracket secured to the frame 60, to cushion the hammerlike action of the aliner 611, thereby preventing possible damage to the parts and also preventing excessive noise.

By comparing spaces 8 and 9 of the chart (Fig. 52), it will be seen that the stud 622 disengages the latch 615 (Fig. 29) to render the aliner 611 effective immediately after the intermediate segments have been positioned under influence of their differential mechanisms and just prior to the time that the aliner 589 (Fig. 11) becomes effective. After the aliner 589 has become effective, the cam groove 627 (Fig. 23) shifts the pitman 625 forwardly or toward the right, as viewed in Fig. 29, to cause the slot therein, in cooperation with the stud 624, to rock the aliner 611 counterclockwise against the action of the spring 613. Counter-clockwise movement of the aliner 611 disengages the alining tooth 610 from the alining notches 609 and moves the projection 614 beyond the shoulder 630 of the latch 615, whereupon the spring 619 is free to reengage said shoulder with said projection, to latch said aliner 611 in disengaged position, as here shown.

In order to insure that the latch 615 is reengaged with the projection 614 and remains thus reengaged, an inclining portion of the camming surface 621, in cooperation with the extension 620, completes the restoring movement clockwise of said latch, in case the spring 619 has failed to do so, and locks said latch in restored position, as shown in Fig. 29.

*Machine locking mechanism*

Various locking mechanisms have been provided for enforcing proper operation of the machine. These locking mechanisms are controlled by the total control slide and by various interlocks between the column selecting, transaction, and amount keys.

When the total control slide 92 is in Register position, as shown in Figs. 2 and 30, the Total and the Sub-total keys 193 and the highest order amount keys 191 are locked against depression. All other keys are unlocked at this time. When the total control slide 92 is in Lock register position, the motor bar 167 and all keys, except the Space key 195 and the Base lock key 89, are locked against depression. When the total control slide 92 is in Read total position, all keys are locked against depression. However, in this case, the motor bar 167 is unlocked and the machine is automatically conditioned for a sub-total or read operation, which may be initiated by depression of said motor bar.

When the total control slide 92 is in Add and reset position, the machine is automatically conditioned for adding operations, and all that is required to initiate such operations is depression of the motor bar 167 (Fig. 2). Likewise, when the total control slide 92 is in Add and reset position, the Cash, Charge, Received-on-account, Paid out, and No sale transaction keys are locked against depression; the Total and Sub-total keys 193 are unlocked; and the highest order amount keys 191 are unlocked. When the total control slide 92 is in Add and reset position, a total operation or a sub-total operation may be initiated by depression of, respectively, the Total or the Sub-total key 193 in conjunction with the motor bar 167. Depression of either the Total or the Sub-total key 193 locks all amount keys against depression and renders effective an auxiliary stop pawl for the column selecting keys 194 to cause the total and sub-total items to be printed in the first or left-hand column of the record material (Fig. 3), regardless of whether or not one of the column selecting keys 194 is depressed. Depression of the No sale key 193, when the total control slide 92 is in Register position, also actuates the auxiliary stop pawl for the column selecting keys 194 to cause no sale items to be printed in the first column of the record material, regardless of whether or not a column selecting key 194 is depressed.

When the total control slide 92 (Fig. 2) is in Register position or Add and reset position, the ledger number printing keys 192 are unlocked and may be depressed. When the total control slide is in Lock register position or Read total position, the ledger number printing keys are locked against depression. Depression of the No sale key 193 locks the amount keys 190 against depression, and depression of any one of said amount keys in turn locks the No sale key 193 against depression.

Clockwise releasing movement of the key lock shaft 177 (Fig. 15), upon depression of the motor bar 167, locks all depressed keys against release and locks all other keys against depression for the duration of machine operation. Clockwise releasing movement of the key lock shaft 177 is obstructed when any key is partially depressed.

Referring to Figs. 15, 17, 18, and 39, when the total control slide 92 is in Register position, the key lock shaft 177 is normally locked against clockwise releasing movement by a tooth 632 on a latch 633 free on a stud 634 in the frame 61. A spring 635 urges the latch 633 clockwise to normally maintain the tooth 632 in engagement with a projection 636 on an arm 637 secured to the key lock shaft 177. The latch 633 carries a stud 638, which cooperates with a downward extension 639 of a transaction control plate 640 slidably supported in the keyboard framework. A compressible spring 641, coiled around a stud carried by the extension 639 and compressed between said extension and a stationary portion of the keyboard framework, urges the control plate 640 rearwardly, or toward the right as viewed in Fig. 18, to normally maintain the forward walls of a series of notches in said control plate in contact with the lower ends of the stems of the column selecting keys 194. Depression of any one of the column selecting keys 194 causes an angular camming surface 642 thereon, in cooperation with the forward wall of the corresponding slot in the plate 640, to shift said plate forwardly against the action of the spring 641 to rock the tooth 632 of the latch 633 out of engagement with the projection 636 to free the key lock shaft 177 for clockwise releasing movement.

Extensions 643 of the control plate 640 (Figs. 17 and 18) cooperate with angular camming surfaces 644 on all of the transaction keys 193, with the exception of the Charge key and the Cash key, so that depression of any of the transaction keys, with the exception of the Charge key and the Cash key, shifts the control plate 640 forwardly to unlock the key lock shaft 177 in the manner explained above.

From the foregoing, it is evident that, when either the Charge key or the Cash key 193 is depressed, it is necessary to depress one of the column selecting keys 194 in order to unlock the key lock shaft 177 for releasing movement. However, when any one of the other transaction keys 193 is depressed, the key lock shaft is unlocked for releasing movement without the depression of a column selecting key.

The machine functions in the manner outlined above when the total control slide 92 (Fig. 37) is in Register position. When said total control slide 92 is in Read total position or Add and reset position, the latch 633 is rendered ineffective, and, as a result, the machine may be released for operation without the depression of either a transaction key 193 or a column selecting key 194.

Moving the total control slide 92 out of Register position, in which it is shown in Fig. 37, causes a camming slot 645 therein, in cooperation with a stud 646 in a crank 647 secured on the left-hand end of the shaft 212, to rock said crank and said shaft counter-clockwise. Counter-clockwise movement of the shaft 212 causes an arm 648 secured thereon, in cooperation with a slot in the forward end of the control plate 649 for the transaction keys 193 (see also Figs. 17 and 18), to shift said plate forwardly or toward the right. Forward movement of the plate 649 causes a notch 650 therein, in cooperation with a plate 651 (Figs. 17, 18, and 39), secured to the extension 639 of the control plate 640, to shift said control plate 640 forwardly to disengage the tooth 632 from the projection 636 to free the key lock shaft 177 for clockwise releasing movement.

It is therefore evident that, when the total control slide 92 is out of Register position, the latch 633 is ineffective and does not obstruct clockwise releasing movement of the key lock shaft 177. Therefore, when the total control slide 92 is in Read total position or Add and reset position, it is possible to release the machine for operation simply by depression of the starting bar 167 (Fig. 15). However, this is not true when the total control slide 92 is in Lock register position, as the stud 453 (Fig. 30) is in the path of the projection 454 at this time and obstructs releasing movement of the key lock shaft 177.

*Locking of keys during machine operation*

Clockwise releasing movement of the key lock shaft 177 (Figs. 15, 18, and 40), when the motor bar 167 is depressed, causes a camming surface 653 on the arm 637, in cooperation with a stud 654 in the right-hand arm of a yoke 655 free on a key release shaft 656 journaled in the frames 60 and 61, to rock said yoke 655 clockwise against the action of a spring 1630 (Fig. 31). Clockwise movement of the yoke 655 causes a projection 657 thereon to move into an opening 658 in a detent 659 for the column selecting keys 194, said detent being similar in every respect to the detent 206 (Fig. 31) for the amount keys 190, which has an opening 660 similar to the opening 658 and adapted to be engaged by the corresponding one of the projections 657 when the yoke 655 is rocked clockwise in the manner explained above. Each of the amount key banks 190 and 191, the transaction bank 193, and each of the ledger number banks 192 have a detent similar to the detent 206, with openings in the rearward ends thereof similar to the openings 658 and adapted to be engaged by corresponding projections 657 on the yoke 655 in exactly the same manner as explained in connection with the column selecting keys 194. The engagement of the projection 657 (Fig. 40) with the opening 658 locks the detent 659 against shifting movement, which in turn locks the depressed column selecting key 194 against release and locks all of the remaining column selecting keys against depression during operation of the machine.

Partial depression of a column selecting key 194 shifts the detent 659 forwardly to move the opening 658 out of alinement with the projection 657, so that said detent 659 will obstruct clockwise movement of the yoke 655, which, through the stud 654 and the camming surface 653, in turn obstructs clockwise releasing movement of the arm 637 and the key lock shaft 177 to prevent release of the machine for operation when a key is partially depressed.

When the key lock shaft 177 is in untripped position, as shown in Figs. 18 and 40, a hook-shaped portion 661 of the arm 637 latches over the stud 654 to obstruct clockwise movement of the yoke 655 and thereby retain the projections 651 beneath the detent 659 so that said detent will be free to move when a key is depressed.

Key releasing mechanism

Mechanism is provided for automatically shifting the detents for all the rows of keys forwardly, near the end of machine operation, to release all depressed keys. Manual means is provided also for operating the key releasing mechanism for releasing depressed keys when the machine is at rest.

Referring now to Figs. 31 and 39, the detent 659 for the column selecting keys 194 has a rearward extension 662, which cooperates with a rounded nose 663 on an arm 664 free on the key lock shaft 177. The arm 664 is notched to straddle an undercut portion of the bail of a yoke 665, the arms of which yoke are free on the shaft 177. The upper end of the detent 206 (Fig. 31) for the ten-cent amount bank shown in Fig. 31 cooperates with the rounded nose on an arm 666 similar to the arm 664 and having a notch portion which straddles the bail of the yoke 665 in the same manner as said arm 664. The detent for the transaction bank 193 and the detent for each row of ledger number printing keys 192 cooperate with their respective arms, which are similar in every respect to the arms 666 and which have notched portions which straddle the bail of the yoke 665 in the same manner as said arms 666.

By referring to Fig. 15 and space 13 of the time chart, Fig. 52, it will be seen that the mechanism shown in Fig. 15 restores the key lock shaft 177 counter-clockwise a considerable distance beyond home or normal position, and this excessive movement is utilized to operate the key releasing mechanism and to insure that the pawl 171 is restored a sufficient distance. Counter-clockwise restoring movement of the key lock shaft 177 (Fig. 39) causes a projection 667 on the arm 637, in cooperation with an undercut surface of the bail of the yoke 665, to rock said yoke counter-clockwise in unison therewith. Counter-clockwise movement of the yoke 665 carries the arms 664 and 666 (Figs. 31 and 39) in unison therewith, causing the rounded noses on said arms to engage the rearward ends of the detents 659 and 206 to shift said detents forwardly, against the action of their springs, to disengage the notches therein from the shoulders 208 of the depressed keys to permit said keys to be returned upwardly to undepressed position by their respective springs 205.

When the key lock shaft 177 is returned from its excessively restored position to normal or home position, which latter position is determined by the surface 165 (Fig. 15) on the upward extension of the clutch lever 163 coming into contact with the bent-over ear 166 on the motor bar plate 167, the arms 664 and 666 are restored clockwise to normal position, as shown in Figs. 31 and 39, to permit the detents 659 and 206 to be spring-returned to normal positions.

The key release lever 196 (Figs. 2, 15, and 39), which protrudes through an opening in the keyboard plate 204, is provided for manually operating the key releasing mechanism. The lever 196 carries a stud 668 journaled in a bracket secured to the keyboard plate 204. The lever 196 is pivotally connected by a link 669 to an arm 670 secured to the shaft 656. A spring 671 urges said lever 196 clockwise and the shaft 656 counter-clockwise to normally maintain said parts in home position, as shown here.

Manually shifting the finger lever 196 counter-clockwise, against the action of the spring 671, rocks the shaft 656 clockwise, causing a finger 672, secured thereon, to engage a stud 673 in the arm 664 to rock said arm and, through the yoke 665, to rock the arm 666 and all similar arms counter-clockwise to shift the locking detents for all the keys, including the detents 659 and 206, forwardly to release all depressed keys.

Release of the lever 196, after the keys have been released, permits the spring 671 to return said lever and connected parts to normal positions, as shown in Fig. 39. Angular surfaces on the lever 196 effectively cover the opening in the keyboard plate 204 (Fig. 15) for said lever, regardless of the positions thereof, to prevent possible tinkering with the mechanisms of the machine through said opening.

When the arm 670 (Fig. 15) is rocked clockwise by the lever 196 to manually release the keys, a stud 674, carried by said arm, passes in the path of an arcuate surface 675 on an extension of the arm 176 to obstruct clockwise releasing movement of the key lock shaft 177 and thereby prevent operation of the machine while the keys are being released. Clockwise releasing movement of the shaft 177 and the arm 176 causes a slot 676 in said arm to engage the stud 674 to lock the arm 670 and the shaft 656 against movement, so that the manual key release cannot be used inadvertently during operation of the machine.

Release mechanism for zero stop pawls

Figures 35, 36:
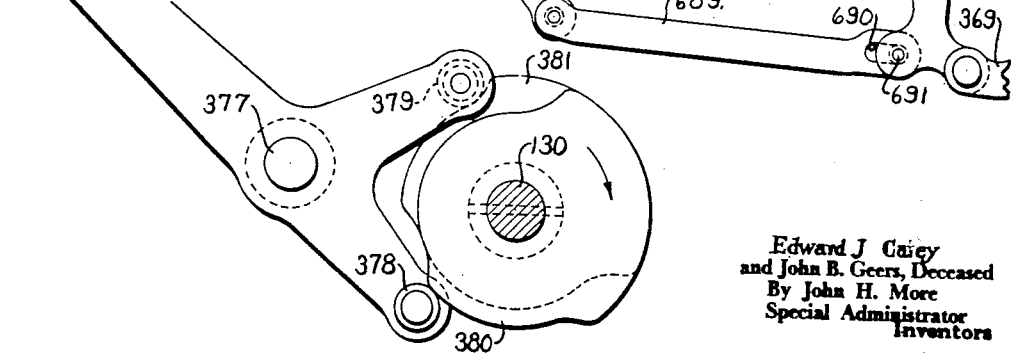
Fig. 35 is a detail view of the cam and lever mechanism for controlling the engaging and disengaging movements of the totalizer.
Fig. 36 is a detail view of the mechanism for disengaging the zero stop pawls in reading and resetting operations.

By referring to Figs. 7, 31, and 36, it will be recalled that the forward end of the control plate 207 for the ten-cent amount bank engages an upward extension of the zero stop pawl 211 and rocks said pawl counter-clockwise to ineffective position when an amount key is depressed.

Each of the zero stop pawls 211 for the amount banks has thereon a projection 678 (Figs. 7 and 36), which cooperates with the upper edge of the bail of a yoke 679, the arms of which yoke are free on the shaft 212. An extension 680 of one arm of the yoke 679 is pivotally connected to the forward end of a link 689, the rearward end of which has a slot 690, which engages a stud 691 in the arm 370 (Figs. 34 and 36).

By referring to Fig. 34, it will be recalled that the working surface of the segment 386 is opposite the stud 384 in total and sub-total printing operations. Therefore, initial movement clockwise of the levers 376 and 373, under influence of the cams 380 and 381 (Fig. 35), rocks the lever 371 counter-clockwise with the stud 384 as its pivot, to shift the link 369 rearwardly to cause the totalizer wheels to be engaged with the amount actuators 232 prior to initial movement of said actuators, as explained earlier. Rearward movement of the link 369 rocks the arm 370 counter-clockwise to shift the link 689 also rearwardly to in turn rock the yoke 679 (Figs. 7 and 36) and the zero stop pawls 211 for the amount banks counter-clockwise. Counter-clockwise movement of the pawls 211 disengages the teeth thereof from the extensions 215 (Fig. 7) of the slides 216 to free said slides for rearward movement under influence of the amount differential mechanisms, so that said slides may be positioned by the wheels of the totalizer, as explained previously.

After the amount actuators have been positioned under the influence of the wheels of the totalizer, the mechanism shown in Figs. 34 and 36 returns the yoke 679 and the zero stop pawls 211 to normal positions, so that said pawls will be effective when the slides 216 (Fig. 7) are returned to home position.

It will be recalled that the mechanism shown in Fig. 34 rocks the arm 370 clockwise beyond normal position in adding and sub-total taking operations, and a clearance portion of the slot 690 prevents this movement from being imparted to the yoke 679.

*Interlocking mechanism between the total control slide and the amount keys*

Locking mechanism between the total control slide 92 and the amount banks (Figs. 30 and 31) prevent said total control slide from being moved out of Register position or Add and reset position when an amount key is depressed, and, conversely, prevents the depression of an amount key when the total control slide is in either Lock register position or Read total position.

The forward end of the control plate 207 for the ten-cent amount bank (Figs. 30, 31, and 38) underlies a nose 692 of a segment 693 free on the shaft 212. The segment 693 carries a stud 694, which overlies a projection 695 on the zero stop pawl 211, whereby the spring 213 urges the said segment clockwise in unison with said zero stop pawl to normally maintain said segment in contact with the control plate 207.

Depression of any one of the amount keys 190 shifts the control plate 207 forwardly to rock the segment 693 counter-clockwise to move an outcurved surface 696 on said pawl beneath a bent-over edge 697 of the bail of a yoke 698, the arms of which yoke are pivotally supported by a shaft 1203 supported by the two lower screws 203. A spring 699 (Figs. 29 and 30) urges the yoke 698 clockwise, as viewed in Fig. 30, to normally maintain a stud 700, carried thereby, in engagement with a camming surface 701 on the top edge of the total control slide 92.

When the total control slide 92 is in Register position, as shown here, or when said slide is in Add and reset position, a corresponding low portion of the camming surface 701 is positioned opposite the stud 700. Consequently, the spring 699 retains the yoke 698 in its clockwise position (Fig. 30), so that the bent-over edge 697 is above the outcurved surface 696, and therefore there is nothing to prevent the depression of an amount key, as said surface 696 is free to move beneath said bent-over edge. Movement of the surface 696 beneath the edge 697, when an amount key is depressed, obstructs counter-clockwise movement of the yoke 698 and, through the stud 700 in cooperation with the camming surface 701, prevents movement of the total control slide 92 away from Register position or Add and reset position.

Moving the total control slide 92 from Register position or Add and reset position to either Lock Register position or Read total position (Figs. 30, 31, and 38) causes the camming surface 701, in cooperation with the stud 700, to rock the yoke 698 counter-clockwise, against the action of the spring 699, to move the edge 697 into the path of the outcurved surface 696 of the segment 693, to obstruct counter-clockwise movement of said segment and thereby prevent the depression of an amount key.

The connection formed between the segment 693 and the zero stop pawl 211 by the stud 694 and the projection 695 (Fig. 31) permits said zero stop pawl to be rocked independently of said segment by the yoke 679 in total and sub-total printing operations, as explained above.

There is a segment similar in every respect to and functioning exactly like the segment 693 for each amount bank, including the one hundred dollar amount bank 191 (Fig. 2).

As mentioned previously, the bank of transaction keys 193 (Fig. 10) and the bank of column selecting keys 194 (Fig. 12) each has a detent and a control plate similar in every respect to and operating exactly like the detent 206 and the control plate 207 (Fig. 31) for the amount keys, said control plates adapted to rock their respective zero stop pawls 404 and 702 to ineffective position when any one of the keys is depressed in either of these banks.

When the total control slide 92 is either in Register position, as shown in Fig. 30, or in Add and reset position, depression of any one of the transaction keys 193 or the column selecting keys 194 rocks the corresponding zero stop pawl 404 or 702 counter-clockwise to move an outcurved surface, similar to the surface 696 (Fig. 31), beneath the bent-over edge 697 to obstruct movement of the total control slide 92. However, other locking mechanism, presently to be described, prevents the depression of either the Total key or the Sub-total key 193 (Figs. 2 and 10) when the control slide 92 is in Register position, and prevents the depression of any other of the transaction keys 193 when said total control slide is in Add and reset position.

Each of the rows of ledger number printing keys 192 (Fig. 2) has a zero stop pawl similar in every respect to the zero stop pawl 404 for the transaction bank, said pawls having outcurved surfaces which are rocked beneath the bent-over edge 697 of the yoke 698, when any one of said ledger number keys is depressed, to obstruct movement of the total control slide 92 (Fig. 30) away from Register position or Add and reset position. When the total control slide 92 is in either Lock register position or Read total position, the bent-over edge 697 obstructs movement of the zero stop pawls for the ledger number keys 192, thereby preventing depression of any one of these keys when said slide is in either of said positions.

*Interlock between certain transaction keys and the amount keys*

Means controlled by the Total, Sub-total, and No sale transaction keys 193 (Figs. 10 and 38) locks the amount keys against depression when any one of these keys is depressed, regardless of the position of the total control slide 92, and, conversely, this mechanism locks the Total, Sub-total, and No sale keys against depression when an amount key is depressed.

The Total, Sub-total, and No sale transaction keys 193 have, respectively, angular camming surfaces 703, 704, and 705 (Fig. 38), which cooperate with corresponding slots in a control plate 706 slidably supported in the keyboard framework. A bent-up extension of the control plate 706 has a slot which engages a stud 707 in a crank 708 integral with a hub 709 secured to the shaft 1203. Also integral with the hub 709 are a cam 710 and a pawl 711, said pawl having a tooth which cooperates with an upward projection 712 on the right-hand arm of a yoke 713 free on the shaft 212. The forward edge of the bail of the yoke 713 cooperates with a hook-shaped extension 714 of the segment 693, and a spring 715 urges said bail 713 clockwise to normally maintain said segment 693 in yielding engagement with the forward end of the control plate 207 for the ten-cent amount bank.

Depression of any one of the Total, Sub-total, or No sale keys 193 causes the corresponding camming surface 703, 704, or 705, in cooperation with the corresponding slot in the control plate 706, to shift said plate rearwardly, which, through the stud 707 and the crank 708, rocks the hub 709, the cam 710, the pawl 711, and the shaft 1203 counter-clockwise. Counter-clockwise movement of the pawl 711 moves the lower end thereof into the path of the projection 712 to obstruct counter-clockwise movement of the yoke 713. Obstructing counter-clockwise movement of the yoke 713, through the segment 693, prevents forward movement of the control plate 207 and thereby locks the keys 190 of the ten-cent amount bank against depression.

Conversely, depression of an amount key 190 in the ten-cent amount bank (Figs. 31 and 38) shifts the control plate 207 forwardly to rock the segment 693 and the yoke 713 counter-clockwise to move the projection 712 into the path of the pawl 711 to obstruct counter-clockwise movement of said pawl. Obstructing counter-clockwise movement of the pawl 711, through the hub 709 and the crank 708, prevents rearward movement of the control plate 706 and thereby locks the Total, Sub-total, and No sale keys 193 against depression.

What has been said above concerning the interlock between the ten-cent amount bank 190 and the Total, Sub-total, and No sale keys applies equally as well to all the other amount banks, including the one hundred dollar amount bank 191, as each of these banks has a segment similar to the segment 693, which cooperates with the yoke 713 in exactly the same manner as said segment for the purpose explained above.

In addition to the pawl 711 (Fig. 38), there are two more such pawls (not shown) secured on the shaft 1203, which pawls cooperate with corresponding projections (not shown) on the yoke 713, similar to the projection 712, to overcome any tendency to spring on the part of said yoke 713.

Counter-clockwise movement of the cam 710 (Figs. 12 and 38), when any one of the Total, Sub-total, or No sale keys is depressed, causes a camming surface on said cam, in cooperation with a stud 716 in an auxiliary stop pawl 717 for the column selecting keys 194, said pawl being free on the shaft 212, to rock said pawl clockwise, against the action of a torsion spring 718, to move a tooth thereon into the path of a bent-over projection 719 (Fig. 12) on the column selecting slide 523, which projection also cooperates with the regular stop pawl 702 for this bank. This obstructs rearward movement of the slide 523 during machine operation, and, as a result, said slide and the differential mechanism for the column selecting keys are located in No. 1 position to position the movable type wheels 319 mounted in the shiftable framework 573 (Fig. 28) in No. 1 position, so that the items corresponding to the Total, Sub-total, and No sale keys will be printed in column one of the record material shown in Fig. 3.

By referring to Figs. 7, 10, 12, and 30, it will be recalled that the edge 697 of the yoke 698, in cooperation with the segments 693 for the amount banks, and in cooperation with the stop pawls 702 for the column selecting bank, the stop pawl 404 for the transaction bank, and the zero stop pawls for the four banks of ledger number printing keys, locks all of said keys against depression when the total control slide 92 is in either Lock register position or Read total position, and unlocks said keys for depression when said total control slide is in either Register position or Add and reset position.

It is desirable that the highest order row of amount keys 191 (Fig. 2) be locked against depression when the total control slide 92 is in Register position and that said keys be unlocked when said total control slide is in Add and reset position. It is likewise desirable that the Total and Sub-total keys 193 be locked against depression when the total control slide 92 is in Register position and that all other transaction keys 193 be unlocked at this time.

When the total control slide 92 (Figs. 37 and 38) is in Register position, as here shown, the control plate 649 for the transaction keys is also in the position here shown, in which position the top surface thereof, adjacent slots therein, is located in the path of projections 720 on the Total and Sub-total keys, to lock said keys against depression. Under these conditions, the Cash, Charge, Received-on-account, and Paid out transaction keys 193 are unlocked and may be depressed.

Moving the total control slide 92 out of Register position (Fig. 37) rocks the shaft 212 and the arm 648 counter-clockwise to shift the control plate 649 forwardly to cause clearance portions of the notches therein to be moved opposite the projections 720 on the Total and Sub-total keys, to free said keys for depression. Forward movement of the control plate 649 causes locking edges on the slots therein to move into notches 722 in all the other transaction keys 193 to lock said keys against depression when the control slide 92 is out of Register position.

By referring to Figs. 12 and 30, it will be recalled that, when the total control slide 92 is in either Lock register position or Read total position, the turned-over edge 697 of the yoke 698 prevents depression of all keys, including the Total key and the Sub-total key. When the total control slide 92 is in Add and reset position, the yoke 698 does not obstruct depression of the keys. Obviously, when said slide is in this position, the Total key and the Sub-total key may be depressed.

As explained previously, it is desirable that the highest order amount keys 191 (Figs. 2 and 37) be depressible only when the register is used as an adding machine; that is, when the total control slide 92 is in Add and reset position. Consequently, when said slide is in Register position, as shown here, locking edges on slots in a control plate 723, in cooperation with projections 724 on said keys 191, lock said keys against depression. Moving the total control slide out of Register position rocks the shaft 212 counter-clockwise, causing an arm 725 fast thereon, in cooperation with a notched portion of the control plate 723, to shift said plate forwardly to move clearance portions of the slots in said plate opposite the projections 724, so that the keys 191 may be depressed. As in the case of all other keys, the yoke 698 (Figs. 12 and 30) locks the highest order amount keys 191 against depression when the total control slide 92 is in either Lock register position or Read total position. Consequently, said keys can be depressed only when said total control slide 92 is in Add and reset position, in which position the yoke 698 is not effective.

Record material mechanism

The supply and receiving rolls for the record material, shown in Figs. 3, 4, and 5, are supported in a framework which is removably supported between the main frames of the machine and which is located at the front of the machine, where it is accessible through a closure in the cabinet portion of the machine. The closure giving access to the record material is locked in closed position when the total control slide 92 is in either Register position or Lock register position, and is unlocked automatically when said total control slide is moved to either Read total position or Add and reset position. Therefore, the record material is accessible only to those having keys to a lock in the total control slide, which lock is used for locking said slide in either Register position or Lock register position.

The last few items entered on the record material are visible through an opening in the top part of the closure giving access to the record material, said opening being covered with a transparent material, such as glass or pyralin. The extreme left-hand portion of the record material is reserved for the autographic entering of various data, and an opening in said transparent material gives access to this portion of said record material for this purpose.

Referring now to Figs. 47 to 51 inclusive, the removable framework for supporting the record material supply and receiving rolls comprises a right plate 726 and a left plate 727 connected in fixed relationship to each other by a rod 728. Trunnions formed by opposite ends of the rod 728 engage curved slots 729 in each of two similar plates 730 and 731 secured, respectively, to the right frame 61 and the left frame 60. Similar extending legs of the plates 726 and 727 have identical inverted V-shaped notches 732 and 733 adapted to engage, respectively, the circumference of similar hubs secured in axial alinement with each other in the frames 60 and 61, said hubs providing a bearing support for a shaft 734. The rod 728, in cooperation with the curved slots 729, forms a hinged support for the record material framework, and, when said framework is in operating position, as shown in Fig. 47, the V-shaped notches 732 and 733 engage the hubs in the frames 60 and 61, as here shown, to properly locate said framework in operating position. Two similar latches 735 (Figs. 47 and 50), pivoted on studs 736 in the plates 726 and 727, are urged clockwise, by springs 737, into engagement with stationary studs 738 in the frames 60 and 61, to latch the record material framework in operating position, as shown here.

To remove the record material framework from the machine, or to swing said framework to a more accessible position for the removal of the printed portion of the record material wound on the receiving roll, bent-over finger-pieces 739 on the two latches 735 are grasped, and said latches are rocked counter-clockwise, as viewed in Fig. 47, against the action of the springs 737, out of engagement with their respective studs 738, after which the entire record material framework may be rocked outwardly or counter-clockwise, the rod 728 and the slots 729 forming a pivot for said framework, until similar projections 741 on downward extensions of the plates 726 and 727 come into contact with the studs 738 to terminate rocking movement of said framework and to hold said framework in an accessible position. If it is desired to remove the framework from the machine, the rod 728 may be lifted out of the open upward ends of the slots 729.

A supply roll 742 (Figs. 48, 49, and 50) is rotatably supported by a framework comprising end plates 743 and 744 maintained in spaced relationship to each other by a rod 745 and a shaft 746. The framework for supporting the supply roll 742 is rotatably mounted between the plates 726 and 727 by means of two axially alined trunnion studs 747 in each of the plates 743 and 744 in cooperation with hubs 748 in said plates 726 and 727. The web of the supply roll 742 is wound around a metal tube or core (Fig. 50), the inside circumference of one end of said core fitting over a tenon of an axle 750 journaled in a bushing in the plate 744, and the inside circumference of the other end of said tube fitting over a similar tenon on a spring-pushed plunger 751 rotatably mounted in a bushing in the plate 743, said plunger 751 being in axial alinement with said axle 750.

To mount the supply roll 742 in the framework 743 and 744, the right-hand end of the core 749, as viewed in Fig. 50, is slipped over the tenon of the spring-pushed plunger 751, and said plunger is pushed toward the right, against the action of its spring, until the left-hand end of said core 749 may be slipped over the tenon on the axle 750.

Each of the plates 726 and 727 (Figs. 47, 48, 50, and 51) has an identical camming slot 752, which slots are engaged by similar rollers 753 on two similar levers 754 rotatably supported on opposite ends of the rod 745. Rearwardly extending arms of the levers 754 support a rod 755, said rod in turn being pivotally connected by two similar links 756 (see also Fig. 25) to receiving roll support arms 757 and 758 secured on the shaft 746.

By referring to Figs. 25 and 50, it will be seen that the web of the record material is unwound from the supply roll 742 and threaded around the rods 745 and 755 and a rod 759 supported by the arms 757 and 758, thence onto a core 760 for a record material receiving roll 761. The core 760 is similar in every respect to the core 749 for the supply roll and is rotatably supported between the arms 757 and 758.

The right-hand end of the receiving roll core 760 (Fig. 56) has therein two diametrically opposed clutch cuts adapted to engage two diametrically opposed tenons on a clutch 762 (Fig. 26) secured on the end of a plunger-like axle 763 rotatably supported in a bushing 764 secured in the arm 757. Also secured to the axle 763 is a knurled finger wheel 765 having therein a slot which engages an angular tongue 766 on a disk 767 secured to one end of a hub 768 rotatably mounted on the axle 763. The hub 768 has secured on the other end thereof a disk 769 and a receiving roll feed ratchet 770. A feed pawl 771 (Figs. 26, 27, and 50), free on a stud 772 carried by a paper feed disk 773 free on the axle 763, is urged into engagement with the teeth of the ratchet 770 by a spring 774. Likewise, a ratchet retaining pawl 775, free on a stud 776 in the arm 757, is urged clockwise (Fig. 27) into engagement with the teeth of the ratchet 770 by a torsion spring 777. The disk 773 (Figs. 25, 27, and 50) carries a stud 780 pivotally supporting the lower end of a link 781, the upper end of which link has a slot 782, which embraces the tenon of a stud 783 in a lever 784 free on the rod 745. The lever 784 has therein a hole which freely engages a tenon of a stud 785 secured in the lever 754 (Fig. 48).

Inasmuch as the record feeding means is operated by the impression means, the manner in which the lever 754 operates the record material feeding mechanism described above will be explained presently in connection with the description of said impression means.

The left-hand end of the core 760 for the receiving roll 761 (Figs. 50, 51, and 56) is supported by a pilot washer 786, which engages the inside circumference of said core, said washer being riveted to the face of a spring-pushed plunger 787 having two diametrically opposed tenons adapted to engage two diametrically opposed clutch cuts in the left-hand end of the core 760. The tenons on the plunger 787 engage corresponding notches in the large diameter of a counter-boring in a ratchet 789, to form an operating connection between these two parts. The small diameter of the counter-boring in the ratchet 789 rotatably mounts said ratchet on a fixed stud in the arm 758. A hub portion of the ratchet 789 has therein an annular groove which is engaged by a retaining clip 790 (Fig. 56) secured to the arm 758, to hold said ratchet and connected parts against lateral displacement.

A ratchet-operating pawl 791 (Fig. 51) has a slot 792, which fits loosely over the rod 759, and a torsion spring 793 urges said pawl 791 clockwise and rearwardly to normally maintain a tooth on the forward end thereof in contact with the teeth of the ratchet 789.

A disk 788, secured to the face of the ratchet 789, together with the face of the finger wheel 765 (Figs. 26 and 56), forms flanges for guiding the web of the record material around the core 760. Said disk 788 also serves to maintain the tooth of the pawl 791 in lateral alinement with said ratchet 789.

When the record material framework is in normal or reading position, as shown in Fig. 51, a rounded surface 794 on the pawl 791 is in operating relationship with a stud 795 in a lever 796 free on the shaft 734. A boring in the lever 796 is freely engaged by a tenon of a stud 797 in the lower end of a link 798, the upper end of which link is pivotally connected to one arm of a lever 799 free on the shaft 212. A stud 800 in another arm of the lever 799 engages a slot in the stem of the record material space key 195 (Figs. 2 and 51), said key having parallel slots therein which engage studs 801 and 802 secured in the left frame 60. A spring 803 urges the key 195 upwardly to normally maintain said key and connected parts in normal position, as shown in Fig. 51.

Depression of the key 195, when the record material framework is in reading position, as shown here, rocks the lever 799 clockwise, which, through the link 798, rocks the lever 796 counter-clockwise, causing the stud 795, in cooperation with the surface 794, to shift the pawl 791 forwardly, against the action of the spring 793, to rotate the ratchet 789 and the core 760 one tooth space to line-space the record material. A retaining pawl 804 (Fig. 51) free on a stud in the arm 758 is urged counter-clockwise by a torsion spring 779 to normally maintain the tooth of said pawl in engagement with the teeth of the ratchet 789, to prevent retrograde movement of said ratchet and the record material receiving roll 761.

In applying the receiving roll core 760, the right-hand end thereof, as viewed in Fig. 50, is slipped over a pilot washer 778 secured to the face of the clutch 762 (Fig. 26), after which said clutch, the wheel 765, and the axle 763 are depressed, against the action of their spring, until the left-hand end of the core 760 may be slipped over the pilot washer 786. The washer 786, together with its plunger 787, is forced inwardly into engagement with the core 760 by a compressible spring in the counter-boring in the ratchet 789. After the core 760 has thus been mounted in the printer framework, the knurled finger wheel 765 (Fig. 26) is rotated manually until the tenons on the clutch 762 and the plunger 787 drop into their corresponding clutch cuts in opposite ends of said core 760, to operatively connect said core to the automatic line-spacing mechanism and to the hand line-spacing mechanism.

After the core 760 is thus mounted in the record material framework, the web of the record material is unwound from the supply roll 742 (Figs. 25 and 51) and threaded around the rods 745, 755, and 759, after which the end of said web is inserted in a slot in the core 760 and said core is revolved manually by the finger wheel 765 (Fig. 26) to start the record material winding around said core.

*Impression mechanism*

The impression mechanism for printing in any of the columns of the multi-column record material comprises a platen which extends across all of the printing columns of the record material, said platen being operated by a toggle arrangement which causes a squeeze type of impression to be effected rather than the conventional hammer-blow type of impression. The impression mechanism is supported by the framework 743 and 744, which moves the record material from reading position to printing position and return, and obviously said impression mechanism moves in unison with said framework. Therefore, when the machine is at rest, the impression platen is in a non-printing or substantially vertical position, as shown in Fig. 48, and during machine operation said platen is moved from non-printing position to printing position, as shown in Fig. 49, and the impression mechanism is simultaneously engaged with its operating mechanism, which, upon operation, causes the platen to squeeze the record material and the inking ribbon into contact with the type wheels to record the data relating to the machine operation being performed.

The impression mechanism comprises righthand and left-hand arms 805 and 806 (Figs. 48, 49, and 50) similar in outline and each having similar slots 807 which engage the trunnions 747 carried by each of the plates 743 and 744. Similar slots 808 in the lower ends of each of the arms 805 and 806, and parallel to the slots 807, engage studs 809 carried by the plates 743 and 744 to slidably mount said arms in the record material framework. Each of the arms 805 and 806 has on the upper end thereof in-turned ears which straddle similar ears on a U-shaped platen support bar 811, each set of ears being pivotally connected to each other by means of pins 810 which pass through borings therein. The channel formed in the U-shaped bar 811 (Figs. 48 and 50) supports a long resilient impression block 812, which is secured against displacement by three screws threaded into the side of said channel bar, said screws having pointed ends which penetrate the resilient platen block. The bottom of the platen block 812 rests on a long adjusting plate (not shown) supported in the channel of the bar 811, said plate being adjustable by means of screws threaded into the bottom of said frame, to in turn adjust the face of the platen block 812 in relation to the type wheels.

When the framework which supports the record material is rocked from reading position, as shown in Fig. 48, to printing position, as shown in Fig. 49, the platen block 812 and its supporting framework also move in unison therewith, and the line-spacing mechanism functions in a manner to be described presently, to cause the record material to be automatically line-spaced prior to operation of the impression mechanism.

The mechanism for rocking the record material framework from non-printing position to printing position and vice versa comprises two identical studs 813 (Figs. 49 and 50) carried by the plates 743 and 744, said studs adapted to be engaged with notches in the upper ends of similar arms 814 when the printer framework 726 and 727 is properly mounted in the machine, as shown in Fig. 48. The lower ends of the arms 814 are slotted to embrace the shaft 488, and each of said arms carries a stud 815, which extends through corresponding slots in each of two arms 816 secured to the shaft 488. A compressible spring 817 forms a resilient connection between each pair of arms 814 and 816 and constantly urges said arms 814 upwardly to maintain the notches therein in engagement with the studs 813 (Figs. 48 and 49) regardless of the angular relationship of said studs to the shaft 488.

By referring to Fig. 29, it will be recalled that the shaft 488 is rocked by the groove 492 in the cam 493, according to the time given in space 11 of the time chart, Fig. 52, first clockwise and back to normal position, as viewed in Fig. 29, and counter-clockwise and return, as viewed in Figs. 48 and 49.

Initial movement counter-clockwise of the shaft 488 (Figs. 48 and 49) rocks the record material framework 743 and 744 from the position shown in Fig. 48 to the position shown in Fig. 49, to bodily move the record material supply roll 742, the receiving roll 761, and the impression platen assembly 812 from reading position to printing position. As the impression platen assembly moves to printing position, the cam slots 752 (Figs. 48, 49, and 50), in cooperation with the rollers 753, rock the levers 754 clockwise, in relation to the record material framework, which is also moving in a clockwise direction at this time. Clockwise movement of the levers 754, through the stud 785 carried by the right-hand lever 754 (Fig. 50), imparts similar movement to the lever 784 (Fig. 25), which, by means of the stud 783 in cooperation with the slot 782, shifts the link 781 forwardly to rock the disk 773 (see also Fig. 27) also in a clockwise direction. Clockwise movement of the disk 773 (Figs. 25 and 27) causes the feed pawl 771 carried thereby, in cooperation with the teeth of the ratchet 770, to rotate the core 760 (Fig. 26) and the record material receiving roll 761 the equivalent of one tooth space to line-space the record material prior to operation of the impression mechanism.

Clockwise movement of the levers 754 (Figs. 48 and 50), through the connections comprising the guide rod 755, the links 756, the arms 757 and 758, and the guide rod 759, slightly collapses the record material guiding means to relieve the tension on the web of the record material while it is being line-spaced, to overcome the danger of tearing said web and to prevent unnecessary strain on the line-spacing mechanism.

Clockwise movement of the record material framework 743 and 744 from reading position to printing position (Figs. 48, 49, and 50) engages two axially alined studs 818, carried by each of the impression arms 805 and 806, with notches in the upper ends of operating arms 820 and 821 secured to the shaft 734. An extension of the arm 820 has pivotally connected thereto the lower end of a toggle link 822, the upper end of which is pivotally connected by a stud 823 to a companion toggle link 824 rotatably mounted on a stationary stud 825 in the right frame 61. The stud 823 also pivotally supports the forward end of an operating pitman 826, the rearward end of which is bifurcated to straddle the shaft 130, said pitman carrying a roller 827 which cooperates with a camming groove 828 in the right-hand face of the cam 301 (Figs. 44—A, 44—B, 45, and 49).

The cam groove 828, in cooperation with the roller 827, shifts the pitman 826 first forwardly and then back to normal position according to the time given in space 12 of the time chart (Fig. 52). Forward movement of the pitman 826, which, it will be seen by comparing spaces 11 and 12 of the time chart (Fig. 52), occurs after the record material framework has been rocked to printing position (Fig. 49), expands or lengthens the toggle links 822 and 824 to rock the arm 820, the shaft 734, and the arm 821 clockwise. Clockwise movement of the arms 820 and 821 shifts the impression arms 805 and 806 rearwardly on their supporting studs 747 and 809, to cause the impression platen 812 to press the web of the record material and an inking ribbon 829 into contact with all of the type wheels (Fig. 28), including the transaction type wheel 426 and the amount wheels 319, to record the transaction on the web of the record material.

After the impression has been made, the pitman 826 (Fig. 49) is returned rearwardly to shift the impression assembly to normal position, after which the shaft 488 is returned clockwise by the cam groove 492 (Fig. 29) to restore the record material framework 743 and 744 to reading position. When the framework is in reading position, the portion of the record material carrying the recordings of the last transaction and several previous transactions is visible through an opening 830 (Figs. 1 and 47) in a closure 831 hinged to the cabinet 69. The closure 831 encloses the record material framework 726 and 727, and the opening 830 therein is preferably covered with a transparent plastic material 832. An opening 833 (Fig. 1) in the transparent material 832 exposes the extreme left-hand edge of the record material, so that various data may be autographed thereon opposite the printed records of the transactions, if desired. A table 834 (Figs. 1, 25, and 50), supported by the rods 745 and 755 of the record material framework, is located directly beneath the autographic opening 833 and provides a backing for the web of the record material for the autographic entering of items thereon.

When the printer framework 726 and 727 is removed from the machine, it is necessary to latch the record material framework 743 and 744 in reading position, as shown in Figs. 47 and 50, so that the studs 813 will remain in alinement with the notches in the upper ends of the arms 814, so that said studs will reengage said notches when the record material framework is again placed in the machine.

This retaining of the rockable portion of the record material framework in reading position, as shown in Fig. 48, is effected by two identical latches 835 (Figs. 47 and 50) pivoted on studs 836 carried by the plates 726 and 727. The latches 835 are urged clockwise by the springs 737, which are tensioned between said latches and the latches 735, which latter latches secure the printer framework in operating position, as previously explained. Each of the latches 835 has a stud 837, which cooperates with a camming surface 838 on each of the plates 730 and 731 to retain the hook-shaped upper ends of said latches 835 out of engagement with the rollers 753 carried by the levers 754, so that the record material framework 743 and 744 may be rocked to and from printing position during machine operation.

When the printer framework, including the plates 726 and 727 and all the parts assembled therebetween, is removed from the machine by manual release of the latches 735 in the manner previously explained, withdrawal of the studs 837 from the surfaces 838 permits the springs 737 to rock the latches 835 clockwise, as viewed in Fig. 47, into engagement with the rollers 753, to secure the levers 754 and the rockable record material framework in reading position, as shown in Fig. 48, so that the studs 813 will reengage the notches in the upper ends of the arms 814 when the printer framework is again placed in the machine.

As brought out in the general description of the impression mechanism, the printer framework is accessible through the closure 831, which is hinged to the cabinet 69, and said closure is locked in closed position when the total control slide 92 (Figs. 1, 41, and 47) is in either Register or Lock register position, and is unlocked when said total control slide is in either Read total or Add and reset position.

By referring to Fig. 41, it will be recalled that the total control slide 92 is provided with a lock 93 and a key, which lock, in cooperation with notches in the locking plate 96, may be used to lock said total control slide 92 in either Register position or Lock register position. When the total control slide 92 is locked in either of these positions, the closure 831 is automatically locked closed, as shown in Fig. 47, so that unauthorized persons—that is, persons without keys to the lock 93—will not have access to the record material and the printer framework.

Each of downward extensions 841 on each side of the closure 831 (Figs. 1 and 47) carries a stud 842 adapted to be engaged by the hook-shaped ends of two identical latches 843 pivoted on studs 844, carried, respectively, by the frames 61 and 60, to normally lock said closure 831 closed. Springs 845, tensioned between studs 846 in the latches 843 and stationary studs 847 in each of the frames 61 and 60, urge said latches 843 clockwise into engagement with the studs 842. An extending tip on each of the latches 843 cooperates with the studs 847 to limit the clockwise movement of said latches, under influence of the springs 845, in relation to the studs 842, so that said studs may properly by-pass the rounded noses of said latches 843, when the closure 831 is being closed.

The studs 846 cooperate with upwardly extending fingers of two latch operating levers 848 pivoted on studs 849 in the frames 61 and 60. Each of downward extensions of the levers 848 has an arcuate surface 850 adapted to cooperate with camming nodes 851 on two identical cams 852 secured on the shaft 459.

By referring to Figs. 28, 30, and 47, it will be recalled that the total control slide 92 is connected, by the segment 456 and the train of gearing shown in Fig. 30, to the shaft 459, to position said shaft in accordance with the position of said total control slide 92, said shaft in turn positioning the X and Z type wheel 465 for recording the type of operation being performed. When the total control slide 92 is in Register position, as shown in Fig. 30, the shaft 459 and the cams 852 are positioned as shown in Fig. 47, in which position the nodes 851 are out of cooperative relationship with the arcuate surfaces 850. Consequently, the latches 843 remain in engagement with the studs 842, as shown here, to lock the closure 831 in closed position. Likewise, when the total control slide 92 is in Lock register position, the nodes 851 of the cams 852 are still out of cooperative relationship with the arcuate surfaces 850, and, as before, the closure 831 remains locked.

When the total control slide 92 is in either Read total position or Add and reset position, the shaft 459 and the cams 852 (Figs. 30 and 47) are so positioned that the rounded nodes 851 engage the arcuate surfaces 850 to rock the levers 848 clockwise. Clockwise movement of the levers 848 in turn rocks the latches 843 counter-clockwise, against the action of the springs 845, to disengage the hooks on said latches from the studs 842 to unlock the closure 831.

Inasmuch as the total control slide 92 may be locked in either Register position or Lock register position, it is possible to limit the opening of the closure 831 to persons having possession of keys to the lock 93. If the latches 843 (Fig. 47) are moved from unlocked position to locked position while the closure 831 is open, the extending tips on said latches, in cooperation with the studs 847, position said latches so that the studs 842 may freely by-pass the rounded noses of said latches when the closure 831 is being closed, whereupon the springs 845 return said latches into engagement with said studs to lock the closure 831 in closed position, as shown herein.

A tension device is provided for applying frictional drag to the record material supply roll 742 (Figs. 25 and 50) to insure that the web of the record material is held taut when the record material framework 743 and 744 is in either reading position or printing position, as shown, respectively, in Figs. 48 and 49.

The tension device includes a friction plate 853 (Figs. 25 and 50) having bent-over ears which freely engage the shaft 746, said plate having a slot 854 through which extends a pin 855 free in a hole in said shaft 746. A torsion spring 856, loosely coiled around the shaft 746, has one end thereof looped around an annular groove in one end of the pin 855 to retain said pin in place, and the other end of said spring is looped around the downward edge of the plate 853. The spring 856 is tensioned to urge the plate 853 counter-clockwise, as viewed in Fig. 25, into frictional engagement with the circumference of the supply roll 742 to impart a braking effect to said supply roll to insure that the web of the record material is retained taut when the record material framework is in reading position or printing position.

The pin 855, in cooperation with the slot 854, prevents lateral displacement of the friction plate 853 on the shaft 746 and determines the extent of rotary movement of said plate under influence of the spring 856.

MODE OF OPERATION

It is believed that a full understanding of the operation of the machine embodying this invention will have been obtained from the preceding specification. Nevertheless, a brief description of a system of operation in conjunction with Figs. 2, 3, 4, and 5 may be helpful and will be given in the ensuing pages.

Fig. 2 discloses one of many keyboard arrangements of the machine embodying this invention, and in this arrangement the machine has been adapted for use by filling stations. However, it is not desired to limit the use of this machine to filling stations or to any particular business, for that matter, as the versatility of the machine well adapts it for use in many other businesses, including dry cleaning establishments, beauty parlors, drug stores, grocery stores, candy stores, flower shops, and the like.

The record material, supported by the removable framework 726 and 727 (Figs. 3, 4, 5, and 50) is in the form of a comparatively wide strip divided into nine vertical columns for the classifying of various items. The columns of the record strip are numbered I to IX inclusive, respectively, from left to right, and the numbers II to IX inclusive correspond to the like-numbered column selecting keys 194 (Fig. 2), which keys select the corresponding columns for the recording of the amounts of various items during a business period.

The extreme left-hand column (I) is necessarily wider than the other columns, as the ledger numbers, corresponding to the keys 192 (Fig. 2), the operation identifying symbols, corresponding to the position of the total control slide 92, and the transaction identifying symbols, corresponding to the transaction keys 193, are always printed in this column. Likewise, the type wheels of the two higher amount orders always print in this column, as only the four lower order type wheels are shiftable for the recording of amounts in columns II to IX inclusive.

When no column selecting key 194 is depressed, column I is always selected for the recording of amounts corresponding to the four lower order type wheels. It is compulsory to print the results of sub-total and total taking operations in column I, as is also the case with no sale items.

The left-hand portion of column I is reserved for the autographic entering of various data opposite the recordings of the different items.

In the present adaptation, the column selecting keys 194 are numbered II to IX, respectively (Fig. 2), and these keys select the corresponding columns of the record material for the entering of various items corresponding thereto. Data for identifying the different items represented by the column selecting keys II to IX, respectively, is recorded on a legend strip 857 (Figs. 1 and 2) mounted in a holder secured to the top surface of the keyboard plate 204 and located immediately to the right of said column selecting keys 194. As indicated by the legend strip 857 and by Fig. 3, the column selecting keys II to IX inclusive refer, respectively, to the following items: Regular gasoline, Ethyl gasoline, Oil, Chassis lubrication, Accessories, Anti-freeze solution, Miscellaneous items, and Tax.

It will be remembered that the column selecting keys 194 control the columnar positioning of the shiftable framework which supports the four lower order amount type wheels, for the recording of amounts in the various columns of the record strip corresponding to said column selecting keys.

In the present system, it is intended that only the Cash and Charge transaction keys 193 be used in connection with the column selecting keys 194. Therefore all of the items printed in columns II to IX inclusive of the record strip (Fig. 3) are either cash or charge items, the cash items being identified by a star printed in column I, opposite said items, and charge items being identified by the abbreviation "Chg." printed in column I, these identifying symbols being printed by the transaction type wheel, which is positioned under influence of the transaction keys 193. It is compulsory to depress one of the column selecting keys 194 in conjunction with either the Cash key 193 or the Charge key 193 before the machine may be released for operation by use of the motor bar 170.

It is not compulsory to use the column selecting keys 194 in conjunction with the Received-on-account, the Paid out, or the No sale transaction keys 193 (Fig. 2) in order to be able to depress the motor bar 170. Therefore, the items represented by these three keys are always printed in column I of the record material, as this is the column in which the four lower order amount type wheels print when no column selecting key 194 is depressed.

The received-on-account, paid out, and no sale items are identified by appropriate identifying abbreviations printed in column I of the record material by the transaction type wheel.

The four rows of ledger number printing keys 192 (Fig. 2) are provided for printing various identifying numbers, such as invoice numbers, department numbers, clerk numbers, etc. The ledger numbers are always printed in column I of the record material.

By referring to Fig. 34, it will be recalled that only cash items and received-on-account items are entered into the totalizer when the total control slide 92 is in register position, in which position said total control slide 92 should be when the entries shown in Fig. 3 are made. Charge, paid out, and no sale items are merely printed upon the record strip and are not added into the totalizer.

The entries on the fragment of record strip shown in Fig. 3 are illustrative of a portion of the items sold during the day by an average filling station. The first item shown in Fig. 3 is a cash item of $4.67 and is printed in column VII of the record material, which identifies this item as anti-freeze solution. The second entry is a cash item of $5.67 and is printed in volumn V, which identifies it as a lubrication item. The next item of $45.60 is identified by the transaction type wheel as a paid out item and is printed in column I of the record strip. In this case, the ledger number 3100 is printed opposite the item, and the autographic notation "Accessories" is written on the record strip opposite said ledger number.

Next on the fragment of record material shown in Fig. 3 is a charge item of $30.61, and, as the amount of this item is printed in column VIII, it is identified as a miscellaneous item, such as tires, battery, etc. Next is a no sale transaction, and it will be recalled that depression of the No sale key 193 (Fig. 2) locks all the amount keys against depression and causes the column printing type wheels to be located in column I position to print the zeros of the two lowest orders in this column. The next item is a received-on-account item of $30.41, and the amount of this item is printed in column I of the record material and is simultaneously added into the totalizer.

The other entries on the record strip shown in Fig. 3 are made in exactly the same manner as explained above.

At the end of the business period, a sub-total of all the cash and received-on-account items is taken by moving the total control slide 92 (Fig. 2) to Read total position and pressing the motor bar 170, which releases the machine for a sub-total operation, during which the sub-total $80.87 is printed in column I of the fragment of record material shown in Fig. 3 and the identifying characteristic (+ Sub) is printed to the left thereof, which identifies this as a plus sub-total item.

At the end of a business period, it is desirable to analyze the business of said period, and this may easily be done on the present machine by moving the total control slide 92 from Register position to Add and reset position. As explained in connection with Fig. 47, this unlocks the closure 831, giving access to the removable printer framework so that said framework may be removed and the fragment of record strip, shown in Fig. 3 and carrying the entries for the preceding business period, may be removed from the receiving roll to have the entries thereon available for the purpose of analysis.

After the fragment of record material containing the day's receipts is removed from the receiving roll, the web of the record material is re-threaded on the core of said roll and the printer framework is replaced in the machine, thus exposing a new section of record material to the printing mechanism. The total control slide 92 is then moved to Add and reset position and the Total key 193 is depressed, after which the motor bar 170 is depressed to initiate a total recording operation. During the total recording operation, the totalizer is cleared and the amount of the total in the totalizer ($80.87) is printed in column I of the fragment of record strip shown in Fig. 4, and an identifying symbol (+ Tot) is simultaneously printed opposite said amount.

Next in the analysis of the day's business, the cash transactions in each group are listed individually in their respective columns of the record strip and are simultaneously added into the totalizer. After all the items of a particular class or group have been entered, the totalizer is cleared or reset to print a group total of the items of said class. For example, the cash transactions of $5.00 and $2.80, located in column II of Fig. 3, are copied in column II of Fig. 4, after which the Total key 193 is depressed, and in a total taking operation, a group total ($7.80) of the cash items $5.00 and $2.80 is recorded in column I of the record material. All of the cash transactions of the different classes of merchandise are handled in this manner, including the tax transactions, which are recorded in column IX of the record material (Fig. 4).

After all of the cash transactions have been analyzed in the manner explained above, the charge transactions of $30.61, $1.20, and $1.25 are entered in column I of the record material and are simultaneously added into the totalizer. After all the charge transactions have been entered, the totalizer is cleared to print a group total ($33.06) of such charge items directly therebeneath. Next, the received-on-account transactions of $30.41 and $16.00 are handled in the same manner, and finally the paid out transactions of $45.60 and $3.25 are listed individually in column I of the record strip and are simultaneously added into the totalizer, after which the totalizer is cleared to print the total of $48.85 of the paid out transactions directly therebeneath.

Next, the fragment of record strip containing the group totals (Fig. 4) is removed from the machine, and in a further analysis, shown in Fig. 5, the group totals of all the cash and received-on-account items are entered individually in column I of the fragment of record strip shown here and are simultaneously added into the totalizer. After this, the totalizer is cleared to print a grand total ($80.87) of the cash and received-on-account items directly beneath said group totals in column I, thus providing a means of proving the total of such items recorded at the bottom of the fragment of record strip shown in Fig. 3 and at the top of the fragment of record strip shown in Fig. 4.

As brought out previously, it is not the desire to limit the use of the machine of this invention to any particular business or to any particular business system, as the many unique features and the versatility of said machine make it adaptable for use in connection with numerous other businesses and numerous other business systems.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, having a totalizer and actuators for the totalizer, said actuators movable in one direction for adding amounts into the totalizer and in another direction for taking a total from the totalizer, the combination of means to engage and disengage the totalizer with and from the actuators; means to impart two excursions of movement to the engaging and disengaging means, one of said excursions timed to engage the totalizer with the actuators when moved in adding direction and the other excursion timed to engage the totalizer with the actuators when moved in a total taking direction; means, normally in a neutral position but adapted to be moved in either of two directions, to connect the engaging and disengaging means to the imparting means; means to move the connecting means in either of its two directions; means, including a lever with a projection thereon, to transmit the movement of the moving means to the connecting means; add control keys; total control keys; a member positioned under influence of the control keys, said member cooperating with the projection, when positioned under influence of the add control keys, to cause the connecting means to be moved in one direction to connect the engaging and disengaging means to the imparting means during the second excursion of its movement whereby the totalizer is engaged and disengaged in add timing; and an element positioned by the member, said element cooperating with the projection, when the member is positioned under influence of the total control keys, to cause the connecting means to be moved in another direction, to connect the engaging and disengaging means to the imparting means during the first excursion of its movement, to cause the totalizer to be engaged with and disengaged from the actuators in total taking timing.

2. In a machine of the character described, having a totalizer and actuators therefor, said actuators operated to receive one differential excursion during each machine operation, the combination of means to engage and disengage the totalizer with and from the actuators, said totalizer engaged with the actuators during the initial movement of the actuators for total taking or engaged with the actuators during the return movement for adding operations; means to impart two excursions of movement to the engaging and disengaging means each machine operation; means including a movable link to connect the engaging and disengaging means to the imparting means, said link being normally in a neutral position, in which it is disengaged from the imparting means; a lever having a floating pivot thereon; means to connect the lever to the link; means to rock the lever from a normal position first in one direction, then in another direction, then back to normal position to engage and disengage the link with and from the imparting means; total control keys; add control keys; a member positioned under influence of the control keys, said member effective when positioned under influence of an add control key to obstruct movement of the floating pivot, when the lever is moved in said another direction to cause the link to be engaged with the imparting means during its second excursion of movement, to in turn cause the totalizer to be engaged with the actuators when the actuators receive their return movements in adding time; and an element positioned by the member, said element effective when the member is positioned under influence of a total control key to obstruct movement of the floating pivot when the lever is moved in said one direction, to cause the link to be engaged with the imparting means during its first excursion of movement, to cause the totalizer to be engaged with the actuators when the actuators receive their initial movement in total taking time.

3. In a machine of the class described, having a totalizer and actuators for the totalizer, said actuators operated to receive one differential excursion during each machine operation, the combination of means to engage and disengage the totalizer with and from the actuators, said totalizer engaged with the actuators during the initial movement of the actuators for total taking or engaged with the actuators during the return movement for adding operations; means to impart two excursions of movement to the engaging and disengaging means each machine operation; means, including a link, for connecting the engaging and disengaging means to the imparting means, said link normally disengaged from said imparting means, but shiftable in two directions to be engaged therewith; means, including a lever having a floating pivot, to shift the link in either of its two directions; add control keys; total control keys; a member positioned under influence of the control keys, said member effective when positioned under influence of an add control key to obstruct the floating pivot to cause the lever to shift the link in one direction to engage said link with the imparting means during its second excursion of movement, to cause the totalizer to be engaged with the actuators when the actuators receive their return movement in adding time; and an element positioned by the member, said element effective when the member is positioned under influence of the total control keys to obstruct the floating pivot to cause the lever to shift the link in another direction to engage said link with the operating means during its first excursion of movement to cause the totalizer to be engaged with the actuators when the actuators receive their initial movement in total taking time.

4. In a machine of the character described, having a totalizer, the combination of actuators for the totalizer, said actuators movable in a forward direction to clear the totalizer and movable in a return direction to add amounts in the totalizer; means to engage and disengage the totalizer with and from the actuators; means to impart two excursions of movement to the engaging and disengaging means each machine operation; means, comprising a link, to connect the engaging and disengaging means to the imparting means, said link normally disengaged from said imparting means but shiftable in two directions to be engaged therewith; means, comprising a lever having a floating pivot, to shift the link in either of its two directions; depressible control keys; a member positioned under influence of the control keys and effective when certain control keys are depressed to obstruct the floating pivot to cause the lever to shift the link in one direction to engage said link with the imparting means during its second excursion of movement, to cause the totalizer to be engaged with the actuators during their return movement, to add amounts in the totalizer; and an element connected to and positioned by the member, said element effective when the member is positioned by depression of a certain control key to obstruct the floating pivot to cause the lever to shift the link in another direction to engage said link with the imparting means during its first excursion of movement to cause the totalizer to be engaged with the actuators during their forward movement to clear amounts therefrom, said member and said element effective when positioned by depression of another certain control key to simultaneously obstruct the floating pivot to cause the lever to shift the link in both directions, to engage said link with the imparting means during its first and second excursions of movement to cause the totalizer to be engaged with the actuators during their forward and return movements to read amounts in said totalizer.

5. In a machine of the class described, having a totalizer, the combination of actuators for the totalizer, said actuators movable once in a forward direction to clear the totalizer, and said actuators movable once in a return direction to add amounts in the totalizer during each operation of the machine; means to operate the machine; means to engage and disengage the totalizer with and from the actuators; means to impart two excursions of movement to the engaging and disengaging means each machine operation; means, comprising a link, to connect the engaging and disengaging means to the imparting means, said link normally disengaged from said imparting means but shiftable in two directions to be engaged therewith; means, comprising a lever having a floating pivot, to shift the link in either of its two directions; control keys; a member positioned under influence of the control keys; and an element positioned by the member, said member and said element cooperating with the floating pivot to cause the lever to shift the link in either or both of its two directions, to engage said link with the imparting means during its first or second, or both, excursions of movement, to cause the totalizer to be engaged with the actuators during their forward or return, or both, movements, depending upon which of the control keys is effective.

6. In a machine of the class described, capable of adding, total-taking, and sub-total taking operations, said machine effecting identical operating cycles for each of said operations, said machine having a totalizer and actuators for the totalizer, the combination of means to engage and disengage the totalizer with and from the actuators; means to impart two complete engaging and disengaging movements to the engaging and disengaging means, one of said movements effective to engage and disengage the totalizer with and from the actuators in add timing, the other of said movements effective to engage and disengage the totalizer with and from the actuators in total-taking timing, and a combination of the two movements effective to engage and disengage the totalizer with and from the actuators in sub-total-taking timing; means, including a part connected to the engaging and disengaging means and engageable with the imparting means, to operatively connect said engaging and disengaging means to said imparting means; means normally effective to retain the part in a neutral position, in which position it is disengaged from the imparting means; selectively controlled means to move the part to cause it to be engaged with the imparting means during either of its engaging and disengaging movements or during both of such movements; keys to control the different types of machine operations; a member positioned under control of the control keys; and an element positioned by the member, said member and/or said element cooperating with the moving means to cause it to engage the part with the imparting means during either or both of its engaging and disengaging movements, depending upon which control key is effective, to thereby control the engaging and disengaging of the totalizer with and from the actuators in adding, total-taking, or sub-total-taking operations.

7. In a machine of the class described, capable of performing adding and total-taking operations, said machine effecting identical operating cycles for either of said operations, said machine having a totalizer and actuators for the totalizer, said actuators movable in one direction to add amounts into the totalizer and movable in another direction to take totals from the totalizer, the combination of means to engage and disengage the totalizer with and from the actuators; means to impart two complete movements to the engaging and disengaging means each machine operation, either of said movements being capable of completing an engagement and a disengagement of the totalizer with and from the actuators, the first of said movements timed to engage the totalizer with the actuators during their movement in a total-taking direction, and the second of said movements timed to engage the totalizer with the actuators during their movement in an adding direction; means, comprising a part connected to the engaging and disengaging means and connectable to the imparting means, for connecting the engaging and disengaging means to the imparting means for operation thereby in adding and/or total-taking operations; means to normally retain the part in a neutral position, in which position it is disconnected from the imparting means; means to move the part to engage it with the imparting means during its first or second engaging and disengaging movement; control keys; a member positioned under influence of the control keys and cooperating with the moving means, to cause the part to be connected to the imparting means during its second movement to cause the totalizer to be engaged with and disengaged from the actuators in add timing; and an element positioned by the member and cooperating with the moving means to connect the part to the imparting means during its first movement to cause the totalizer to be engaged with and disengaged from the actuators in total-taking timing.

8. In a machine of the class described, capable of performing adding and total-taking operations, said machine effecting identical operating cycles for either of said operations, said machine having a totalizer and actuators for the totalizer, said actuators movable in one direction to add amounts into the totalizer and movable in another direction to take a total from the totalizer, the combination of means to engage and disengage the totalizer with and from the actuators; means to impart two complete movements to the engaging and disengaging means each machine operation, either of said movements being capable of completing an engagement and a disengagement of the totalizer with and from the actuators, the first of said movements timed to engage the totalizer with the actuators during their movement in a total-taking direction, and the second of said movements timed to engage the totalizer with the actuators during their movement in an adding direction; means, comprising a part connected to the engaging and disengaging means and connectable to the imparting means, for operatively connecting the engaging and disengaging means to the imparting means in adding and/or total-taking operations; means to normally retain the part in a neutral position, in which position it is disconnected from the imparting means; means to move the part to engage it with the imparting means during its first or second engaging and disengaging movements; add control means; total control means; a differential device positioned by the control means; a member positioned by the differential device and cooperating with the moving means when positioned under influence of the add control means to cause the part to be connected to the imparting means during its second movement to cause the totalizer to be engaged with and disengaged from the actuators in add timing; and an element positioned by the member and cooperating with the moving means when said member is positioned under influence of the total control means to cause the part to be connected to the imparting means during its first movement, to cause the totalizer to be engaged with and disengaged from the actuators in total-taking timing.

9. In a machine of the class described, capable of various types of operations and having the same operating cycle for all of such operations, said machine having a totalizer and actuators for the totalizer, the combination of means to engage and disengage the totalizer with and from the actuators; means to impart two separate engaging and disengaging movements to the engaging and disengaging means each machine operation; a single means to connect the engaging and disengaging means to the imparting means for all types of operations, said connecting means normally disconnected; keys to control the various types of operations; a member positioned under control of the control keys; an element positioned by the member; and means cooperating with the member and/or the element to operate the connecting means, to connect the engaging and disengaging means with the imparting means at the proper time with respect to its two engaging and disengaging movements, to cause the totalizer to be engaged with and disengaged from the actuators in proper timing for the type of operation being performed under control of the control keys.

10. In a machine of the class described, capable of adding and/or total operations and having the same operating cycle for either of said operations, said machine having a totalizer and actuators for the totalizer, the combination of means to engage and disengage the totalizer with and from the actuators; means to impart two separate engaging and disengaging movements to the engaging and disengaging means each machine operation, one of said movements being in total timin and the other of said movements being in add timing; a single means to connect the engaging and disengaging means with the imparting means for all types of operations, said connecting means normally ineffective but shiftable in one direction to connect the engaging and disengaging means and the imparting means for the total timing movement of said imparting means, and shiftable in another direction to connect the engaging and disengaging means and the imparting means for the add timing movement of said imparting means; control keys; means, including a differential device positioned by the control keys; a member positioned by the differential device; an element positioned by the member; and means controlled by the element to shift the connecting means in said one direction to effect a total operation, said means also controlled by the member to shift the connecting means in said another direction to effect an adding operation.

11. In a machine of the class described, capable of adding and/or total-taking operations and having the same operating cycle for each of said operations, said machine having a totalizer and actuators for the totalizer, the combination of means to engage and disengage the totalizer with and from the actuators; means to impart total-taking engaging and disengaging movement and add engaging and disengaging movement to the engaging and disengaging means each machine operation; a single means to connect the engaging and disengaging means to the imparting means during its total-taking movement or during its adding movement; a total control key; add control keys; a differential device positioned by the control keys; a member positioned by the differential device; an element positioned by the member; and means controlled by the element, when positioned under influence of the total control key, to operate the single connecting means to cause it to connect the engaging and disengaging means to the imparting means during its total-taking movement, to effect a total-taking operation, said means also controlled by the member when it is positioned under influence of the add control keys to operate the single connecting means to cause it to connect the engaging and disengaging means to the imparting means during its add engaging movement to effect an adding operation.

12. In a machine of the class described, capable of performing adding, total-taking, and sub-total-taking operations, said machine executing identical operating cycles for each of said operations, said machine having a totalizer and actuators for the totalizer, the combination of means to engage and disengage the totalizer with and from the actuators; means to impart two separate engaging and disengaging movements to the engaging and disengaging means each machine operation, one of said movements being in total-taking time and the other of said movements being in add time; a single means to connect the engaging and disengaging means to the imparting means during its total-taking movement or during its add movement or during both of said movements; total control means; sub-total control means; add control means; a differential device positioned by the control means; a member positioned by the differential device; an element positioned by the member; and means controlled by the element when it and the member are positioned under influence of the total control means, to render the connecting means effective to connect the engaging and disengaging means to the imparting means during its total-taking movement to effect a total-taking operation, said means also controlled by the member when it is positioned under influence of the add control means to render the connecting means effective to connect the engaging and disengaging means to the imparting means during its adding movement to effect an adding operation, said means further controlled by the member and the element when they are positioned under influence of the sub-total control means, to render the connecting means effective to connect the engaging and disengaging means to the imparting means during its total-taking movement and during its adding movement to effect a sub-total-taking operation.

13. In a machine of the class described, capable of adding and total-taking operations, said machine effecting identical operating cycles for either of said operations, said machine having a totalizer and actuators for the totalizer; the combination of means to engage and disengage the totalizer with and from the actuators; driving means for the engaging and disengaging means, said driving means operable in total-taking timing and operable in add timing in each machine operation; means, comprising a link connected to the engaging and disengaging means and connectable to the driving means, to cause it to operate the engaging and disengaging means; add control means; total control means; means including a differential device positioned by the control means; a member positioned by the differential device; an element positioned by the member; and means controlled by the element when it and the member are positioned under influence of the total control means to connect the link to the driving means during its operation in total-taking timing, to effect a total-taking operation, said means also controlled by the member when it is positioned under influence of the add control means to connect the link to the driving means during its operation in add timing to effect an adding operation.

14. In a machine of the character described, capable of performing several types of operations, said machine executing identical operating cycles for each type of operation, said machine having a totalizer and actuators for the totalizer, said totalizer engageable with and disengageable from the actuators, the combination of means to engage and disengage the totalizer with and from the actuators; means to impart a first and a second complete movement to the engaging and disengaging means each machine operation, each of said movements capable of engaging and disengaging the totalizer with and from the actuators; a link connected to the engaging and disengaging means and shiftable in one direction into engagement with the imparting means during its first movement, and shiftable in another direction into engagement with the imparting means during its second movement; means for controlling the different types of machine operations; means, including a differential device, positioned by the controlling means; a member positioned by the differential device; an element positioned by the member; and means connected to the link and controlled by the member and/or the element for selectively shifting said link in either direction to cause the movement (first or second) of the imparting means corresponding to the effective control means to be transmitted to the engaging and disengaging means.

15. In a machine of the character described, capable of performing several types of operations, said machine effecting identical operating cycles for each type of operation, said machine having a totalizer and actuators for the totalizer, said totalizer engageable with and disengageable from the actuators, the combination of means to engage and disengage the totalizer with and from the actuators; means to impart a first and a second complete engaging and disengaging movement to the engaging and disengaging means each machine operation, each of said movements capable of completing an engagement and a disengagement of the totalizer with and from the actuators; a link connected to the engaging and disengaging means and connectable to the imparting means; means to move the link in one direction to connect the engaging and disengaging means to the imparting means during its first movement, said means also effective to move the link in another direction to connect the engaging and disengaging means to the imparting means during its second movement; means for controlling the different types of machine operations; a differential device positioned by the controlling means; a member positioned by the differential device; an element positioned by the member; and means connecting the link to the moving means, said connecting means controlled by the member and/or the element, under influence of the controlling means, for selectively moving said link in either or both directions during one machine operation, to determine whether the first or second movement of the imparting means or whether both movements of said imparting means will be transmitted to the engaging and disengaging means.

16. In a machine of the class described, capable of performing adding, total-taking, and sub-total-taking operations, said machine having a totalizer and actuators for the totalizer, the combination of means to engage and disengage the totalizer with and from the actuators; means to impart two complete engaging and disengaging movements to the engaging and disengaging means each machine operation, the first of said movements being in total-taking timing, the second of said movements being in add timing, and a combination of both movements being in sub-total-taking timing; a link connected to the engaging and disengaging means and connectable to the imparting means; selectively controlled means to connect the link to the imparting means during its first movement or during its second movement, or during both of said movements; total control means; add control means; sub-total control means; a differential device positioned by the control means; a member positioned by the differential device; an element positioned by the member; and means cooperating with the member and/or the element to control the connecting means for the link to cause said link to be connected to the imparting means during the proper one of its engaging and disengaging movements or during both of such movements to effect the type of operation corresponding to the effective control means.

17. In a machine of the class described, capable of performing adding, total-taking, and sub-total-taking operations, said machine executing identical operating cycles for each of said operations, said machine having a totalizer and actuators for the totalizer, the combination of means to engage and disengage the totalizer with and from the actuators; means to impart two complete engaging and disengaging movements to the engaging and disengaging means each machine operation, the first of said movements being in total-taking timing, the second of said movements being in add timing, and a combination of the two movements being in sub-total-taking timing; a link connected to the engaging and disengaging means and connectable to the imparting means; add control means; total control means; sub-total control means; a differential device positioned by the controlling means; a member positioned by the differential device; an element positioned by the member; and means cooperating with the element when it is positioned under influence of the total control means to move the link in one direction to connect the engaging and disengaging means to the imparting means during its first movement to effect a total-taking operation, said means cooperating with the member when it is positioned under influence of the add control means, to move the link in another direction to connect the engaging and disengaging means to the imparting means during its second movement to effect an adding operation, said means cooperating with both the member and the element when they are positioned under influence of the sub-total control means, to move the link in both directions to connect the engaging and disengaging means to the imparting means during its first and second movements to effect a sub-total-taking operation.

18. In a machine of the character described, capable of performing adding and/or total-taking operations, said machine executing identical operating cycles for each of said operations, said machine having a totalizer and actuators for the totalizer, the combination of means to engage and disengage the totalizer with and from the actuators; means to impart two separate engaging and disengaging movements to the engaging and disengaging means each machine operation, the first of said movements being in total-taking timing and the second of said movements being in add timing; a part connected to the engaging and disengaging means, said part having a slot with a neutral portion and two engaging portions therein; a projection on the imparting means cooperating with the slot; yieldable means to normally retain the neutral portion of the slot in alinement with the projection; normally ineffective means to move the part in two directions with respect to the projection; add control keys; a total control key; a differential device positioned by the control keys; a member positioned by the differential device, said member effective when positioned under influence of the add control keys to render the moving means effective to move the part in one direction to engage one of the engaging portions of the slot with the projection prior to and during the second engaging and disengaging movement of the imparting means, to cause the totalizer to be engaged with and disengaged from the actuators in add timing; and an element positioned by the member, said element effective when positioned under influence of the total control key to render the moving means effective to move the part in another direction to engage the other of the engaging portions of the slot with the projection prior to and during the first engaging and disengaging movement of the imparting means to cause the totalizer to be engaged with and disengaged from the actuators in total-taking timing.

19. In a machine of the character described, capable of performing adding, total-taking, and sub-total-taking operations, said machine executing identical operating cycles for each of said operations, said machine having a totalizer and actuators for the totalizer, the combination of means to engage and disengage the totalizer with and from the actuators; means, including a lever with a projection thereon, to impart a total-taking engaging and disengaging movement to the engaging and disengaging means and to impart an adding engaging and disengaging movement to the engaging and disengaging means each machine operation; a part connected to the engaging and disengaging means, said part having a slot with a neutral portion and two engaging portions therein, said slot cooperating with the projection on the imparting means; normally ineffective means to move the part in two directions with respect to the projection; yieldable means to normally retain the neutral portion of the slot in alinement with the projection; total control means; add control means; sub-total control means; a differential device positioned by the control means; a member positioned by the differential device; an element positioned by the member; and means connecting the moving means to the part and cooperating with the element, when said element is positioned under influence of the total control means, to cause the moving means to move the part in one direction to connect one of the engaging portions of the slot with the projection prior to and during total-taking engaging and disengaging movement of the imparting means, to cause the the totalizer to be engaged with and disengaged from the actuators in total-taking operations, said connecting means cooperating with the member when said member is positioned under influence of the add control means, to cause the moving means to move the part in another direction, to connect the other engaging portion of the slot with the projection prior to and during adding engaging and disengaging movement of the imparting means, to cause the totalizer to be engaged with and disengaged from the actuators in adding operations, said connecting means cooperating with the element and the member when they are positioned under influence of the sub-total control means to cause the moving means to move the part in both directions to alternately connect each engaging portion of the slot with the projection prior to and during both engaging and disengaging movements of the imparting means, to cause the totalizer to be engaged with and disengaged from the actuators in sub-total-taking operations.

EDWARD J. CAREY.
JOHN H. MORE,
*Special Administrator of the Estate of John B. Geers, Deceased.*

REFERENCES CITED

The following references are of record in the file of this patent:

UNITED STATES PATENTS

| Number | Name | Date |
|---|---|---|
| 1,233,492 | Martin | July 17, 1917 |
| 1,619,796 | Shipley | Mar. 1, 1927 |
| 1,657,696 | Robertson | Jan. 31, 1928 |
| 1,791,875 | Shipley | Feb. 10, 1931 |
| 1,818,338 | Kropff | Aug. 11, 1931 |
| 1,853,050 | Horton | Apr. 12, 1932 |
| 1,896,936 | Bornkessel et al. | Feb. 7, 1933 |
| 1,917,511 | Elliott | July 11, 1933 |
| 1,930,870 | Ball | Oct. 17, 1933 |
| 1,951,682 | Varren | Mar. 20, 1934 |
| 2,039,143 | Breitling | Apr. 28, 1936 |
| 2,110,903 | Breitling et al. | Mar. 15, 1938 |
| 2,262,258 | Shipley et al. | Nov. 11, 1941 |
| 2,263,459 | Geller | Nov. 18, 1941 |

FOREIGN PATENTS

| Number | Country | Date |
|---|---|---|
| 223,301 | Great Britain | Oct. 17, 1924 |